(12) United States Patent
Caruso et al.

(10) Patent No.: US 8,275,715 B2
(45) Date of Patent: Sep. 25, 2012

(54) APPARATUSES, METHODS AND SYSTEMS FOR A DEPOSIT PROCESS MANAGER DECISIONING ENGINE

(75) Inventors: Salvatore R. Caruso, Charlotte, NC (US); James K. Macklin, Jr., Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 325 days.

(21) Appl. No.: 12/305,649

(22) PCT Filed: Jun. 18, 2007

(86) PCT No.: PCT/US2007/071497
§ 371 (c)(1),
(2), (4) Date: Aug. 25, 2010

(87) PCT Pub. No.: WO2007/149820
PCT Pub. Date: Dec. 27, 2007

(65) Prior Publication Data
US 2010/0312705 A1    Dec. 9, 2010

Related U.S. Application Data

(60) Provisional application No. 60/805,088, filed on Jun. 18, 2006.

(51) Int. Cl.
*G06Q 40/00* (2012.01)
(52) U.S. Cl. ............... 705/45; 705/30; 705/39; 705/40; 705/43

(58) Field of Classification Search ............. 705/30, 705/39, 40, 43, 45; 235/379
See application file for complete search history.

(56) References Cited

U.S. PATENT DOCUMENTS

| | | | |
|---|---|---|---|
| 2002/0042773 A1* | 4/2002 | Fugitte et al. | 705/39 |
| 2002/0152164 A1 | 10/2002 | Dutta et al. | |
| 2003/0068077 A1* | 4/2003 | Koakutsu et al. | 382/135 |
| 2004/0133516 A1* | 7/2004 | Buchanan et al. | 705/42 |
| 2005/0171899 A1* | 8/2005 | Dunn et al. | 705/39 |
| 2006/0080245 A1* | 4/2006 | Bahl et al. | 705/40 |
| 2006/0242063 A1* | 10/2006 | Peterson et al. | 705/42 |
| 2007/0172107 A1* | 7/2007 | Jones et al. | 382/137 |
| 2008/0040249 A1* | 2/2008 | Re et al. | 705/35 |
| 2008/0097899 A1* | 4/2008 | Jackson et al. | 705/39 |
| 2009/0222381 A1* | 9/2009 | Purches et al. | 705/42 |

OTHER PUBLICATIONS

PCT International Search Report/ PCT Written Opinion dated May 9, 2008.

* cited by examiner

*Primary Examiner* — Tien Nguyen
(74) *Attorney, Agent, or Firm* — Michael A. Springs

(57) ABSTRACT

The disclosure details the implementation of apparatuses, methods, and systems for a deposit process manager ("DPManager") including aspects of a decisioning engine, aspects of a deposit delay component, and of a de queueing component. The DPManager is supported by the first workflow process engine in the financial industry to provide end-to-end solutions for complex brokerage and retirement deposits and check clearing. The OPManger can automatically route checks to be cleared electronically at numerous banks/clearing entities based on routing number, time of day, bank fees and float expense. The DPManager can capture data electronically without manual intervention with deposit slips.

15 Claims, 74 Drawing Sheets

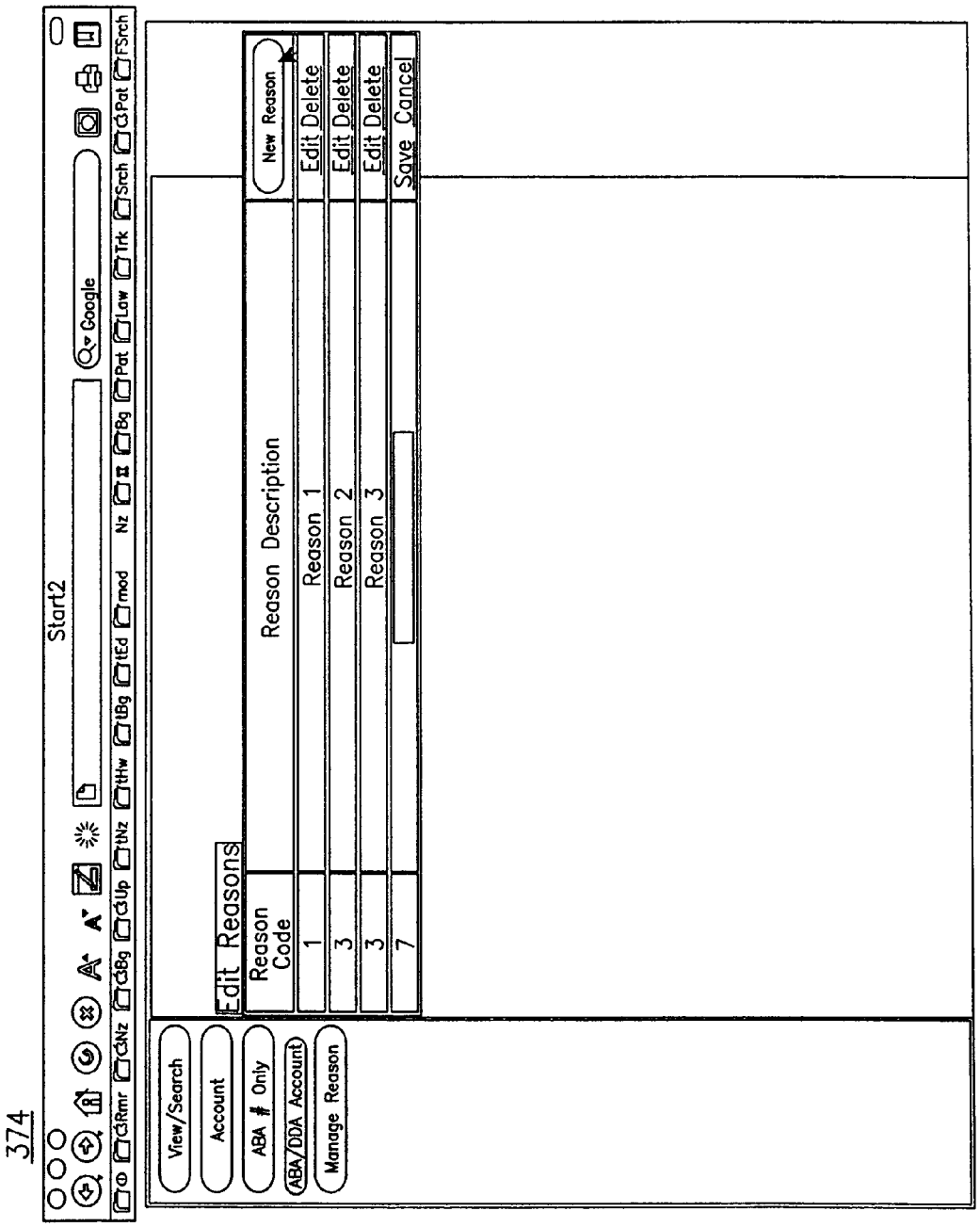
FIG.3B3

FIG.3B4

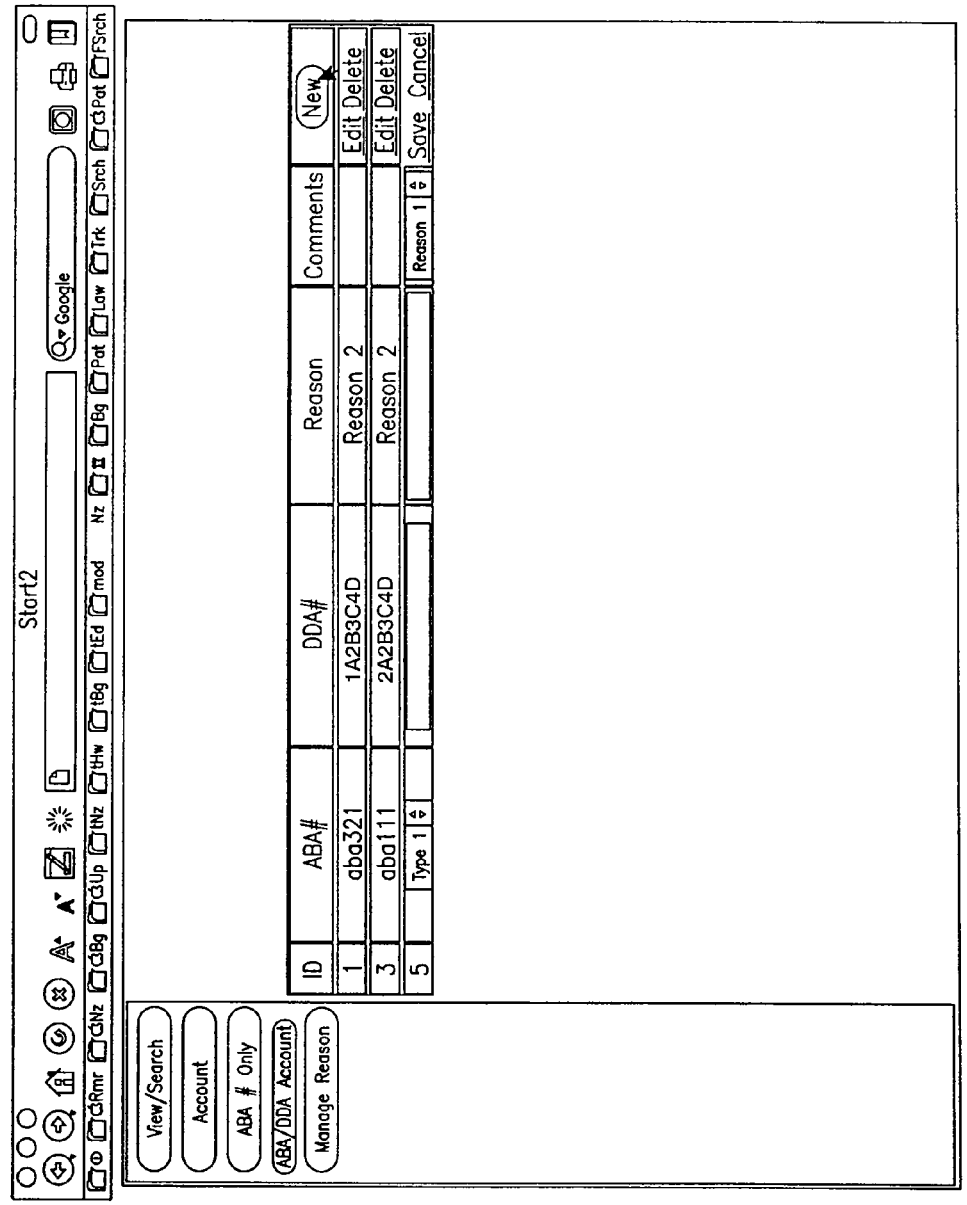

| | DELAY MATRIX | |
|---|---|---|
| VARIABLE 400 | RULE 410 | DELAY 420 |
| CHECK TYPE 401 | IF CASHIERS,TRAVELERS,FEDERAL & STATE GOVT OR OFFICIAL CHECK | −4 |
| | ALL OTHER IMAGE READABLE CHECKS | 0 |
| | ANY PAPER CLEARED CHECK TYPES (N/Q/Y) 411 | 1 421 |
| BASELINE AVAILABILITY 402 | DETERMINED BY THE TIME OF DAY AND CLEARING METHOD THAT IS BEST SUITED FOR THE CHECK 412 | 0.1 OR 2 422 |
| SEGMENT 403 | IF.SUP.NSP OR HIA | −1 |
| | ALL OTHER SEGMENTS 413 | 0 423 |
| LOS 404 | IF LESS THAN 3 MONTHS | 2 |
| | IF GREATER THAN 3 MONTHS BUT LESS THAN 1 YEAR | 1 |
| | IF GREATER THAN 1 YEAR 414 | 0 424 |
| PPS 405 | IF STATUS = 002,003,006,007,012,013,014,015,016,017,018,098,250,251,252,OR (ANY SCORE BETWEEN 490−499 | 4 |
| | IF STATUS=096 | 1 |
| | ALL OTHER 415 | 0 425 |
| TOTAL DELAY | | MIN DELAY=0. MAX DELAY=4 |
| 430 | | 431 |

DELAY DEPOSIT RULE MAINTENANCE

Product Type [PROD1 ▼]   Rule Type [CHKTYP ▼]   Rule ID [ALL ▼]

[Submit]  [Reset]   Add New Rule Id

| Edit | Prod Type | Rule Type | Rule Id | Payout | Sweep | Rule Description | Delete |
|---|---|---|---|---|---|---|---|
| Edit | PROD1 | CHKTYP | BUS | 4 | 0 | BUSINESS | ☐ |
| Edit | PROD1 | CHKTYP | CSH | -1 | 0 | CASHIER'S CHECK | ☐ |
| Edit | PROD1 | CHKTYP | FED | -1 | 0 | GOVERNMENT (FEDERAL) | ☐ |
| Edit | PROD1 | CHKTYP | LWA | 0 | 0 | LWA | ☐ |
| Edit | PROD1 | CHKTYP | MLC | 0 | 0 | MLCC | ☐ |
| Edit | PROD1 | CHKTYP | MNO | -1 | 0 | MONEY ORDER | ☐ |
| Edit | PROD1 | CHKTYP | NOP | 1 | 0 | NOPES (DID NOT PASS EDITS) | ☐ |
| Edit | PROD1 | CHKTYP | OTH | 0 | 0 | OTHER CHECKS | ☐ |
| Edit | PROD1 | CHKTYP | PRS | 0 | 0 | PERSONAL CHECK | ☐ |
| Edit | PROD1 | CHKTYP | STT | -1 | 0 | GOVERNMENT (STATE) | ☐ |
| Edit | PROD1 | CHKTYP | TRV | -1 | 0 | TRAVELER'S CHECK | ☐ |

FIG. 4C3

DELAY DEPOSIT RULE MAINTENANCE

Product Type [PROD1 ▼]    Rule Type [CHKTYP ▼]    Rule ID [BUS ▼]

[Submit]  [Reset]

[Add New Rule Id]

| | Prod Type | Rule Type | Rule Id | Payout | Sweep | Rule Description | Delete |
|---|---|---|---|---|---|---|---|
| Edit | PROD1 | CHKTYP | BUS | 4 | 0 | BUSINESS | ☐ |
| Edit | PROD1 | CHKTYP | CSH | -4 | 0 | CASHIER'S CHECK | ☐ |
| Edit | PROD1 | CHKTYP | FED | -4 | 0 | GOVERNMENT (FEDERAL) | ☐ |
| Edit | PROD1 | CHKTYP | LMA | 0 | 0 | LMA | ☐ |
| Edit | PROD1 | CHKTYP | MLC | 0 | 0 | MLCC | ☐ |
| Edit | PROD1 | CHKTYP | MNO | -4 | 0 | MONEY ORDER | ☐ |
| Edit | PROD1 | CHKTYP | NOP | 1 | 0 | NOPES (DID NOT PASS EDITS) | ☐ |
| Edit | PROD1 | CHKTYP | OTH | 0 | 0 | OTHER CHECKS | ☐ |
| Edit | PROD1 | CHKTYP | PRS | 0 | 0 | PERSONAL CHECK | ☐ |
| Edit | PROD1 | CHKTYP | STT | -4 | 0 | GOVERNMENT (STATE) | ☐ |
| Edit | PROD1 | CHKTYP | TRV | -4 | 0 | TRAVELER'S CHECK | ☐ |

FIG.4C4

DELAY DEPOSIT RULE MAINTENANCE

Product Type [PROD1 ▽]   Rule Type [CHKTYP ▽]   Rule ID [BUS ▽]

[Submit]   [Reset]   [Add New Rule Id]

| | Prod Type | Rule Type | Rule Id | Payout | Sweep | Paydown | Rule Description | Delete |
|---|---|---|---|---|---|---|---|---|
| Edit | PROD2 | CHKTYP | BUS | 0 | 0 | 0 | BUSINESS | ☐ |
| Edit | PROD1 | CHKTYP | BUS | 0 | 0 | 0 | BUSINESS | ☐ |
| Edit | PROD1 | CHKTYP | BUS | 4 | 0 | 0 | BUSINESS | ☐ |
| Edit | PROD1 | CHKTYP | BUS | 0 | 0 | 0 | BUSINESS | ☐ |

FIG.4C5

DELAY DEPOSIT RULE MAINTENANCE

Product Type [PROD1 ▼]   Rule Type [CHKTYP ▼]   Rule ID [ALL ▼]

[Submit]   [Reset]

[Add New Rule Id]

| | Prod Type | Rule Type | Rule Id | Payout | Rule Description | Delete |
|---|---|---|---|---|---|---|
| Edit | PROD1 | CHKTYP | BUS | 4 | BUSINESS | ☐ |
| Edit | PROD1 | CHKTYP | CSH | -4 | CASHIER'S CHECK | ☐ |
| Edit | PROD1 | CHKTYP | FED | -4 | GOVERNMENT (FEDERAL) | ☐ |
| Edit | PROD1 | CHKTYP | LMA | 0 | LMA | ☐ |
| Edit | PROD1 | CHKTYP | MLC | 0 | MLCC | ☐ |
| Edit | PROD1 | CHKTYP | MNO | -4 | MONEY ORDER | ☐ |
| Edit | PROD1 | CHKTYP | NOP | 1 | NOPES (DID NOT PASS EDITS) | ☐ |
| Edit | PROD1 | CHKTYP | OTH | 0 | OTHER CHECKS | ☐ |
| Edit | PROD1 | CHKTYP | PRS | 0 | PERSONAL CHECK | ☐ |
| Edit | PROD1 | CHKTYP | STT | -4 | GOVERNMENT (STATE) | ☐ |
| Edit | PROD1 | CHKTYP | TRV | -4 | TRAVELER'S CHECK | ☐ |

Delete 492

DELAY DEPOSIT RULE MAINTENANCE

Product Type [PROD1 ▾]   Rule Type [CHKTYP ▾]   Rule ID [ALL ▾]

[Submit]   [Reset]   [Add New Rule Id]

| | Prod Type | Rule Type | Rule Id | Payout | Rule Description | Delete |
|---|---|---|---|---|---|---|
| Edit | PROD1 | CHKTYP | BUS | 3 | BUSINESS | ☐ |
| Edit | PROD1 | CHKTYP | CSH | -4 | CASHIER'S CHECK | ☐ |
| Edit | PROD1 | CHKTYP | FED | -4 | GOVERNMENT (FEDERAL) | ☐ |
| Edit | PROD1 | CHKTYP | LMA | 0 | LMA | ☐ |
| Edit | PROD1 | CHKTYP | MLC | 0 | MLCC | ☐ |
| Edit | PROD1 | CHKTYP | MNO | -4 | MONEY ORDER | ☐ |
| Edit | PROD1 | CHKTYP | NOP | 1 | NOPES (DID NOT PASS EDITS) | ☐ |
| Edit | PROD1 | CHKTYP | OTH | 0 | OTHER CHECKS | ☐ |
| Edit | PROD1 | CHKTYP | PRS | 0 | PERSONAL CHECK | ☐ |
| Edit | PROD1 | CHKTYP | STT | -4 | GOVERNMENT (STATE) | ☐ |
| Edit | PROD1 | CHKTYP | TRV | -4 | TRAVELER'S CHECK | ☐ |

DELAY DEPOSIT RULE MAINTENANCE

Product Type [PROD1 ▾]  Rule Type [CHKTYP ▾]  Rule ID [ALL ▾]

[Submit]  [Reset]  Add New Rule Id

| Prod Type | Rule Type | Rule Id | Payout | Rule Description | Delete |
|---|---|---|---|---|---|
| Edit PROD1 | CHKTYP | BUS | 3 | BUSINESS | ☒ |
| Edit PROD1 | CHKTYP | CSH | -4 | CASHIER'S CHECK | ☐ |
| Edit PROD1 | CHKTYP | FED | -4 | GOVERNMENT (FEDERAL) | ☐ |
| Edit PROD1 | CHKTYP | LMA | 0 | LMA | ☐ |
| Edit PROD1 | CHKTYP | MLC | 0 | MLCC | ☐ |
| Edit PROD1 | CHKTYP | MNO | -4 | MONEY ORDER | ☐ |
| Edit PROD1 | CHKTYP | NOP | 1 | NOPES (DID NOT PASS EDITS) | ☐ |
| Edit PROD1 | CHKTYP | OTH | 0 | OTHER CHECKS | ☐ |
| Edit PROD1 | CHKTYP | PRS | 0 | PERSONAL CHECK | ☐ |
| Edit PROD1 | CHKTYP | STT | -4 | GOVERNMENT (STATE) | ☐ |
| Edit PROD1 | CHKTYP | TRV | -4 | TRAVELER'S CHECK | ☐ |

FIG. 4C8

DELAY DEPOSIT RULE MAINTENANCE

Product Type [PROD1 ▼]   Rule Type [CHKTYP ▼]   Rule ID [ALL ▼]

[Submit] [Reset]

[Add New Rule Id]

| | Prod Type | Rule Type | Rule Id | Payout | Rule Description | Delete |
|---|---|---|---|---|---|---|
| Edit | PROD1 | CHKTYP | BUS | 3 | BUSINESS | ☑ |
| Edit | PROD1 | CHKTYP | CSH | -4 | CASHIER'S CHECK | ☐ |
| Edit | PROD1 | CHKTYP | FED | -4 | GOVERNMENT (FEDERAL) | ☐ |
| Edit | PROD1 | CHKTYP | LMA | 0 | LMA | |
| Edit | PROD1 | CHKTYP | MLC | 0 | MLCC | |
| Edit | PROD1 | CHKTYP | MNO | -4 | MONEY O| | |
| Edit | PROD1 | CHKTYP | NOP | 1 | NOPES ( | |
| Edit | PROD1 | CHKTYP | OTH | 0 | OTHER C| | |
| Edit | PROD1 | CHKTYP | PRS | 0 | PERSONAL | ☐ |
| Edit | PROD1 | CHKTYP | STT | -4 | GOVERNMENT (STATE) | ☐ |
| Edit | PROD1 | CHKTYP | TRV | -4 | TRAVELER'S CHECK | ☐ |

Are you sure you want to delete?

[OK] [Cancel]

FIG. 4C9

DELAY DEPOSIT RULE MAINTENANCE

Product Type [PROD1 ▼]   Rule Type [CHKTYP ▼]   Rule ID [ALL ▼]

[Submit]  [Reset]   [Add New Rule Id]

| | Prod Type | Rule Type | Rule Id | Payout | Rule Description | Delete |
|---|---|---|---|---|---|---|
| Edit | PROD1 | CHKTYP | BUS | 3 | BUSINESS | ☒ |
| Edit | PROD1 | CHKTYP | CSH | -4 | CASHIER'S CHECK | ☐ |
| Edit | PROD1 | CHKTYP | LMA | 0 | LMA | ☐ |
| Edit | PROD1 | CHKTYP | MLC | 0 | MLCC | ☐ |
| Edit | PROD1 | CHKTYP | MNO | -4 | MONEY ORDER | ☐ |
| Edit | PROD1 | CHKTYP | NOP | 1 | NOPES (DID NOT PASS EDITS) | ☐ |
| Edit | PROD1 | CHKTYP | OTH | 0 | OTHER CHECKS | ☐ |
| Edit | PROD1 | CHKTYP | PRS | 0 | PERSONAL CHECK | ☐ |
| Edit | PROD1 | CHKTYP | STT | -4 | GOVERNMENT (STATE) | ☐ |
| Edit | PROD1 | CHKTYP | TRV | -4 | TRAVELER'S CHECK | ☐ |

Delete Successful

FIG. 4C10

Update 493

DELAY DEPOSIT RULE MAINTENANCE

Product Type [PROD1 ▼]   Rule Type [CHKTYP ▼]   Rule ID [ALL ▼]

[Submit]   [Reset]   [Add New Rule Id]

| | Prod Type | Rule Type | Rule Id | Payout | Rule Description | Delete |
|---|---|---|---|---|---|---|
| Edit | PROD1 | CHKTYP | BUS | 3 | BUSINESS | ☐ |
| Edit | PROD1 | CHKTYP | CSH | -4 | CASHIER'S CHECK | ☐ |
| Edit | PROD1 | CHKTYP | FED | -4 | GOVERNMENT (FEDERAL) | ☐ |
| Edit | PROD1 | CHKTYP | LMA | 0 | LMA | ☐ |
| Edit | PROD1 | CHKTYP | MLC | 0 | MLCC | ☐ |
| Edit | PROD1 | CHKTYP | MNO | -4 | MONEY ORDER | ☐ |
| Edit | PROD1 | CHKTYP | NOP | 1 | NOPES (DID NOT PASS EDITS) | ☐ |
| Edit | PROD1 | CHKTYP | OTH | 0 | OTHER CHECKS | ☐ |
| Edit | PROD1 | CHKTYP | PRS | 0 | PERSONAL CHECK | ☐ |
| Edit | PROD1 | CHKTYP | STT | -4 | GOVERNMENT (STATE) | ☐ |
| Edit | PROD1 | CHKTYP | TRV | -4 | TRAVELER'S CHECK | ☐ |

DELAY DEPOSIT RULE MAINTENANCE

Product Type [PROD1 ▽]   Rule Type [CHKTYP ▽]   Rule ID [ALL ▽]

[Submit]   [Reset]   [Add New Rule Id]

| | Prod Type | Rule Type | Rule Id | Payout | Rule Description | Delete |
|---|---|---|---|---|---|---|
| Update Cancel | OTHER | CHKTYP | BUS | 0 | BUSINESS | ☐ |
| Edit | OTHER | CHKTYP | CSH | -4 | CASHIER'S CHECK | ☐ |
| Edit | OTHER | CHKTYP | FED | -4 | GOVERNMENT (FEDERAL) | ☐ |
| Edit | OTHER | CHKTYP | LMA | 0 | LMA | ☐ |
| Edit | OTHER | CHKTYP | MLC | 0 | MLCC | ☐ |
| Edit | OTHER | CHKTYP | MNO | -1 | MONEY ORDER | ☐ |
| Edit | OTHER | CHKTYP | NOP | 1 | NOPES (DID NOT PASS EDITS) | ☐ |
| Edit | OTHER | CHKTYP | OTH | 0 | OTHER CHECKS | ☐ |
| Edit | OTHER | CHKTYP | PRS | 0 | PERSONAL CHECK | ☐ |
| Edit | OTHER | CHKTYP | STT | -4 | GOVERNMENT (STATE) | ☐ |
| Edit | OTHER | CHKTYP | TRV | -4 | TRAVELER'S CHECK | ☐ |

DELAY DEPOSIT RULE MAINTENANCE

Product Type [PROD1 ▼]  Rule Type [CHKTYP ▼]  Rule ID [ALL ▼]

[Submit]  [Reset]

[Add New Rule Id]

| | Prod Type | Rule Type | Rule Id | Payout | Rule Description | Delete |
|---|---|---|---|---|---|---|
| Update Cancel | OTHER | CHKTYP | BUS | 3 | BUSINESS | ☐ |
| Edit | OTHER | CHKTYP | CSH | -1 | CASHIER'S CHECK | ☐ |
| Edit | OTHER | CHKTYP | FED | -1 | GOVERNMENT (FEDERAL) | ☐ |
| Edit | OTHER | CHKTYP | LMA | 0 | LMA | ☐ |
| Edit | OTHER | CHKTYP | MLC | 0 | MLCC | ☐ |
| Edit | OTHER | CHKTYP | MNO | 1 | NOPES (DID NOT PASS EDITS) | ☐ |
| Edit | OTHER | CHKTYP | OTH | 0 | OTHER CHECKS | ☐ |
| Edit | OTHER | CHKTYP | PRS | 0 | PERSONAL CHECK | ☐ |
| Edit | OTHER | CHKTYP | STT | -1 | GOVERNMENT (STATE) | ☐ |
| Edit | OTHER | CHKTYP | TRV | -1 | TRAVELER'S CHECK | ☐ |

FIG.4D3

DELAY DEPOSIT RULE MAINTENANCE

Product Type [PROD1 ▽]　　Rule Type [CHKTYP ▽]　　Rule ID [ALL ▽]

[Submit]　[Reset]　　[Add New Rule Id]

| | Prod Type | Rule Type | Rule Id | Payout | Rule Description | Delete |
|---|---|---|---|---|---|---|
| Edit | OTHER | CHKTYP | BUS | 3 | BUSINESS | ☐ |
| Edit | OTHER | CHKTYP | CSH | -4 | CASHIER'S CHECK | ☐ |
| Edit | OTHER | CHKTYP | FED | -4 | GOVERNMENT (FEDERAL) | ☐ |
| Edit | OTHER | CHKTYP | LMA | 0 | LMA | ☐ |
| Edit | OTHER | CHKTYP | MLC | 0 | MLCC | ☐ |
| Edit | OTHER | CHKTYP | MNO | -4 | MONEY ORDER | ☐ |
| Edit | OTHER | CHKTYP | NOP | 1 | NOPES (DID NOT PASS EDITS) | ☐ |
| Edit | OTHER | CHKTYP | OTH | 0 | OTHER CHECKS | ☐ |
| Edit | OTHER | CHKTYP | PRS | 0 | PERSONAL CHECK | ☐ |
| Edit | OTHER | CHKTYP | STT | -4 | GOVERNMENT (STATE) | ☐ |
| Edit | OTHER | CHKTYP | TRV | -4 | TRAVELER'S CHECK | ☐ |

Update Successful

FIG.4D4

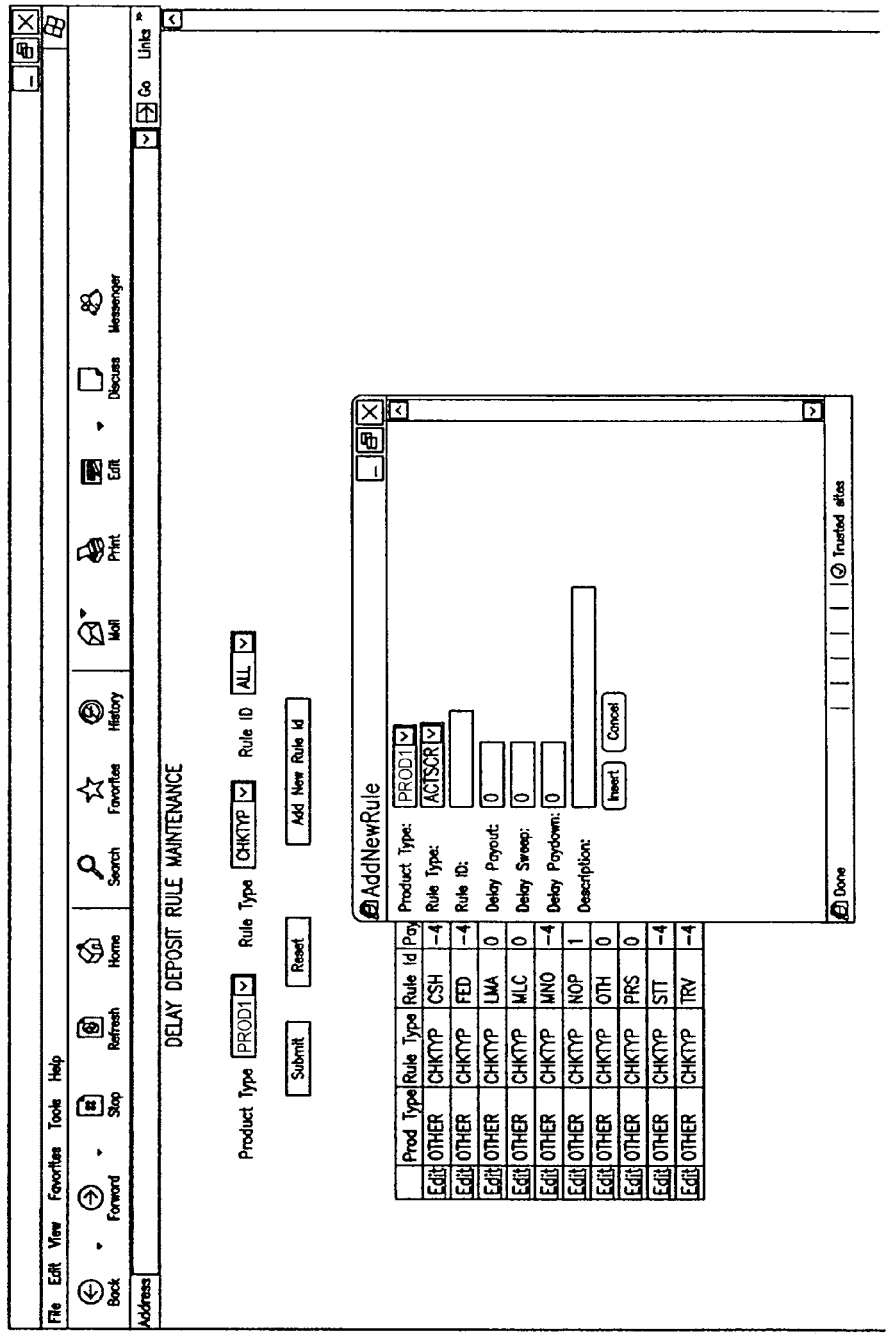
FIG.4D5

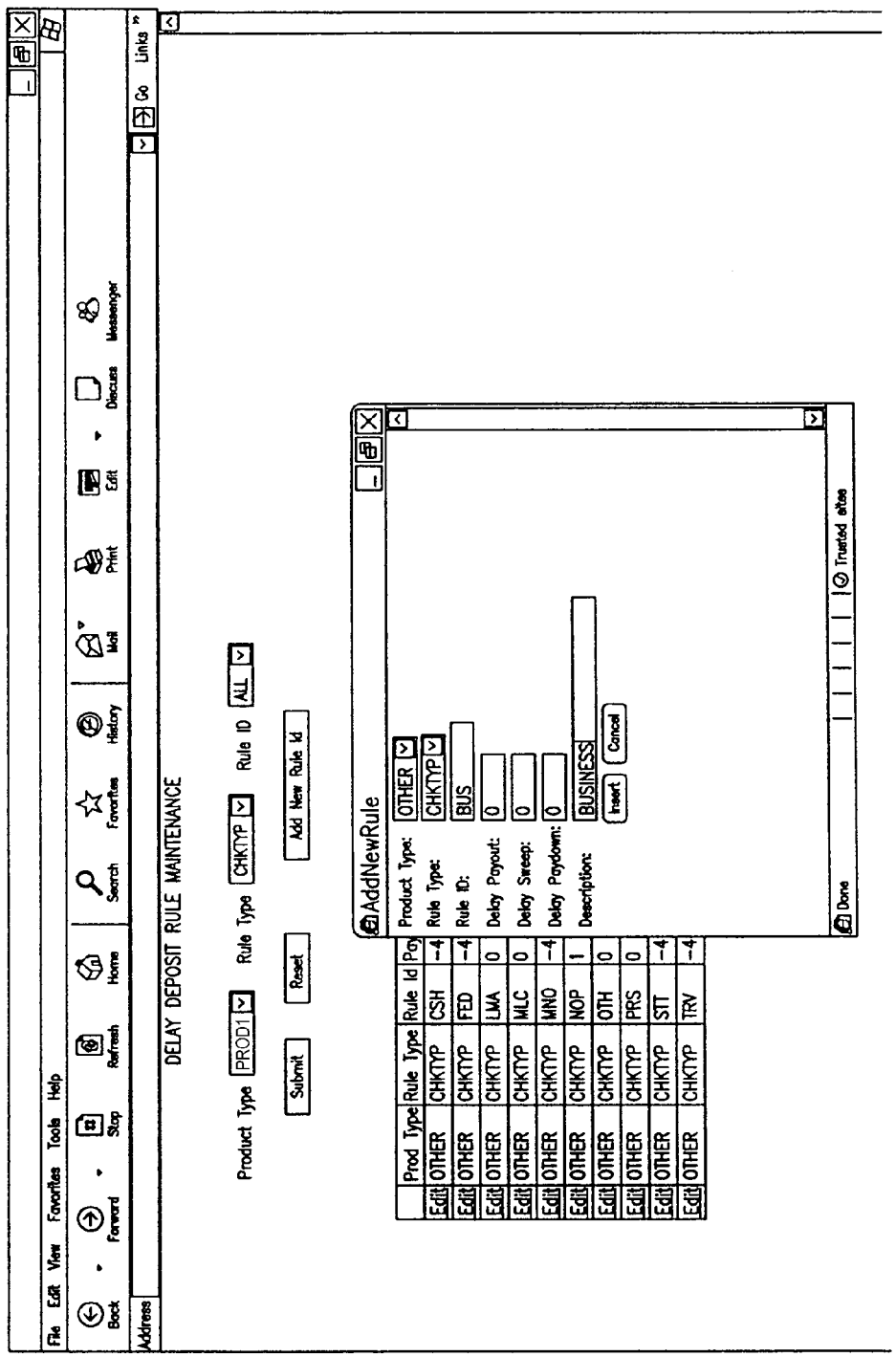
FIG.4D6

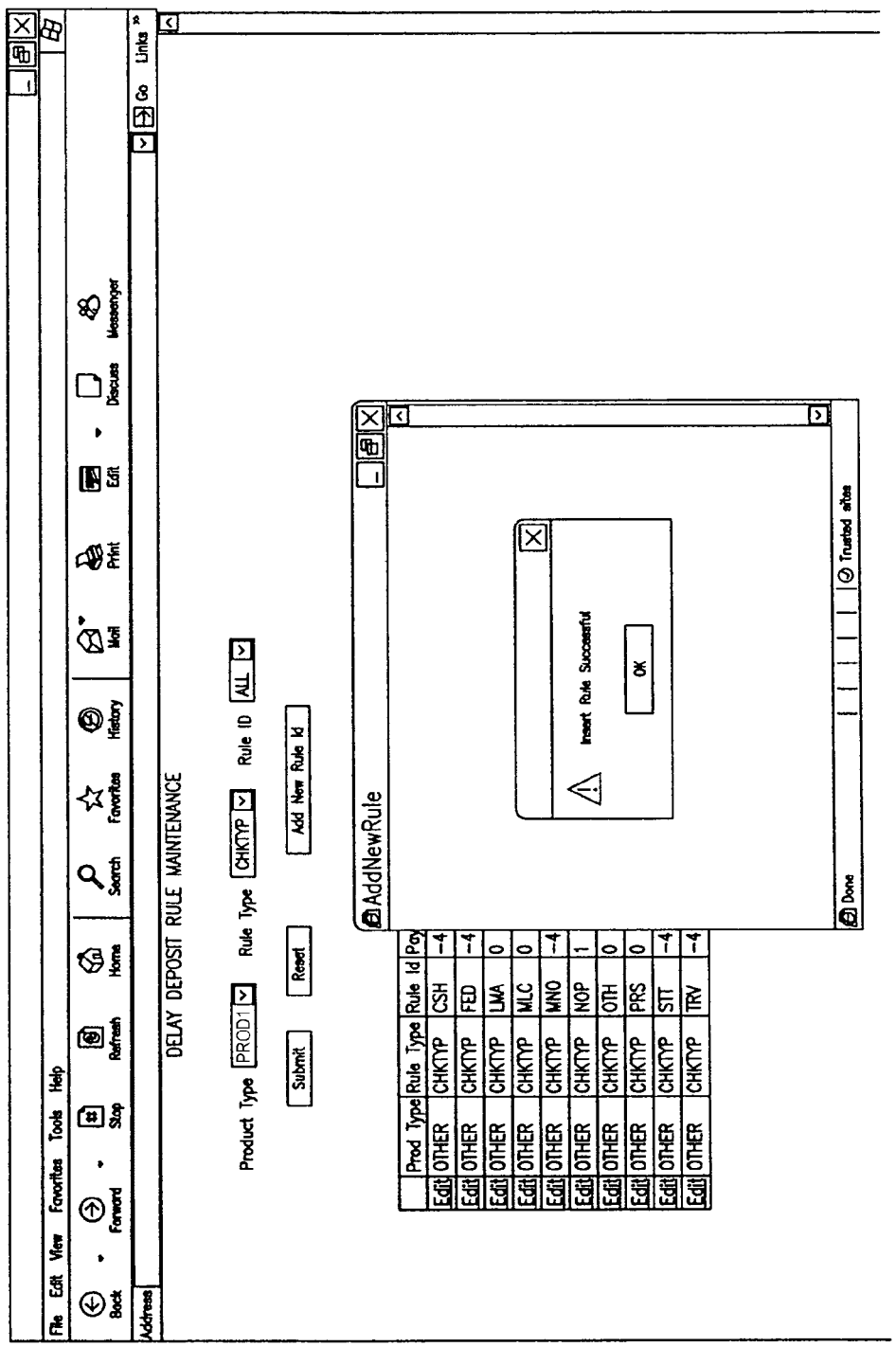
FIG. 4D7

DELAY DEPOSIT RULE MAINTENANCE

Product Type [PROD1 ▼]   Rule Type [CHKTYP ▼]   Rule ID [ALL ▼]

[Submit]   [Reset]   [Add New Rule Id]

Update Successful

| | Prod Type | Rule Type | Rule Id | Payout | Rule Description | Delete |
|---|---|---|---|---|---|---|
| Edit | OTHER | CHKTYP | BUS | 0 | BUSINESS | ☐ |
| Edit | OTHER | CHKTYP | CSH | -1 | CASHIER'S CHECK | ☐ |
| Edit | OTHER | CHKTYP | FED | -1 | GOVERNMENT (FEDERAL) | ☐ |
| Edit | OTHER | CHKTYP | LMA | 0 | LMA | ☐ |
| Edit | OTHER | CHKTYP | MLC | 0 | MLCC | ☐ |
| Edit | OTHER | CHKTYP | MNO | 1 | MONEY ORDER | ☐ |
| Edit | OTHER | CHKTYP | NOP | 1 | NOPES (DID NOT PASS EDITS) | ☐ |
| Edit | OTHER | CHKTYP | OTH | 0 | OTHER CHECKS | ☐ |
| Edit | OTHER | CHKTYP | PRS | 0 | PERSONAL CHECK | ☐ |
| Edit | OTHER | CHKTYP | STT | -1 | GOVERNMENT (STATE) | ☐ |
| Edit | OTHER | CHKTYP | TRV | -1 | TRAVELER'S CHECK | ☐ |

FIG. 4D8

Clearing Entities, Cutoffs, & Fees 600

| Clearing Entity | Same Day Cut-Off | Same Day Fee | Next Day Cut-off | Next Day Fee |
|---|---|---|---|---|
| Fed Res | 12:00 | $0.210 | 20:00 | $0.054 |
| End Exch | 13:00 | $0.070 | 23:59 | $0.070 |
| SVPCO #1 | 12:00 | $0.011 | 23:59 | $0.011 |
| SVPCO #2 | 12:00 | $0.011 | 23:59 | $0.011 |
| SVPCO #3 | 9:00 | $0.011 | 23:59 | $0.011 |
| SVPCO #4 | 0:00 | $0.000 | 23:59 | $0.011 |
| SVPCO #5 | 0:00 | $0.000 | 23:59 | $0.011 |
| SVPCO #6 | 12:00 | $0.011 | 23:59 | $0.011 |
| SVPCO #7 | 12:00 | $0.011 | 23:59 | $0.011 |
| SVPCO #8 | 12:00 | $0.011 | 23:59 | $0.011 |
| Other #1 | 12:00 | $0.011 | 23:59 | $0.011 |
| Other #2 | 12:00 | $0.011 | 23:59 | $0.011 |
| Other #3 | 12:00 | $0.011 | 23:59 | $0.011 |
| Other #4 | 12:00 | $0.011 | 23:59 | $0.011 |
| Other #5 | 12:00 | $0.011 | 23:59 | $0.011 |

ABA Number/Clearing Entity 610

| CE / ABA Number | Fed Reserve Same Day | Endpoint Exchange | SVP #1 | SVP #2 | SVP #3 | SVP #4 | SVP #5 | SVP #6 | SVP #7 | SVP #8 | Other #1 | Other #2 | Other #3 | Other #4 | Other #5 |
|---|---|---|---|---|---|---|---|---|---|---|---|---|---|---|---|
| 1A2B3C4D5 | B | X | X | X | X | X | X | X | X | X | X | X | X | X | X |
| 2A2B3C4D5 | B | B | X | X | X | X | X | X | X | X | X | X | X | X | X |
| 3A2B3C4A5 | N | X | B | X | X | X | X | X | X | X | X | X | X | X | X |
| 4A2B3C4D5 | N | B | X | B | B | X | X | X | X | X | X | X | X | X | X |
| 5A2B3C4D5 | N | X | X | X | X | X | X | X | X | X | X | X | X | X | X |
| 6A2B3C4D5 | B | X | X | X | X | B | B | X | X | X | X | X | X | X | X |
| 7A2B3C4D5 | N | X | X | X | X | X | X | X | X | X | X | X | X | X | X |
| 8A2B3C4D5 | N | X | X | X | X | X | X | B | B | B | X | X | X | X | X |
| 9A2B3C4D5 | N | X | X | X | X | X | X | X | X | X | X | X | X | X | X |
| 0A2B3C4D5 | N | B | X | X | X | X | X | X | X | X | X | X | X | X | X |

Legend: X = Not Available
N = Next Day only
B = Both Same Day & Next Day

Fig. 6A

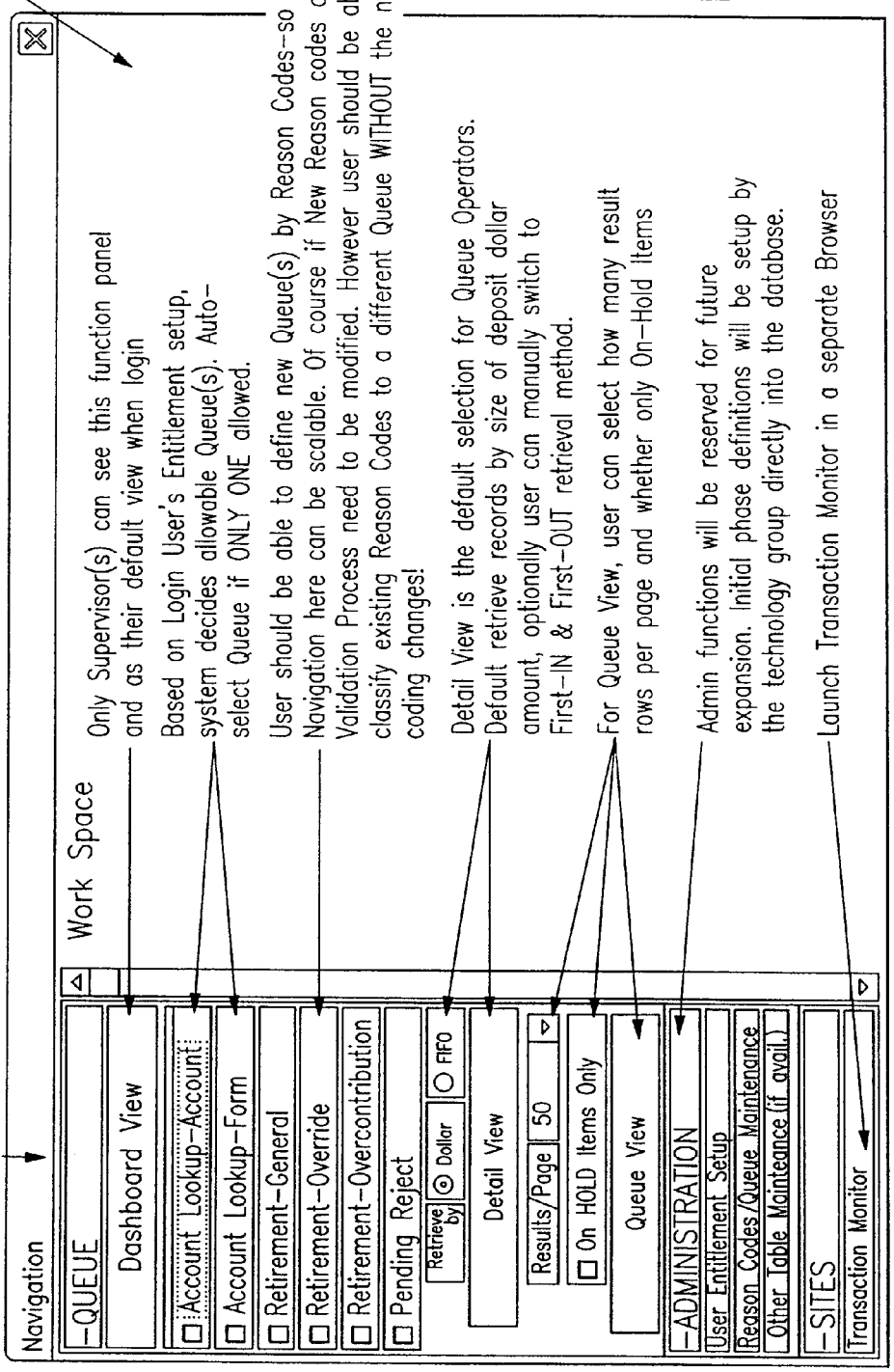

FIG. 8C 1.2 Dashboard View-Screen Shot of Default View for Supervisor
Navigation-Default Selection-Supervisor

| QUEUE | | | | | |
|---|---|---|---|---|---|
| Dashboard View | Total | 15 | 5 | 34 | 32 | 10 | 3 |
| ☐ Account Lookup-Account | On-Hold | 2 | 1 | 12 | 0 | 5 | 0 |
| ☐ Account Lookup-Form | Assigned | 10 | 10 | 5 | 5 | 5 | 5 |
| ☐ Retirement-General | Work in Progress | 2 | 2 | 1 | 1 | 1 | 1 |
| ☐ Retirement-Override | Queue Users | Account Lookup ACCOUNT | Account Lookup FORM | Retirement GENERAL | Retirement OVERRIDE | Retirement OVERCONTRIBUTION | REJECT |
| ☐ Retirement-Overcontribution | First Name 1 | | | | | | |
| ☐ Pending Reject | First Name 2 | | | | | | |
| Retrieve by: ⊙ Dollar  ○ FIFO | First Name 3 | | | | | | |
| Detail View | First Name 4 | | | | | | |
| Results/Page 50 | First Name 5 | | | | | | |
| ☐ On HOLD Items Only | First Name 6 | | | | | | |
| Queue View | First Name 7 | | | | | | |
| | First Name 8 | | | | | | |

SITES
Transaction Monitor

1.2.1 Dashboard View–Default View for Supervisor Screen Usage Explanation

When supervisor login, the Dashboard View will automatically selected. Dashboard consists of two sections organized horizontally by Edit Queues. The TOP portion contains current counts of items in each Queue and how many put on-hold versus work in progress. The BOTTOM portion listed ALL Queue Users and show who signed-in and work in which Queue(s)

Click Total row hyperlink to switch to the Queue View and click On-Hold row hyperlink for Queue View of On-Hold items in that Queue only (Please sees (1.4 Navigation-Queue View Screen Shot) for details)

Navigation–Default Selection–Supervisor

–QUEUE

Dashboard View

- ☐ Account Lookup–Account
- ☐ Account Lookup–Form
- ☐ Retirement–General
- ☐ Retirement–Override
- ☐ Retirement–Overcontribution
- ☐ Pending Reject Retrieve by: ⦿ Dollar ◯ FIFO Detail View Results/Page 50

☐ On HOLD Items Only

Queue View

–SITES

Transaction Monitor

| Queue | Account Lookup ACCOUNT | Account Lookup FORM | Retirement GENERAL | Retirement OVERRIDE | Retirement OVERCONTRIBUTION |
|---|---|---|---|---|---|
| Total | 15 | 5 | 34 | 32 | 10 | 3 |
| On–Hold | 2 | 1 | 12 | 0 | 5 | 0 |
| Assigned | 10 | 10 | 5 | 5 | 5 | 5 |
| Work in Progress | 2 | 2 | 1 | 1 | 1 | 1 |
| Users | | | | | | REJECT |
| First Name 1 | | | | | | |
| First Name 2 | | | | | | |
| First Name 3 | | | | | | |
| First Name 4 | | | | | | |
| First Name 5 | | | | | | |
| First Name 6 | | | | | | |
| First Name 7 | | | | | | |
| First Name 8 | | | | | | |

Show records assigned

Show records work on

Supervisor can see that First Name 2 is working VERY HARD in 3 Queues at the same time Supervisor can also see that First Name 3 & First Name 6 are NOT doing anything and are taking a LONG Lunch Break.

*1.3.1 Detail View-Default View for Queue Operators Screen Usage Explanation*

FIG.8F 1.4 Queue View-Queue View Screen Shot

Navigation-Queue View

| | Deposit Date | Reason | Total Amount | No Dep | No Chk | Transaction Status | Queue User | Deposit Form Check Seq | Account Scanned | Account | Amount | Scanned Location |
|---|---|---|---|---|---|---|---|---|---|---|---|---|
| | MM-DD-YY 09:01:31 | Account # is not active | $XX,XXX,XXX.XX | 1 | 3 | Not Process | | XXXX BBA | 1A2B3C4D5E6F | 1A2B3C4D5 | $XX,XXX,XXX.XX | 0-XXX |
| | MM-DD-YY 09:01:31 | Invalid Account Number | $XX,XXX,XXX.XX | 1 | 3 | Working Process | USER1 | XXXX BIA | 1A2B3C4D5E6F | 1A2B3C4D5 | $XX,XXX,XXX.XX | 0-XXX |
| | MM-DD-YY 09:01:31 | Account name does not match Deposit Slip | $XX,XXX,XXX.XX | 1 | 3 | Working Process | USER1 | Check Seq=001 | 1A2B3C4D5E6F | 1A2B3C4D5 | $XX,XXX,XXX.XX | 0-XXX |
| | MM-DD-YY 09:01:31 | Account Number does not exist | $XX,XXX,XXX.XX | 1 | 3 | Not Process | | XXXX CMA Plus | 1A2B3C4D5E6F | 1A2B3C4D5 | $XX,XXX,XXX.XX | 0-XXX |
| | MM-DD-YY 09:01:31 | Account not found on KO | $XX,XXX,XXX.XX | 1 | 3 | On hold for more info | | XXXX CMA | 1A2B3C4D5E6F | 1A2B3C4D5 | $XX,XXX,XXX.XX | 0-XXX |
| | MM-DD-YY 09:01:31 | Account not found on CRF | $XX,XXX,XXX.XX | 1 | 3 | Not Process | | XXXX ICMA | 1A2B3C4D5E6F | 1A2B3C4D5 | $XX,XXX,XXX.XX | 0-XXX |
| | MM-DD-YY 09:01:31 | Account not found on AM | $XX,XXX,XXX.XX | 1 | 3 | Working Process | USER2 | XXXX BBA | 1A2B3C4D5E6F | 1A2B3C4D5 | $XX,XXX,XXX.XX | 0-XXX |
| | MM-DD-YY 09:01:31 | Third Party Record Keeping Error (M1 Connect Accounts) | $XX,XXX,XXX.XX | 1 | 3 | On hold for more info | | XXXX BMA | 1A2B3C4D5E6F | 1A2B3C4D5 | $XX,XXX,XXX.XX | 0-XXX |
| | MM-DD-YY 09:01:31 | IK075 Invalid Social Security Number | $XX,XXX,XXX.XX | 1 | 3 | Not Process | | XXXX BBA (exec) | 1A2B3C4D5E6F | 1A2B3C4D5 | $XX,XXX,XXX.XX | 0-XXX |
| | MM-DD-YY 09:01:31 | IK077 Acct Must be added to KDA First | $XX,XXX,XXX.XX | 1 | 3 | Not Process | | XXXX WCMA | 1A2B3C4D5E6F | 1A2B3C4D5 | $XX,XXX,XXX.XX | 0-XXX |
| | MM-DD-YY 09:01:31 | IK003-Account not found on Retirement Master (IKMAST) | $XX,XXX,XXX.XX | 1 | 3 | Not Process | | XXXX Early Bird Coupon | 1A2B3C4D5E6F | 1A2B3C4D5 | $XX,XXX,XXX.XX | 0-XXX |
| | MM-DD-YY 09:01:31 | IK004 Account has been transferred out | $XX,XXX,XXX.XX | 1 | 3 | Not Process | | XXXX Late Bird Coupon | 1A2B3C4D5E6F | 1A2B3C4D5 | $XX,XXX,XXX.XX | 0-XXX |
| | MM-DD-YY 09:01:31 | IK006 Account has been closed out | $XX,XXX,XXX.XX | 1 | 3 | Not Process | | XXXX Ready Asset Coupon | 1A2B3C4D5E6F | 1A2B3C4D5 | $XX,XXX,XXX.XX | 0-XXX |
| | MM-DD-YY 09:01:31 | Acts Close-ACATS | $XX,XXX,XXX.XX | 1 | 3 | Not Process | | XXXX Split Deposit Slip | 1A2B3C4D5E6F | 1A2B3C4D5 | $XX,XXX,XXX.XX | 0-XXX |
| | MM-DD-YY 09:01:31 | APB: Abandoned Property Block | $XX,XXX,XXX.XX | 1 | 3 | Not Process | | XXXX File Upload | 1A2B3C4D5E6F | 1A2B3C4D5 | $XX,XXX,XXX.XX | 0-XXX |
| | MM-DD-YY 09:01:31 | ATE: Account Takeover | $XX,XXX,XXX.XX | 1 | 3 | Not Process | | XXXX Credit Corporation | 1A2B3C4D5E6F | 1A2B3C4D5 | $XX,XXX,XXX.XX | 0-XXX |
| | MM-DD-YY 09:01:31 | ATO: Account Takeover | $XX,XXX,XXX.XX | 1 | 3 | Not Process | | XXXX BBA | 1A2B3C4D5E6F | 1A2B3C4D5 | $XX,XXX,XXX.XX | 0-XXX |
| | MM-DD-YY 09:01:31 | COE Death | $XX,XXX,XXX.XX | 1 | 3 | Working Process | USER3 | XXXX SEP, SRA, BASIC & RSA | 1A2B3C4D5E6F | 1A2B3C4D5 | $XX,XXX,XXX.XX | 0-XXX |
| | MM-DD-YY 09:01:31 | CLC: Close-Chest Request | $XX,XXX,XXX.XX | 1 | 3 | Not Process | | XXXX Traditional IRA | 1A2B3C4D5E6F | 1A2B3C4D5 | $XX,XXX,XXX.XX | 0-XXX |
| | MM-DD-YY 09:01:31 | CLO: Close-Office Request | $XX,XXX,XXX.XX | 1 | 3 | Not Process | | XXXX BSA | 1A2B3C4D5E6F | 1A2B3C-D5 | $XX,XXX,XXX.XX | 0-XXX |
| | MM-DD-YY 09:01:31 | CLC: Close-Chest Request | $XX,XXX,XXX.XX | 1 | 3 | Not Process | | XXXX Traditional IRA | 1A2B3C4D5E6F | 1A2B3C4D5 | $XX,XXX,XXX.XX | 0-XXX |

-QUEUE
- ☑ :Account Lookup-Account
- ☐ Account Lookup-Form
- ☐ Retirement-General
- ☐ Retirement-Override
- ☐ Retirement-Overcontribution
- ☐ Pending Reject Retrieve by: ● Dollar  ○ FIFO Detail View Results/Page  50

☐ On HOLD Items Only

Queue View

-SITES
Transaction Monitor

FIG. 8G

1.4.1 Queue View—Queue View Screen Usage Explanation

User can switch to Queue View by select (Queue View) button from the left-side Navigation. OR (Queue View) button on the Detail Screen top panel. Supervisor can switch to Queue the same way PLUS by clicking Hyperlink of Count on each queue on Dashboard View Click on the Column Title with hyperlink to resort the Result List based that Column. Initially default the sort by Total Amount in DESCENDING Order. Click on the same column twice will toggle the sort between DESCENDING and ASCENDING

| Deposit Date | Reason | Total Amount | No Dep | No Chk | Transaction Status | Queue User | Deposit Form Check Seq | Account Scanned | Account | Amount | Scanned Location |
|---|---|---|---|---|---|---|---|---|---|---|---|
| MM-DD-YY 09:01:31 | Account # is not active | $XX,XXX,XXX.XX | 1 | 3 | Not Process | | XXXX BBA | 1A2B3C4D5E6F | 1A2B3C4D5 | $XX,XXX,XXX.XX | 0-XXX |
| MM-DD-YY 09:01:31 | Invalid Account Number | $XX,XXX,XXX.XX | 1 | 3 | Working Process | USER1 | XXXX BIA | 1A2B3C4D5E6F | 1A2B3C4D5 | $XX,XXX,XXX.XX | 0-XXX |
| MM-DD-YY 09:01:31 | Account name does not match Deposit Slip | $XX,XXX,XXX.XX | 1 | 3 | Working Process | USER1 | Check Seq=001 | 1A2B3C4D5E6F | 1A2B3C4D5 | $XX,XXX,XXX.XX | 0-XXX |
| MM-DD-YY 09:01:31 | Account Number does not exist | $XX,XXX,XXX.XX | 1 | 3 | Not Process | | XXXX CMA Plus | 1A2B3C4D5E6F | 1A2B3C4D5 | $XX,XXX,XXX.XX | 0-XXX |
| MM-DD-YY 09:01:31 | Account not found on KD | $XX,XXX,XXX.XX | 1 | 3 | On hold for more info | | XXXX CMA | 1A2B3C4D5E6F | 1A2B3C4D5 | $XX,XXX,XXX.XX | 0-XXX |
| MM-DD-YY 09:01:31 | Account not found on CRF | $XX,XXX,XXX.XX | 1 | 3 | Not Process | | XXXX CMA | 1A2B3C4D5E6F | 1A2B3C4D5 | $XX,XXX,XXX.XX | 0-XXX |
| MM-DD-YY 09:01:31 | Account not found on AM | $XX,XXX,XXX.XX | 1 | 3 | Working Process | USER2 | XXXX BMA | 1A2B3C4D5E6F | 1A2B3C4D5 | $XX,XXX,XXX.XX | 0-XXX |
| MM-DD-YY 09:01:31 | Third Party Record Keeping Error (M1 Connect Accounts) | $XX,XXX,XXX.XX | 1 | 3 | On hold for more info | | XXXX BMA | 1A2B3C4D5E6F | 1A2B3C4D5 | $XX,XXX,XXX.XX | 0-XXX |
| MM-DD-YY 09:01:31 | IK075 Invalid Social Security Number | $XX,XXX,XXX.XX | 1 | 3 | Not Process | | XXXX BBA (exec) | 1A2B3C4D5E6F | 1A2B3C4D5 | $XX,XXX,XXX.XX | 0-XXX |
| MM-DD-YY 09:01:31 | IK077 Acct Must be added to KDA First | $XX,XXX,XXX.XX | 1 | 3 | Not Process | | XXXX WCMA | 1A2B3C4D5E6F | 1A2B3C4D5 | $XX,XXX,XXX.XX | 0-XXX |
| MM-DD-YY 09:01:31 | IK003-Account not found on Retirement Master (RMAST) | $XX,XXX,XXX.XX | 1 | 3 | Not Process | | XXXX Early Bird Coupon | 1A2B3C4D5E6F | 1A2B3C4D5 | $XX,XXX,XXX.XX | 0-XXX |
| MM-DD-YY 09:01:31 | IK004 Account has been transferred out | $XX,XXX,XXX.XX | 1 | 3 | Not Process | | XXXX Late Bird Coupon | 1A2B3C4D5E6F | 1A2B3C4D5 | $XX,XXX,XXX.XX | 0-XXX |
| MM-DD-YY 09:01:31 | IK006 Account has been closed out | $XX,XXX,XXX.XX | 1 | 3 | Not Process | | XXXX Ready Asset Coupon | 1A2B3C4D5E6F | 1A2B3C4D5 | $XX,XXX,XXX.XX | 0-XXX |
| MM-DD-YY 09:01:31 | Acts Close-ACATS | $XX,XXX,XXX.XX | 1 | 3 | Not Process | | XXXX Soft Deposit Slip | 1A2B3C4D5E6F | 1A2B3C4D5 | $XX,XXX,XXX.XX | 0-XXX |
| MM-DD-YY 09:01:31 | AB: Abandoned Property Block | $XX,XXX,XXX.XX | 1 | 3 | Not Process | | XXXX File Upload | 1A2B3C4D5E6F | 1A2B3C4D5 | $XX,XXX,XXX.XX | 0-XXX |
| MM-DD-YY 09:01:31 | AE: Account Takeover | $XX,XXX,XXX.XX | 1 | 3 | Not Process | | XXXX Credit Corporation | 1A2B3C4D5E6F | 1A2B3C4D5 | $XX,XXX,XXX.XX | 0-XXX |
| MM-DD-YY 09:01:31 | AT0: Account Takeover | $XX,XXX,XXX.XX | 1 | 3 | Not Process | | XXXX BBA | 1A2B3C4D5E6F | 1A2B3C4D5 | $XX,XXX,XXX.XX | 0-XXX |
| MM-DD-YY 09:01:31 | CDE: Death | $XX,XXX,XXX.XX | 1 | 3 | Working Process | USER3 | XXXX SEP SRA, BASIC & RSA | 1A2B3C4D5E6F | 1A2B3C4D5 | $XX,XXX,XXX.XX | 0-XXX |
| MM-DD-YY 09:01:31 | CLC: Close-Chest Request | $XX,XXX,XXX.XX | 1 | 3 | Not Process | | XXXX Traditional IRA | 1A2B3C4D5E6F | 1A2B3C4D5 | $XX,XXX,XXX.XX | 0-XXX |
| MM-DD-YY 09:01:31 | CLO: Close-Office Request | $XX,XXX,XXX.XX | 1 | 3 | Not Process | | XXXX BSA | 1A2B3C4D5E6F | 1A2B3C4D5 | $XX,XXX,XXX.XX | 0-XXX |
| MM-DD-YY 09:01:31 | CL: Close-Chest Request | $XX,XXX,XXX.XX | 1 | 3 | Not Process | | XXXX Traditional IRA | 1A2B3C4D5E6F | 1A2B3C4D5 | $XX,XXX,XXX.XX | 0-XXX |

Click Deposit Data hyperlink to bring up Transaction Image View.
(Please sees (2.5 Transaction Image(s) View-Screen Shot) for detail)

Click Transaction Status hyperlink to bring up the Detail Screen.
(Please sees (2 Detail Screen Definition for Central Queue Edit) for detail)

Work in Progress Items are grayed out to indicate view only. Also User name is shown in the Current Queue User column to indicate who owns the record right now Items put on-hold highlighted for easy identification Move cursor on Scanned Location Hyperlink to view the name of Location/Branch

0-XXX ANYWHERE, USA

FIG. 8L 2.1.2 Detail Screen Various Deposit Slip Samples 2.1.2.1 Detail Screen—SINGLE ACCOUNT/SINGLE ITEM Deposit Slip Sample Apply to FORM XXXX CMA BIA MLD BBA CMA+RCMA ICMA, XXXX EMA WCMA, XXXX LMA, XXXX CMA+(exec) BBA(exe), XXXX Financial Foundation, XXXX RSA Loan Payment, XXXX BASIC Loan Payment, XXXX Account Receivable, XXXX Over the Counter

FIG.8M

FIG. 8N 2.1.2.2 Detail Screen-SINGLE ACCOUNT/MULTIPLE ITEM(s) Deposit Slip Sample
Apply to Form XXXX Special Investment Tracking System, XXXX Early Bird Coupon, XXXX Lat Bird Coupon, XXXX Section XXXX Plan, XXXX SEP/SRA/BASIC/RSA, XXXX LOA SEP/RSA/BASIC, XXXX Health Savings Account, and XXXX Traditional IRA 2.1.2.3 Detail Screen—MULTIPLE ACCOUNT(s)/SINGLE ITEM Deposit Slip Sample
Apply to FORM XXXX Split Deposit Slips.

FIG.80

2.1.2.4 Detail Screen—MULTIPLE ACCOUNT(s)/MULTIPLE ITEM(s) Deposit Slip Sample Apply to FORM XXXX SEP/SRA, XXXX RSA-XXXX, and XXXX Basic Account.

FIG.8P

2.1.3 Detail Screen–From File Upload FORM XXXX

FORM Edit Detail Screens for File Update are the same for regular XXXX, XXXX & XXXX, except system will show the File Upload Confirmation Number info. [Please see [2 Detail Screen–DEPOSIT Tab functional definition] for detail on Deposit Tab]

2.1.3.1 Detail Screen–from File Upload FORM XXXX with RCMA file format which create XXXX Virtual Deposit

FIG. 8U 2.1 Detail Screen-Screen Shot for CHECK TAB

FIG. 8V 2.2.2 Detail Screen-Screen Usage Explanation for CHECK Tab when Transfer is elected

DEPOSIT | CHECK |

No check images.

Debit Non-Retirement Account $XX,XXX,XXX.XX
$XXX.XX
$X.XX

Like a check BUT Virtual (DEBIT)

User Notes

| MM-DD-YYYY User1 | User1's note |
| MM-DD-YYYY User2 | User2's note |
| MM-DD-YYYY User3 | User3's note |
| MM-DD-YYYY User4 | |
| MM-DD-YYYY User5 | User5's note |
| MM-DD-YYYY User6 | |
| MM-DD-YYYY User7 | User7's note |
| MM-DD-YYYY User1 | User1's note |
| MM-DD-YYYY User2 | User2's note |

Add Note

Note(s) can be added

☐ OK   ☐ REMOVE this check
☐ Problem Reason(s)

No error reason or removal

ABA #
DDA #
Serial #
Transfer Act  1A2B3C4D5E

Scanned Transfer shown for reference. Note the actual edit of transfer account take place on Deposit Detail Edit Panel for each Form, if transfer is applicable.

FIG.8W

2.3 Detail Screen–Screen Usage Explanation for TOP Panel

Click On-Hold to put Transaction on hold for further info. On-Hold transaction will not get pushed to User Work Space automatically. To do work on On_hold item user must select it specifically from Queue View.

Click SAVE to put transaction back into Work Flow Process

Detail-DEPOSIT & CHECK

Deposit Date [MM-DD-YYYY] As of Process [MM-DD-YYYY]

Deposit Slip(s) [4] | Total Deposit(s) $XX,XXX,XXX.XX
Check(s) [4] | Total Deposit(s) $XX,XXX,XXX.XX

[Create Virtual Deposit Slip]
Difference [ ]

[On Hold] [Save]
[Reset]

☐ Request REJECT Transaction

Click RESET to abort whatever changes done so far and start over

If Deposit(s) or Check(s) amount being changes, system track the running difference.
User cannot SAVE until the transaction is balanced (0 difference).
If Total Deposit(s) amount greater than Total Check(s); user must reduce one or more deposit(s) amount to balance it.
If Total Check(s) greater than Total Deposit(s); users can either increase the deposit(s) amount OR write off the difference using above [Create Virtual Deposit Slip] button which will be enabled to allow user to move difference to another account.

User can elects to create Virtual Deposit Slip for the difference.
(Please see [2.4 Create Virtual Deposit Slip] for details)

Click Deposit Date hyperlink to bring up Transaction Image View.
(Please see [2.5 Transaction Image(s) View-Screen Shot] for detail)

Users can Request Reject the WHOLE Transaction by clicking this checkbox. BY Request Reject the Transaction, item will get move to Pending Reject Queue pending confirmation.

FIG.8X

THIS PAGE INTENTIONALLY BLANK

2.4 Detail Screen—Create Virtual Deposit Slip

| Deposit Date MM/DD/YYYY As of Process MM/DD/YYYY | # Deposit Slip(s) 4 Total Deposit(s) $XX,XXX,XXX.XX | Create Virtual Deposit Slip | On Hold | Save |
| Request REJECT Transaction | # Check(s) 4 Total Deposit(s) $XX,XXX,XXX.XX Difference | | Reset | |

Create Virtual Deposit  ☒

○ Enter Account OR  ○ Suspense Account | safe suspense account ▾ | FORM | XXXX Over the Counter ▾

[ SAVE ]  [ CLOSE ]

FIG.8Y 2.4.1 Detail Screen-Create Virtual Deposit Slip using Regular Account

User selects Enter Account Option and then selects FORM to use

Create Virtual Deposit—Account

⦿ Enter Account OR ○ Suspense Account

FORM [XXXX Over the Counter ▷]    [select suspense account ▷]    FORM [XXXX Over the Counter ▷]

Account Number [1A2B3C4D5E]    ☐ New Act

Last Name [Last Name]

First Name [First Name]    [XXXXXXXXXXXXXX]

☐ Credit Corp
☐ Loan Management Account
☐ Ready Asset Trust
☐ Regulated Commodity
☐ Unregulated Commodity Deposit Total $ [XX,XXX,XXX.XX]

[SAVE]    [CLOSE]

Corresponding FORM Detail will show in the bottom panel for user to enter necessary info to create the Virtual Deposit Slip Deposit Total $ default to difference but user can change it Click SAVE to create the Virtual Deposit Slip and Click CLOSE to abort the action

FIG.8Z 2.4.2 Detail Screen—Create Virtual Deposit Slip using Suspense Account

User selects Suspense Account Option and then selects which suspense account to use. Default if only ONE selection. Next user selects FORM to use.

Create Virtual Deposit— Account

○ Enter Account OR ⦿ Suspense Account  [select suspense account ▽]  FORM [XXXX Over the Counter ▽]

FORM [XXXX Over the Counter ▽]

Account Number [1A2B3C4D5E]  ☐ New Act

Last Name [Last Name]

First Name [First Name]

[XXXXXXXXXXXXX]

☐ Credit Corp
☐ Loan Management Account
☐ Ready Asset Trust
☐ Regulated Commodity
☐ Unregulated Commodity Deposit Total $ [XX,XXX,XXX.XX]

[SAVE]   [CLOSE]

Corresponding FORM Detail will show in the bottom panel for user to enter necessary info to create the Virtual Deposit Slip Deposit Total $ default to difference but user can change it Click SAVE to create the Virtual Deposit Slip and Click CLOSE to abort the action

FIG.8AA

2.6 Detail Screen–Viewing/Edit an already created Virtual Deposit Slip–Screen Shot System will treat Virtual Deposit Slip the same as any other deposit slip except NO image is showing, therefore cannot highlight problem on the image.

DEPOSIT | CHECK |

VIRTUAL DEPOSIT SLIP

FORM | XXXX Over the Counter ▶ | ☐ REMOVE This Deposit Slip   ☐ New Act   As of Date MM-DD-YYYY Account Number | 1A2B3C4D5E |

Last Name | Last Name |
First Name | First Name |

☐ Credit Corp
☐ Loan Management Account
☐ Ready Asset Trust
☐ Regulated Commodity
☐ Unregulated Commodity

| 1A2B3C4D5E6F |   Deposit Total $ | XX,XXX,XXX.XX |

— User Notes —
MM-DD-YYYY User1 — User1's note
MM-DD-YYYY User2 — User2's note
MM-DD-YYYY User3 — User3's note
MM-DD-YYYY User4
MM-DD-YYYY User5 — User5's note
MM-DD-YYYY User6
MM-DD-YYYY User7 — User7's note
MM-DD-YYYY User1 — User1's note
MM-DD-YYYY User2 — User2's note

[Add Note]

— Problem Reason(s) —
Account # is not active
[☑ Ok]

$XX,XXX,XXX.XX
$XXX.XX
$X.XX

FIG. 8CC 2.6.1 Detail Screen-Viewing/Edit an already created Virtual Deposit Slip-Screen Usage Explanation

DEPOSIT |CHECK|

VIRTUAL DEPOSIT SLIP

FORM | XXXX Over the Counter ▼ | ☐ REMOVE This Deposit Slip  ☐ New Act   As of Date MM-DD-YYYY Account Number [1A2B3C4D5E]

Last Name [Last Name]
First Name [First Name]       [1A2B3C4D5E6F]

☐ Credit Corp
☐ Loan Management Account
☐ Ready Asset Trust
☐ Regulated Commodity
☐ Unregulated Commodity Deposit Total $ [XX,XXX,XXX.XX]

User Notes
MM-DD-YYYY User1  User1's note
MM-DD-YYYY User2  User2's note
MM-DD-YYYY User3  User3's note
MM-DD-YYYY User4
MM-DD-YYYY User5  User5's note
MM-DD-YYYY User6
MM-DD-YYYY User7  User7's note
MM-DD-YYYY User1  User1's note
MM-DD-YYYY User2  User2's note

[Add Note]

Problem Reason(s)
[Account # is not active]   ☑ Ok $XX,XXX,XXX.XX
$XXX.XX
$X.XX

Virtual Deposit Slip:
- Just like another deposit
- Can Add Notes
- No image
- May have problem reason if not Suspense Account
- Ability to Remove the Virtual Deposit Slip from transaction.
- Other fields editable only if not Suspense Account. Account editable

FIG.8DD

2.7 Detail Screen-View from Pending Reject Queue

Reject Transaction

Deposit Date MM-DD-YYYY As of Process MM-DD-YYYY | # Deposit Slip(s) [4] Total Deposit(s) $XX,XXX,XXX.XX | Create Virtual Deposit Slip | On Hold | Save ☐ Request REJECT Transaction    ○ OK Reject   ○ Deny | # Check(s) [4] Total Deposit(s) $XX,XXX,XXX.XX | Difference | | Reset The [Request REJECT Transaction] checkbox will be disabled and Pending Reject Queue Operator will either click [OK Reject] to confirm the request or [Deny] to put item back into processing.
If [OK Reject]: the detail section will be disabled for view only and user click SAVE to finalize the reject
If [Deny]: the detail section will be enabled for editing and user click SAVE to re-submit for validation.

FIG.8EE

2.8 Detail Screen—View and Add Note

Existing notes are listed in DESCENDING order with the most current note listed first. It also shows the Author of the note and first 30 characters of the note (space permitted). Click on the note hyperlink to view the note and click [Add Note] button to create new note. There is NO Delete or Update of existing note!

User Notes

| | | |
|---|---|---|
| MM-DD-YYYY | User1 | User1's note |
| MM-DD-YYYY | User2 | User2's note |
| MM-DD-YYYY | User3 | User3's note |
| MM-DD-YYYY | User4 | |
| MM-DD-YYYY | User5 | User5's note |
| MM-DD-YYYY | User4 | |
| MM-DD-YYYY | User6 | |
| MM-DD-YYYY | User7 | User7's note |
| MM-DD-YYYY | User1 | User1's note |
| MM-DD-YYYY | User2 | User2's note |

[Add Note]

DEPOSIT | CHECK | xxxxxxxxxxxxxxxxxxxxxxxx
xxxxxxxxxxx
PO Box XXXX
xxxxxxx XX xxxxx-xxxx

[1] 1A2B3C4D5E     XXXXXXXXXXXX   XXXXXXXXX   X   [2]

$XX,XXX,XXX.XX

FORM  XXXX  XXXX   ☐ REMOVE this Deposit Slip    As of Date  MM-DD-YYYY

Problem Reason(s)
Account # is not active    ☑ Ok

Account Number  1A2B3C4D5E

Total $  XX,XXX,XXX.XX

Account Scanned  1A2B3C4D5E

FIG.8FF

APPARATUSES, METHODS AND SYSTEMS FOR A DEPOSIT PROCESS MANAGER DECISIONING ENGINE

CLAIM FOR PRIORITY

This application is a National Stage Entry entitled to and hereby claims priority under 35 U.S.C. §§ 365 and 371 corresponding to PCT Application No. PCT/US2007/07149, titled, "APPARATUSES, METHODES AND SYSTEMS FOR A DEPOSIT PROCESS MANAGER DECISIONING ENGINE," filed Jun. 18, 2007, which in turn claimed priority to U.S. Provisional Application No. 60/805,088, filed Jun. 18, 2006; all of which is hereby incorporated by reference, expressly incorporated by reference.

FIELD

The present disclosure is directed generally to apparatuses, methods, and systems relating to negotiable instrument processing, and more particularly, to apparatuses, methods and systems for a deposit process manager.

BACKGROUND

Image scanning technology has been used to generate digital copies of documents, photographs and even physical objects. Numerous forms of scanner technology have been developed. Many of these scanner technologies employ a charge-coupled device (CCD) or a photomultiplier tube as an image sensor. These scanning devices have been coupled to computer systems that capture the data stream from the scanners' image sensor(s) into a discrete digital reproduction of the item being scanned.

The Check Clearing for the 21st Century Act (Check 21) legislation allows a recipient of a paper check (e.g., banks and other entities within the financial services industry) to create an electronic reproduction, thereby eliminating the need for further handling of the physical document. The aim of the legislation is to encourage check truncation, i.e., removing an original paper check from a collection/return process. Check truncation is the process of removing an original paper check from the collection or return process and creating a substitute check or electronic image to clear the item for payment or return. Unlike converted checks, which result in electronic funds transfer through an automated clearing house (ACH) system, substitute checks are still cleared as check items under Federal Reserve board regulations for check collection and availability of funds.

Once a check is truncated, banks and other entities can work with either the substitute check or a digital image. A substitute check is a paper image replacement document (IRD) that contains an image that accurately represent all of the information on the front and back of the original check (at the time of truncation). A substitute check also bears a magnetic ink character recognition (MICR) line with all of the MICR information from the original check. It is considered a legal copy of the check and may be used in the same way as the original. A substitute check is cleared as a check item. Alternatively, and by agreement only between the collecting and paying financial institutions, electronic check files with images containing MICR data can be exchanged via electronic delivery systems, via a process called image exchange, without creating a paper document which must be physically delivered through the check clearing process. The digital images can be exchanged between banks, savings and loan institutions (S&Ls), credit unions, servicers, clearinghouses, and the Federal Reserve.

Previously, while some banks and entities had bi-lateral agreements to exchange only images, a bank or other entity could require the presentation of the original check for clearing. Check 21 requires acceptance of a substitute check or IRD in lieu of the original paper check and imparts the same legal rights to the substitute check as the original. However, while banks and other entities may choose to exchange images electronically, they are not required to do so.

SUMMARY

The disclosure details the implementation of apparatuses, methods, and systems for a deposit process manager ("DPManager") including aspects of a decisioning engine, aspects of a deposit delay component, and of a de-queueing component. Prior to the inventive aspects of the present disclosure, there was no comprehensive deposit process management system to improve the management of check deposits. The present disclosure details a comprehensive solution that significantly improves deposit management from both a service and a financial viewpoint. The DPManager automates and centralizes deposit process management, reduces processing costs and external fees, increases funds availability, and improves the service provided to branches and clients.

The DPManager is supported by the first workflow process engine in the financial industry to provide end-to-end solutions for complex brokerage and retirement deposits and check clearing. The DPManager can automatically route checks to be cleared electronically at numerous banks/clearing entities based on routing number, time of day, bank fees and float expense. The complexity of the brokerage business requires over 35 deposit slips with hundreds of pieces of information. The DPManager can capture data electronically without manual intervention from such deposit slips. One unique aspect of the DPManager is that the check scanning and deposit process requires no data-entry in the branch office. In one embodiment, the new deposit validation process begins with a scanner installed in every branch. Once a check is scanned, the Deposit Process Management system takes over intelligent processing through several sub-systems. These subsystems include systematic edits including account, product and risk management checking numerous databases to completely automate the deposit validation process.

One inventive aspect of the DPManager determines deposit delays based on the characteristics of the check deposited, the writer of the check, the deposit profile of the client, and/or other information. In one embodiment, the delay component employs a matrix that combines check data with industry data and client behavior to determine client funds availability. This delay smoothes the deposit process, allows for greater verification, reduction of errors, and minimization of fraudulent transactions. In another embodiment, the DPManager provides the ability for small business clients to scan checks at their office(s) for submission to the Central Site. Another embodiment of the DPManager provides a Stop File facility that enhances fraud detection when processing deposits by verifying, e.g., if an account has a block against it, if the account has an excess of return deposits, if an account has an excess of cash-like deposits (e.g., money orders, travelers checks, cashier's checks), if there has been prior incidents of fraud, and/or the like. In another embodiment, the DPManager has a decisioning engine that employs an ABA/Clearing Entities matrix for optimizing selections of clearing entities for deposits.

BRIEF DESCRIPTION OF THE DRAWINGS

The accompanying appendices and/or drawings illustrate various non-limiting, example, embodiments and inventive aspects in accordance with the present disclosure:

FIG. 3B illustrates aspects of stop file maintenance for an embodiment of the DPManager;

FIGS. 4A-4D illustrate aspects of deposit delay for some embodiments of the DPManager;

FIGS. 6A-6D illustrate other aspects of the decisioning engine for an embodiment of the DPManager;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

For the purpose of illustrating aspects associated with the disclosed apparatuses, methods and systems for a Deposit Process Manager Decisioning engine ("DPManager"), the following discussion includes the DPManager implemented in the context of financial services and banking. However, it is to be understood there is significant flexibility and scalability associated with the DPManager and, as such, the DPManager may be implemented and configured to meet the needs of users in numerous contexts and industries.

DPManager Overview

Figure 1A:
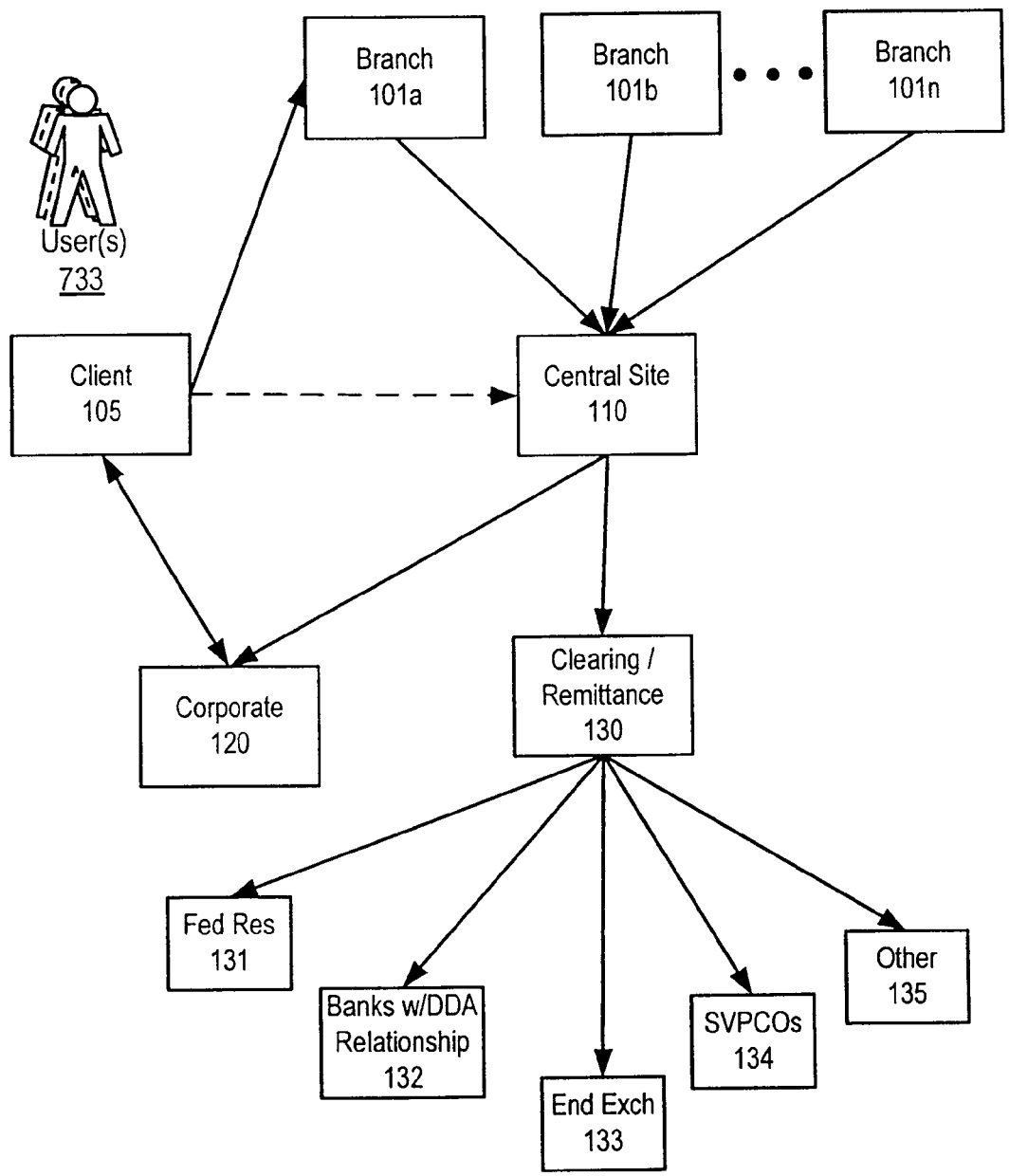
FIG. 1 illustrates an overview of the interactions for an embodiment of the DPManager.
Figure 1C:
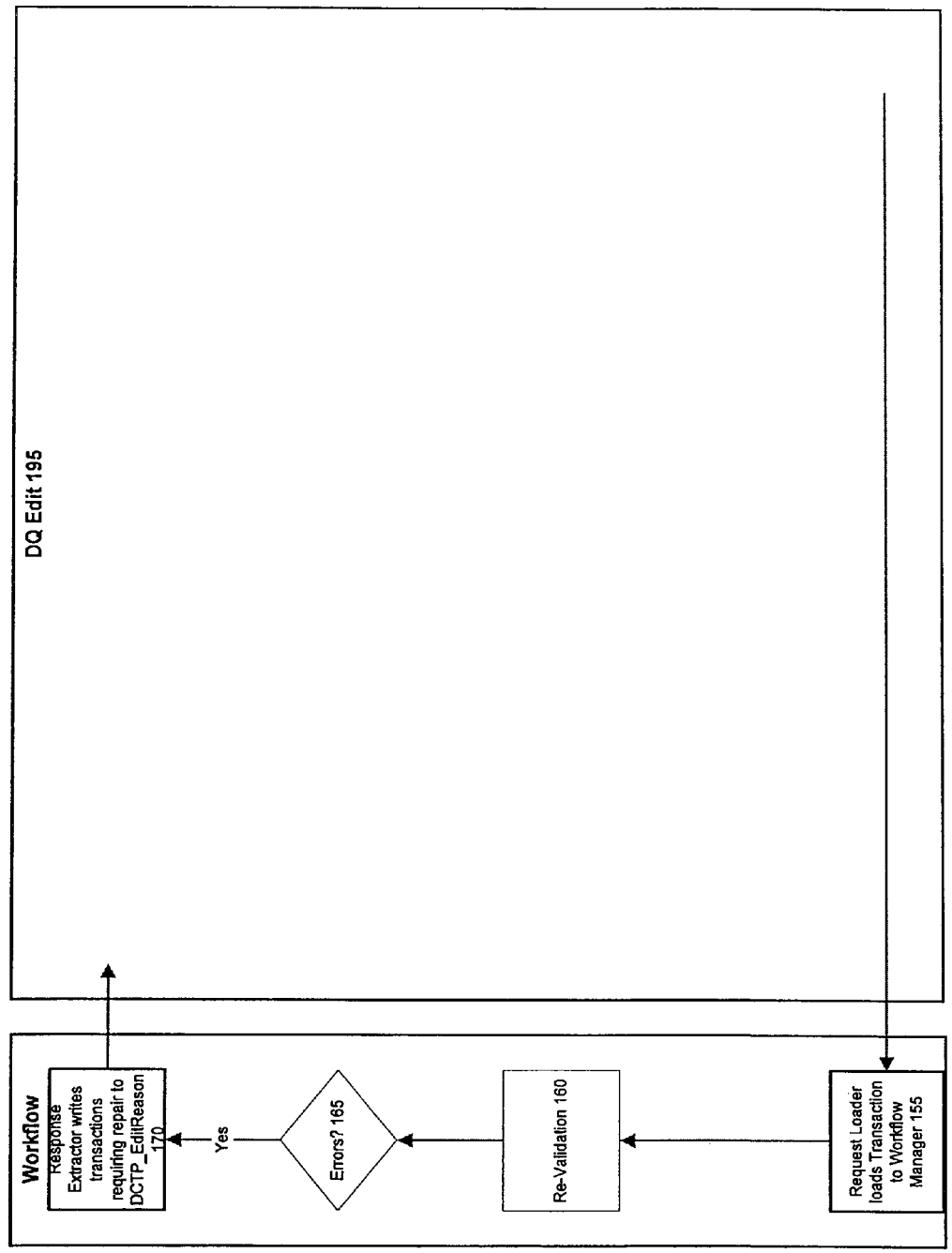

FIG. 1A provides a high level diagram illustrating some of the various entities that interact with an embodiment of the DPManager. More specifically, the diagram illustrates the entities involved with submitting, managing, distributing, recording, transmitting, receiving and tracking deposits and associated data. Banking, brokerage, retail and/or other organizations that receive deposits (e.g., checks) typically have multiple offices or branches 101a-101n at which a client 105 may make a deposit. Traditionally, an organization's branches have processed deposits manually. In the implementation illustrated in FIG. 1, branch locations 101a-101n utilize the remote image and data capture (discussed in greater detail in FIG. 2A) aspect of the DPManager to automate deposit processing. The images and data collected by the DPManager at the branches 101-103 are sent to a Central Site 110 for processing.

In one embodiment, the information contained on the checks and/or deposit slips is determined using Courtesy Amount Recognition/Legal Amount Recognition (CAR/LAR) and Intelligent Character Recognition (ICR) software. The collected information may be automatically validated against the organization's client data. In addition, the collected information may be reviewed electronically for fraud an invalid accounts using internal and/or commercial databases (e.g., MySQL, Oracle, Sybase, and the like). Necessary corrections to the check(s) and/or deposit slip may be made as needed. From the Central Site 110, validated deposits are transmitted to the organization's corporate systems 120 for posting, accounting processes, and customer service, and images are transmitted for clearing/remittance 130.

Clearing entities through which deposits may be cleared can include the Federal Reserve 131, outside banks 132, Endpoint Exchange 133, Small Value Payment Corporations (SVPCos) 134, and/or other clearing entities 135. In some embodiments, checks may be deposited electronically for clearing through an automated clearing house (ACH) network or image exchange directly with banks. Physical checks may be truncated at the branch, and substitute checks (IRDs) may be printed automatically.

In some embodiments of the DPManager, return check processing is automated and may be systematically tied to or associated with the original deposit. Clients may be sent a substitute check in lieu of the original check. One inventive aspect of the DPManager determines deposit delays based on the characteristics of the check deposited, the writer of the check, the deposit profile of the client, and/or other information. This delay smoothes the deposit process, allows for greater verification, reduction of errors, and minimization of fraudulent transactions. In one embodiment, deposited checks that have been imaged may be made available at corporate 120 for on-line viewing by clients 105 and/or employees of the organization.

In another embodiment, the DPManager provides the ability for small business clients 105 to scan checks at their office(s) for submission to the Central Site 110. This may be particularly advantageous to an organization, such as a bank, that implements the DPManager as it allows the bank to overcome the restrictions of having a limited number of branch locations and attract clients that may be located large distances from branch offices.

FIG. 1B illustrates a high level work-flow diagram of check deposit handling by the DPManager. The DPManager may initially employ a request loader to begin handling the check/deposit transaction workflow 155. Initially this involves various image capture facilities as will be described in further detail in FIG. 2A, which details branch scanning. Upon capturing and imitating a transaction in the DPManager workflow 155, the captured data goes through some preliminary validation 160 as will be discussed in greater detail below. In some cases, as the DPManager may loop in a work-flow with the DQ Edit component 19, which will be described in greater detail below, a re-validation 160 may take place. If errors are discerned in the captured check/deposit slip transaction 165, DPManager response extractor may write the transactions requiring repair to a data capture database table (e.g., EditReason table) 170. In one embodiment, The Response Extractor writes items to the EditReason table, which satisfies the following criteria:

1) The Transaction. WF State is set to WF (Workflow Finished),

2) The Transaction. Status is set to 1 (indicating failure of an item in the transaction against a validation process).

For each item in the transaction, if a validation status is set to 1, the reason codes associated with that validation step are written to the EditReason table. As such, the reason for the error may be used by the DQ Edit component 195 to sort the transaction based on the type of error so that it may be put into a proper queue, wherein systems or even people with specialization in dealing with such errors may monitor, adjust, fix, or otherwise deal with the flagged transactions.

Branch Scanning

Figure 2A:
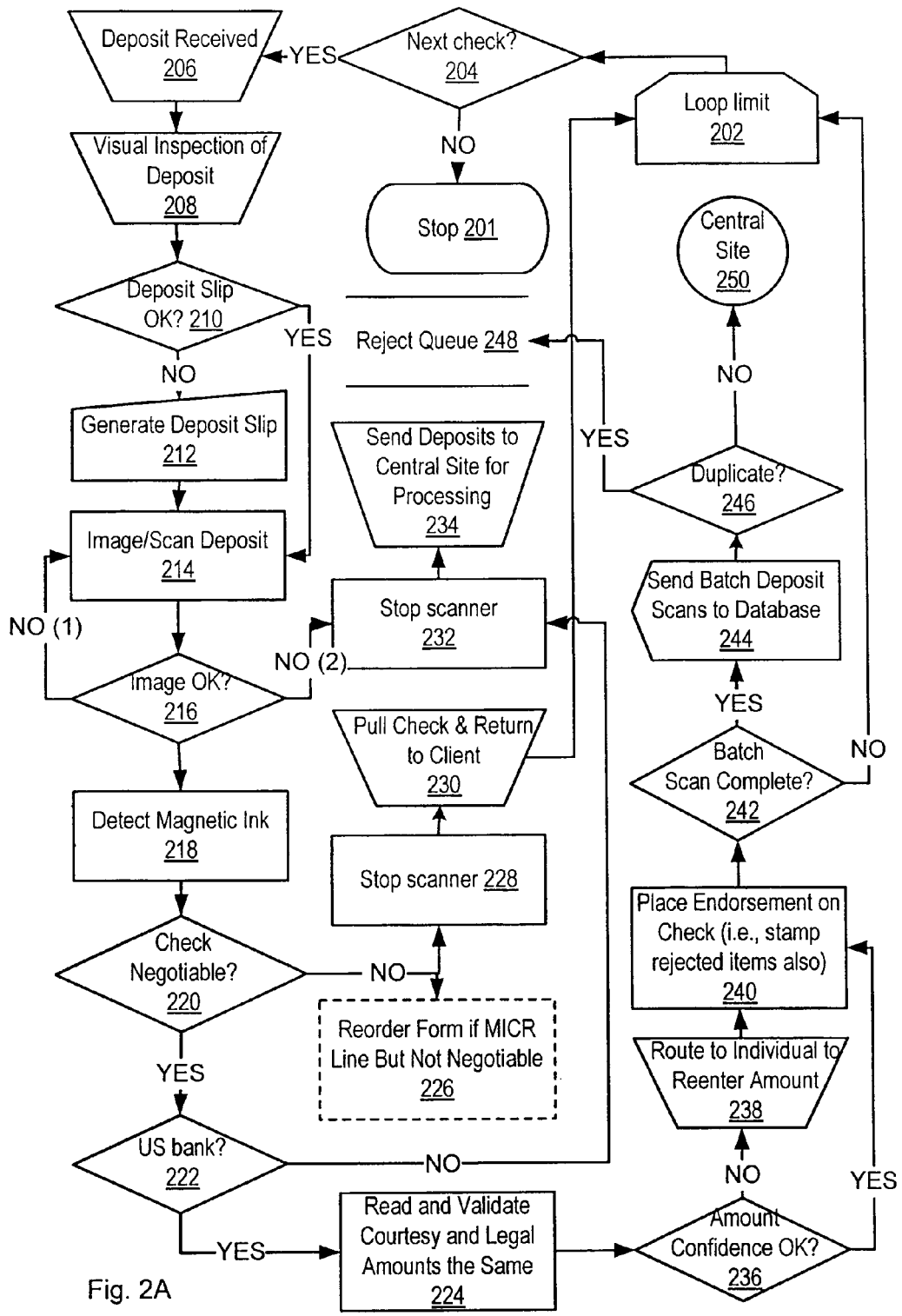
FIG. 2A illustrates the logic flow of the branch scanning aspect for an embodiment of the DPManager.

FIG. 2A provides an overview of the logic flow for the branch scanning aspect in an embodiment of the DPManager. The capture process begins when a deposit or deposits are received 206 at a branch office. Deposits may be received by mail, drop off, walk in and/or the like. In one embodiment, upon receipt of a deposit, branch office personnel perform a visual review of the deposit 208 to ensure the checks are payable to the client and negotiable. In a further embodiment, each deposit must include an acceptable deposit slip 210 or remittance document. If an acceptable deposit slip is not initially supplied, the branch office may generate one 212. The received deposits may then be scanned 214 using a desktop scanner or other imaging device. In one embodiment, upon scanning a check, the recognition of an account number or payee name and check value is used in retrieving account information, prepopulating a deposit slip, and printing the deposit slip for the client as a convenience.

In some embodiments, elements of the deposit may be imaged in a particular order, e.g., deposit slips scanned first and checks following, with any deposit slip reorders or check reorders scanned after checks. In one embodiment, deposit slips, as well as other forms, may be standardized, configured and/or redesigned to optimize the accurate capture of data and eliminate the need for additional sorting by product or size. For example, in one such embodiment, said forms include boxes for individual numbers and letters made with drop out ink.

A quality assessment of the check and the image may be performed during the scanning process. In order to assure the captured image complies with the required standards (e.g., ANSI X.937), the image may be evaluated by a number of Image Quality Assurance Edits. The DPManager may be configured to determine if all or a subset of the Image Quality Assurance Edits are used and/or a hierarchy of how they are applied. Image Quality Assurance Edits (with example thresholds) may include but are not limited to those shown below in Table 1.

TABLE 1

Sample Image Quality Assurance Edits and Thresholds

| | |
|---|---|
| Global Image Usability [90%] | Torn Corners [68%] |
| Signature [90%] | Document Length [90%] |
| Payee Name [95%] | Document Height [90%] |
| MICR Line [95%] | Document Skew [90%] |
| Legal Amount (Amount in Words) [90%] | Image Brightness [68%] |
| Courtesy Amount (Amount in Num.) [90%] | Noisy Image [90%] |
| Payor Name and Address [95%] | Image Length [90%] |
| Date Usability [95%] | Image Breadth [90%] |
| Streaks and/or Bands [90%] | Image DPI [95%] |
| Piggyback Image[90%] | Image Data Size [95%] |

The captured image is evaluated to determine if the image quality is acceptable 216. If the image quality is not acceptable, the deposit may be imaged/scanned 214 again. If the image quality is still not acceptable, the scanner is stopped 232 and the deposit is sent to a Central Site for processing 234. In one embodiment, image capture software (e.g., J&B Software) provides a confidence level for quality, and thresholds are established for items in Table 1 to ensure instrument quality. A minimum confidence level necessary to accept an entry may be decided, and if an item does not meet the required confidence level, it may be routed to be re-keyed (e.g., by a representative). Scanning software may also identify personal checks and corporate checks by size and/or the AUX-on field. In some embodiments, if a deposit includes multiple checks, of which only some are acceptable, a new deposit slip may be generated to accompany the rejected check or checks, and the original deposit slip modified for the accepted checks. If the deposit includes only one check or multiple checks, which are all unacceptable, the existing deposit slip may be used when the deposit is sent to the Central Site for processing.

The scan may also detect the presence of magnetic ink (i.e., an MICR line) on a document 218. In some embodiments, if the document has an MICR line, it is assumed to be a check and a negotiability review 220 may be performed, in one embodiment as part of the Image Quality Assurance Edits. For example, a negotiability review may determine whether a payee, legal amount line and signature are present through a Boolean verification if such parts are present and at sufficient quality. Non-negotiable checks may stop the scanner 228 and the check is pulled and returned to the client 230, and the process will continue with the next check 202. In certain embodiments, a reorder form may also have magnetic MICR ink; thus, in one embodiment, if a document fails all negotiability checks, it is assumed to be a reorder form 226 and will not stop the scanner.

For a negotiable check, the routing transit number in the MICR line may be used to determine whether the check is drawn on a US bank 222, i.e., the number is compared against a list of valid US bank routing numbers. Foreign bank checks may stop the scanner 232, and may be removed and returned to the client or sent via overnight mail to the Central Site for physical processing 234. The branch may be prevented from capturing foreign checks, non-negotiable checks, items with insufficient image quality, items which are impermissible to capture for regulatory reasons, and/or the like.

For acceptable checks, the DPManager may read the courtesy amount on the check and then read the legal amount to validate the courtesy read 224. In one embodiment, for example, DPManager may use courtesy amount recognition/legal amount recognition (CAR/LAR) software to validate the courtesy read. The DPManager then determines the confidence level of the read 236. If there is a low confidence level in the read of the amount, it will be routed to an individual to re-enter the amount 238. In one embodiment, this occurs at the Central Site at a later time. If the read has a high confidence level, a physical endorsement (e.g., stamp given by scanner) may then be put on the check 240 indicating it has been captured on image. In some embodiments, a stamp may also be provided for rejected items.

Once the branch has completed scanning a set of checks and/or deposits, the scanned items are then transmitted to a database (e.g., data center) 244. Upon receipt, the scanned items (e.g., checks) are systematically reviewed to determine if any of the items have been received previously 246. Any duplicates are sent to the reject queue 248 and non-duplicates are sent to the Central Site 250 for processing. In one embodiment, an operator at the branch may initiate the transmission process (e.g., by clicking a "Submit" button). Alternatively, or in addition, if a scanning session is in progress and there have been no documents scanned for a defined time period, a systematically generated command may be given to complete the open scanning session and transmit the image and data. The branch may receive an acknowledgement message from Central Site indicating that the image and data has been successfully received. In one embodiment, each image has a unique ID assigned to it, and may be included in a report containing a summary list of transactions, transmitted by the branch to the Central Site. In one embodiment, the unique ID comprises the date, time, branch ID, and transaction number for the day. Access to this report may be provided to users at the branch. If a problem occurs with the transmission, the branch may re-transmit the transmission.

In some embodiments, check storage and maintenance aspects of the DPManager may include, but are not limited to: providing an intra-day view of check and deposit slip images, which may be stored locally (e.g., on a branch server) or externally; systematically deleting image information stored on branch servers after a specified time period has elapsed since the last interaction with the information; and/or securely retaining original checks for a specified time period, until appropriately destroyed (e.g., via secure shredding). In one embodiment, the maintenance is set to comply with institutional and/or regulatory document retention policies. The branch may print a summary list of all units of work transmitted to the Central Site on a daily basis, and the list may be stored with the checks.

Client Scanning

The DPManager may also provide business clients with the ability to scan their deposits at their office location. One implementation provides the client with an on-line deposit slip to enter the deposit and check information for only the client's accounts. The client may scan the check(s) using the appropriate scanner and the images and data are transmitted to the Central Site, where they are balanced and validated along with the branch deposits. In one embodiment, the client would register at a branch for remote scanning and be given remote authentication code(s). In one embodiment, the codes are digital certificates. In another embodiment, it is a digital encryption key, paired to a branch digital certificate. In another embodiment, it is a password. As such, the code is used to authenticate uploads of check scans. The scans may, in such an embodiment, be produced from consumer-grade scanners (e.g., Hewlett Packard ScanJet scanners) at specific resolutions and formats, e.g., tiff at 600 dpi, pdf at 300 dpi, etc. In another embodiment, a branch-grade scanner is required (e.g., Panini MyVision X desktop scanner). In another embodiment, the scanner has an embedded authentication code. Access to such accounts may be restricted. Another implementation requires both a deposit slip and checks to be scanned so that executives of the client's business can make personal deposits. These deposits may operate similar to branch deposits.

A further implementation may be provided where the deposit is for remittance processing. In such a case, clients receive payment coupons and checks from their clients. The DPManager may provide a standardized coupon format or may be configured to support a customized format. The client specifies the account and scans the coupons and checks. The items are transmitted and processed along with branch deposits. The DPManager may create a file of payments, which the client may download and post to their receivables system. Remittance clients may also request to clear their deposits via accounts receivable check (ARC) conversion rather than by check. Deposits to be cleared through ARC may be limited to a specific accounts set up by the client for that purpose.

Figure 2B:
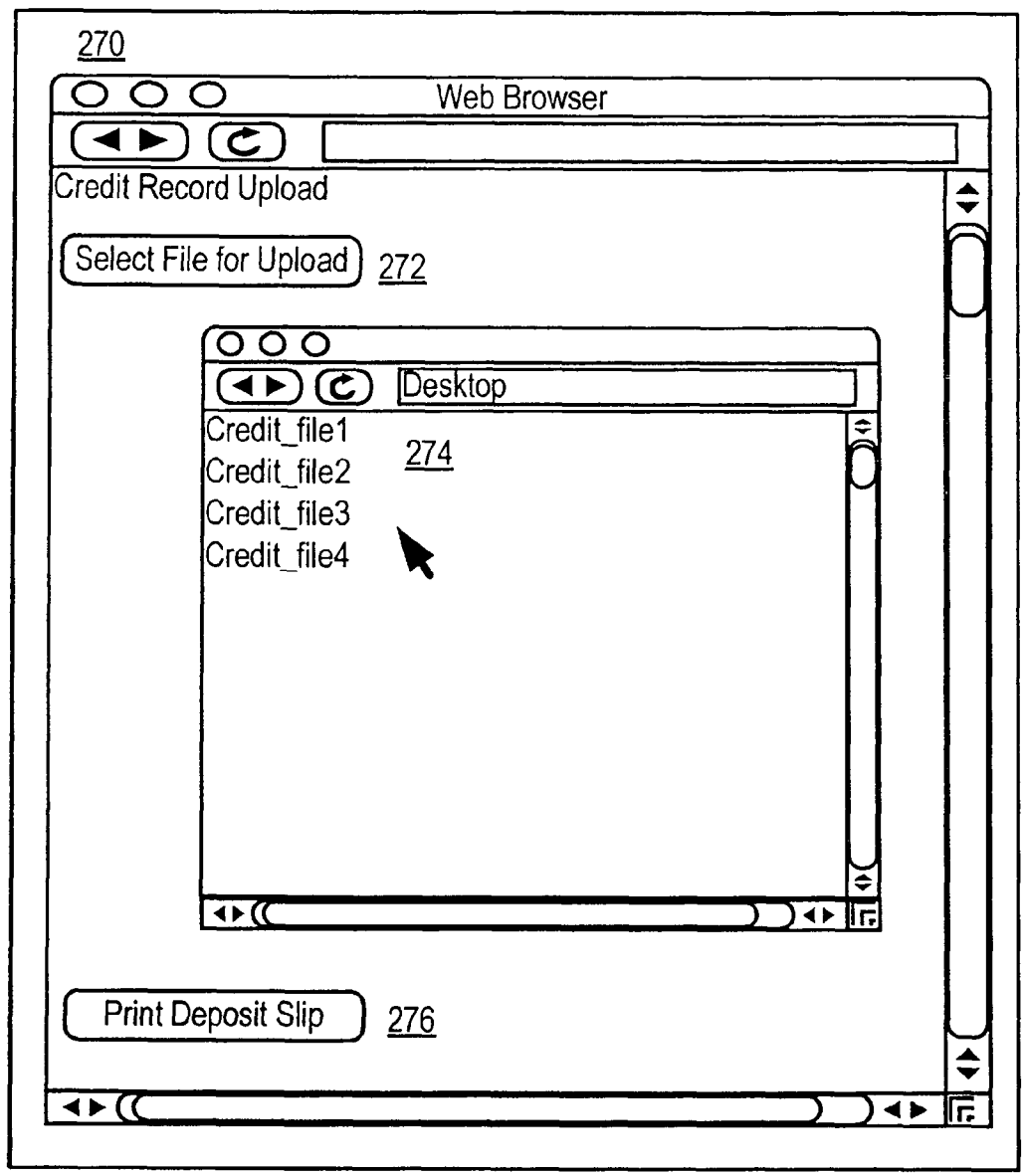
FIG. 2B illustrates aspects of file upload for an embodiment of the DPManager.

In one embodiment, a file upload facility may be provided for certain clients with retirement plans that make regular deposits to multiple accounts. The client may create a file of credit records and upload it to the DPManager via a suitable interface (e.g., a tab delimited file via HTTP post upload). FIG. 2B provides an example view illustrating an aspect of the file upload interface for a particular implementation of an embodiment of the DPManager. By utilizing the file upload interface 270, a user can click the select file for upload button 272 (e.g., as implemented in a web page of a web browser 270, and identify the desired file or files for upload by electing them in a dialogue box 274. In a further embodiment, the user may also print a deposit slip 276 reflecting the associated file(s). The client may then deposit check(s) with the deposit slip that cross-references the uploaded file. In some embodiments, the DPManager may automatically create deposit records based on the upload file and process those items with other deposits with all the same edits and validations.

Central Site

Image files and associated data may be sent to the Central Site via a number of methods, including but not limited to: remote site push from a branch site (e.g., via a proprietary network), remote site push from a client site (e.g., via the Internet), Central Site scan directly to the server (e.g., using a branch capture push scenario). In one embodiment, the sending process may be initiated manually. In the alternative, or in addition, image files and associated data may be sent automatically. In another embodiment, image files and data are queued and sent in batches at specific intervals (e.g., via FTP at CRON specified times).

Figure 3A:
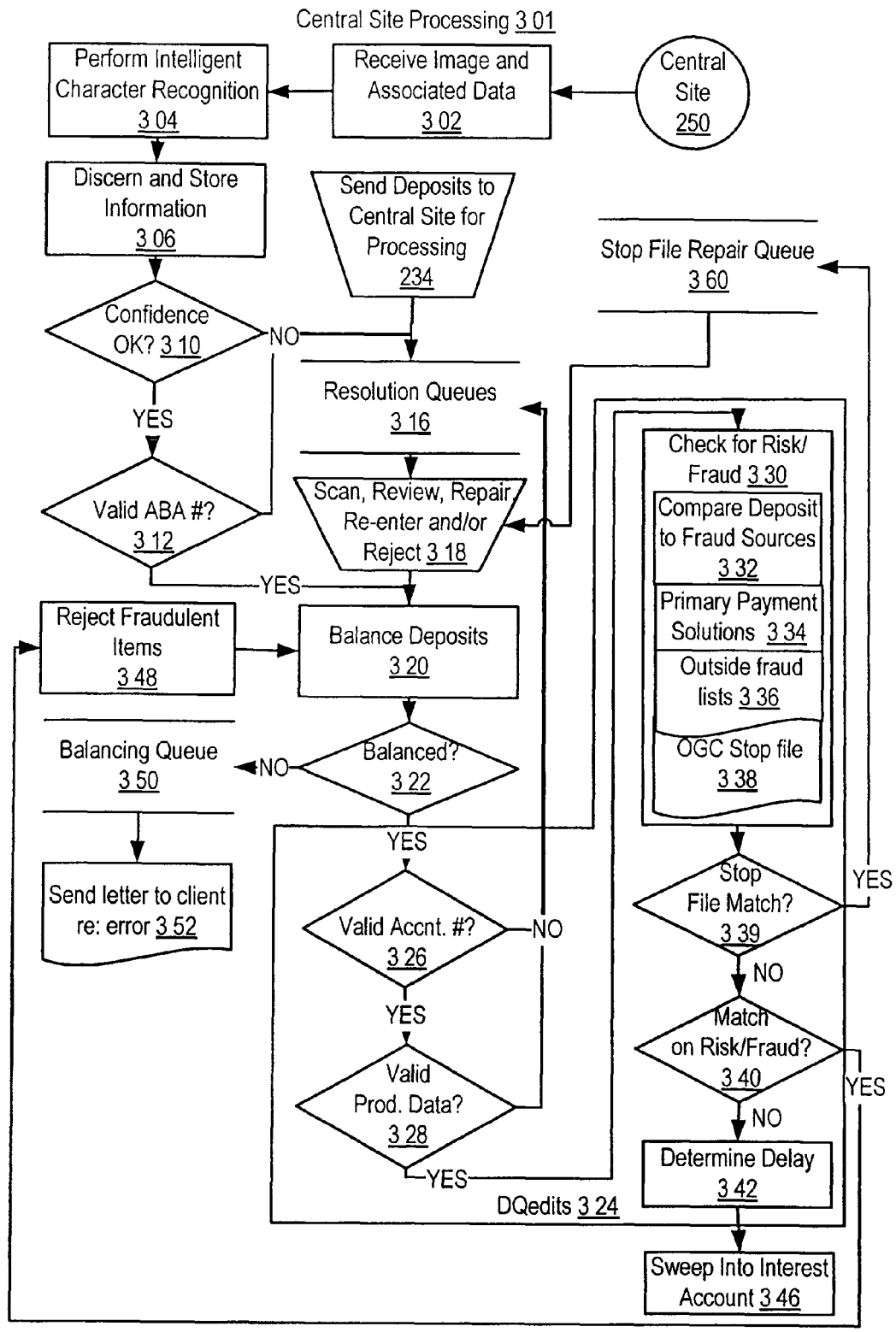
FIG. 3A illustrates the logic flow of the Central Site processing aspect of an embodiment of the DPManager.

In one embodiment, as shown in FIG. 3A, the sent image files and associated data are received at the Central Site 302. For an image file, the associated data may include but is not limited to: image and a data file ID, MICR information, negotiability information, sequence numbers relating to each image (which may include branch ID information, time of scan, date of scan), and/or other relevant information. In one embodiment, an image and data monitor, located at the Central Site, is continuously updated when new image files and associated data are received from a remote capture and/or Central Site scanner. In a further embodiment, the monitor may reflect the number of images and/or location of the initial scan.

In some embodiments, intelligent character recognition 304 is performed to capture, discern and/or store data from the checks and scanline deposit slips 306. Other deposit slips may also be read (e.g., using iPage or the like). The data captured may include bank routing number, ABA number, bank account number, DDA number, check type, check number, document type, form number, account number, account name, amount, product code, payee, and/or payor. Table 2 lists sample check data capture processes and outcomes for an embodiment of the DPManager.

TABLE 2

| Data Capture - Checks | | | | |
| --- | --- | --- | --- | --- |
| Data Fields | Location | Anticipated Software Edit | Process 1 | Result |
| ABA# (9 digits) | Check MICR | MICR | Readability | Yes - Store in database No - send to repair |

TABLE 2-continued

Data Capture - Checks

| Data Fields | Location | Anticipated Software Edit | Process 1 | Result |
|---|---|---|---|---|
| DDA # (13 digits) | Check MICR | MICR | Readability | Yes - Store in database No - send to repair queue for completion |
| Check # (3-10 digits maximum) | Check MICR | MICR | Readability | Yes - Store in database No - send to repair queue for completion |
| Auxiliary # (Business Checks Only) (3-15 digits maximum) | Check MICR | MICR | Readability | Yes - Store in database No - send to repair queue for completion |
| Check Amount | Check | CAR/LAR | Readability | Yes - Store in database No - send to repair queue for completion |
| Check Type Coding | MICR | MICR Line | Compare check MICR data against cash-like instrument MICR data | If a match is returned - System will code as appropriase instrument No Match - Send to repair queue for completion |

In some embodiments, elements of the captured data, such as the identified check type, may be used later in delay processing. A confidence level for the captured data is determined 310. If there is a low confidence level in the captured data, the document will be routed to one of a number of resolution queues 316, one of which may be a queue for re-entry by an individual. If there is a high confidence level for the captured data, the ABA number may then be validated 312 (e.g., validating the check digit and/or via Accuity and/or the like). Items with invalid ABA numbers are sent to resolution queues 316 for repair or rejection.

In some embodiments, initial software edits may be performed on the images for readability, and may include forms recognition, check edits, and deposit slip edits. Image and data files received may be divided in transactions (e.g., deposit slips and associated checks) and items (e.g., checks, or for a split deposit, accounts). In one embodiment, transactions and items may be sorted by amount for prioritization through queues.

In one embodiment, data fields from checks and associated deposit slips which meet certain established readability and/or confidence levels for selected edits may be automatically stored in the transaction data record. Items not meeting the necessary readability and/or confidence levels may be systematically sent to repair queues for manual editing.

As discussed above, paper checks may also be sent from the branches to the Central Site 234. In one embodiment, foreign checks sent from branch offices to the Central Site may be deposited at an outside bank and posted manually. However, the items may still be processed via one of the resolution queues 316 and imaged for archival purposes. In another embodiment, the DPManager may provide automated MICR-line-based-information coding for checks requiring ABA number and/or DDA number for determination (e.g., cashiers checks, USD denominated foreign bank drafts, and/or the like). For example in one embodiment, traveler's checks and money orders are determined based the DDA number, and government checks determined by referencing a database of ABA/DDA numbers.

Checks that do not pass the Image Quality Assurance Edits are also sent from the branch offices to the Central Site for entry into one of resolution queues 316. These checks may be scanned, repaired manually and/or processed 318 by the DPManager. However, in some embodiments, these items may not be included on an image cash letter file if the image is unacceptable, and may be deposited physically with an outside bank.

Once all the data has been read/repaired, batches of deposits are balanced 320. Any out of balance items 322 will route to a balancing queue 350 to be corrected. The imbalance may be the result of a bad read of a check or deposit slip, a check rejected during scanning, client error on the deposit slip, and/or the like. A letter may be sent to the client 352 in the case of client error and/or if rejections occur at a later time.

DQ Edits

Balanced items then go through a number of validation checks (DQ Edits) 324. In one embodiment, an Account Look-up Edit validates account number data 326 with the appropriate internal system. For example, verification of account number data may include ensuring that the account number is valid (i.e., matches a valid account number in an database accounts table) and ensuring the account type matches the deposit slip type. The Account Look-up Edit may also match the account name and the account number, for example, systematically or manually capturing handwritten account number data and comparing it to the account name. The Account Look-up Edit may match the name from a deposit slip to the account, and may also confirm the name on the check or checks matches the deposit slip. In one implementation, branch personnel confirm that the name on a check matches the name on the deposit slip. In an additional embodiment, the Account Look-up Edit verifies the journal entry debiting account number for retirement products. The results of the Account Look-up Edit are recorded, and items with errors are sent to resolution queues 316 to be resolved. In some embodiments, resolution may require additional communication (e.g., a phone call) with the appropriate branch office. Items with validated account number data continue on in the process.

In some embodiments, a Product Data Edit component of DQEdits validates product related data 328. Product data issues may include deposit slip and account type mismatches, over-contributions to retirement accounts and other product issues. In one embodiment, the Product Data Edit may validate product coding for items relating to retirement and other such products. For example, validation of retirement product related coding may include validation of contribution year, contribution amount, deductible/non-deductible contribution type, and/or salary-deferral/employee/employer contribution type. Product coding validation for non-retirement products may include, for example, verifying tax code and P/I indicator for trust deposits, verifying loan number information for credit payments, requiring signoff as indicator to automatically place trade instructions for ready asset deposits, verifying commodity coding, reviewing client deposit account for margin requirements as necessary, and/or verifying new account indicator from deposit slips. In one embodiment, the values obtained from instrument capture are used as a basis to select records and values from an account database and determine validity if the account records match the values, or that the values do not fall outside an acceptable threshold (e.g., if a deposit puts an account over a retirement and/or regulatory contribution threshold specified in a client account profile). Deposits with product data issues (i.e., invalid, incomplete or incorrect transactions) are sent to queues 316 to be reviewed and/or resolved. Some of these issues may require repair and some may be overridden. Items that are corrected may require new review to verify the updated/corrected data.

Deposits may then be checked for risk and/or fraud 330. For fraud prevention and compliance purposes, deposits are compared to lists or databases of known risk/fraud sources 332. Such information sources may include Primary Payments Systems (PPS) 334, other outside fraud lists 336 and/or an Office of the General Counsel (OGC) Stop File 338. PPS provides information on closed and high risk accounts from a large number of banks around the country. The DPManager may communicate with PPS and other outside fraud lists to determine the risk factors associated with a particular check and/or deposit. For example, MICR data from a check may be passed to PPS and, using the MICR data, PPS may assign a risk value (e.g., 001-499) for the check. The DPManager then receives and stores the risk value and associates the risk value with the check. If no value is received from PPS, a default risk value may be assigned. In one embodiment, communication with the PPS may be initiated only if a specified amount threshold is reached. For example, if the amount threshold is $1000, a check for $300 would not initiate communication with PPS. The risk value of the check may be used in determining the deposit delay 342 for the check.

The OGC Stop File 338 is an internal file or table indicating accounts or check types that cannot be accepted. The table may include data fields for account numbers, ABA numbers, DDA numbers with specific ABA numbers, checks with individual check types and/or the like. Individual entries on the table may contain the reason the entry is included in the file. For example, an entry in the OGC Stop File may indicate an account that has a block against it, an account with an excess of return deposits, an account with an excess of cash-like deposits (e.g., money orders, travelers checks, cashier's checks), fraud and/or the like.

In one embodiment, a Stop File Edit compares deposit account information and MICR data to the OGC Stop File and the results recorded. If a hit is made on an account number or account number/check type combination for an active entry on the Stop File 339, the deposit or check is flagged as an error and sent to a Stop File repair queue 360. Similarly, a hit on an ABA number or ABA number/DDA number combination for an active entry on the Stop file 339 may flag the particular ABA number or ABA number/DDA number as an error and send the deposit or check to the Stop File repair queue 360. The corresponding reason code on the Stop File entry may be sent to the Stop File repair queue to display the reason why the deposit or check is being stopped.

In a further embodiment, if only an individual element of the deposit (e.g., a single check) is the cause for the stop file hit, only the element in error is flagged. However, information for the whole deposit may be accessed from the repair queue to facilitate repair. In one embodiment, elements may go into a manual review queue to be repaired, accepted and/or rejected 318. Elements which cannot be easily repaired may remain in this queue until accepted or rejected. In a further embodiment, a user interface is provided allowing rejected items to be pushed to a reject queue using a hot key push, dropdown box, text box, and/or the like may be provided to allow the user to enter the reason(s) for rejection.

Using the results of the risk/fraud evaluation 330, the DPManager determines whether to accept or reject the deposit or check 340. In one embodiment, if the deposit is determined to be fraudulent (e.g., there is a match on the OGC Stop File), the entire deposit may be rejected. Alternatively, if only some of the elements of the deposit are fraudulent, those elements may be rejected 342 and the rest of the deposit may be rebalanced 322 and reprocessed.

Figure 3B1:
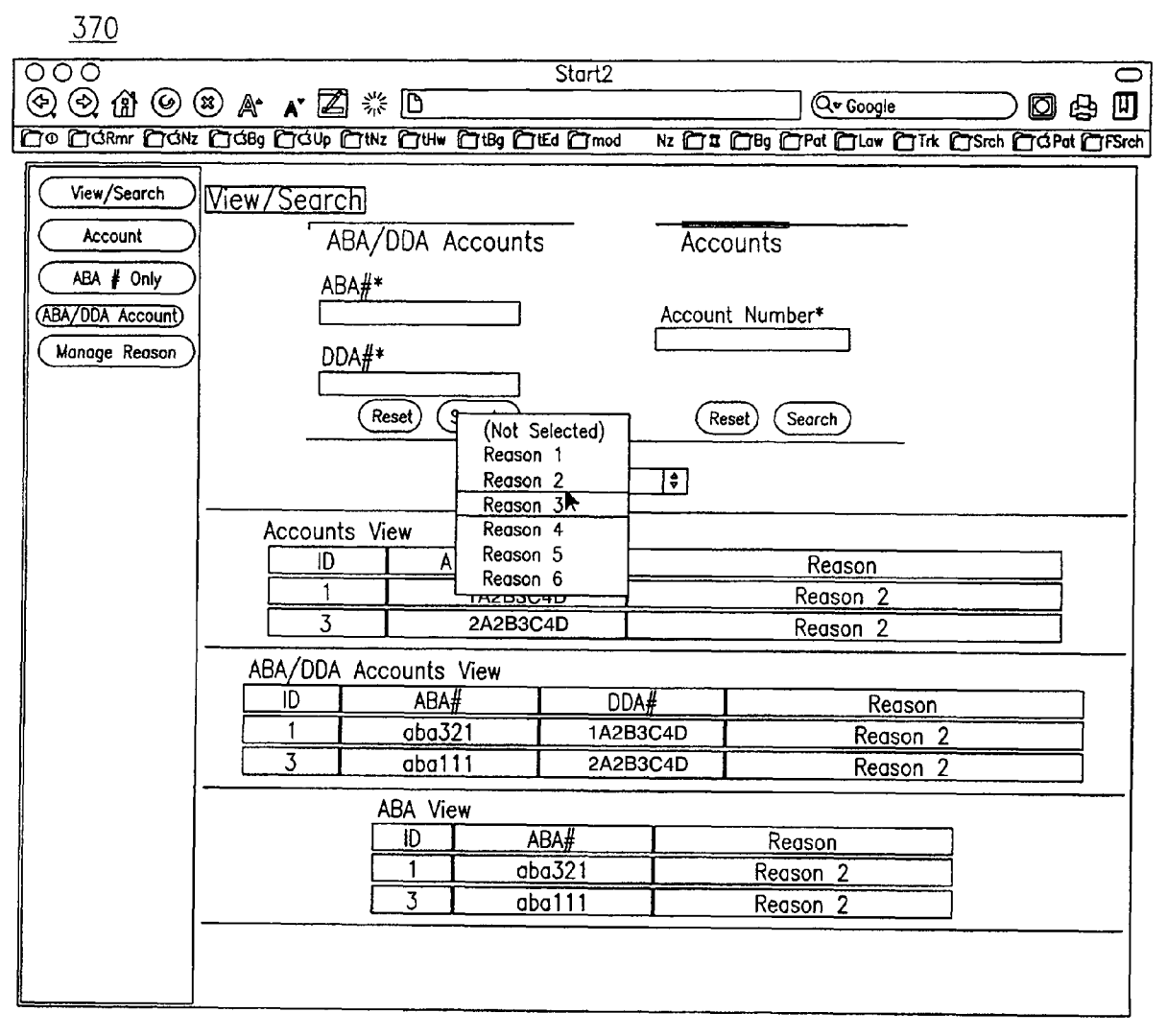
Figure 3B2:
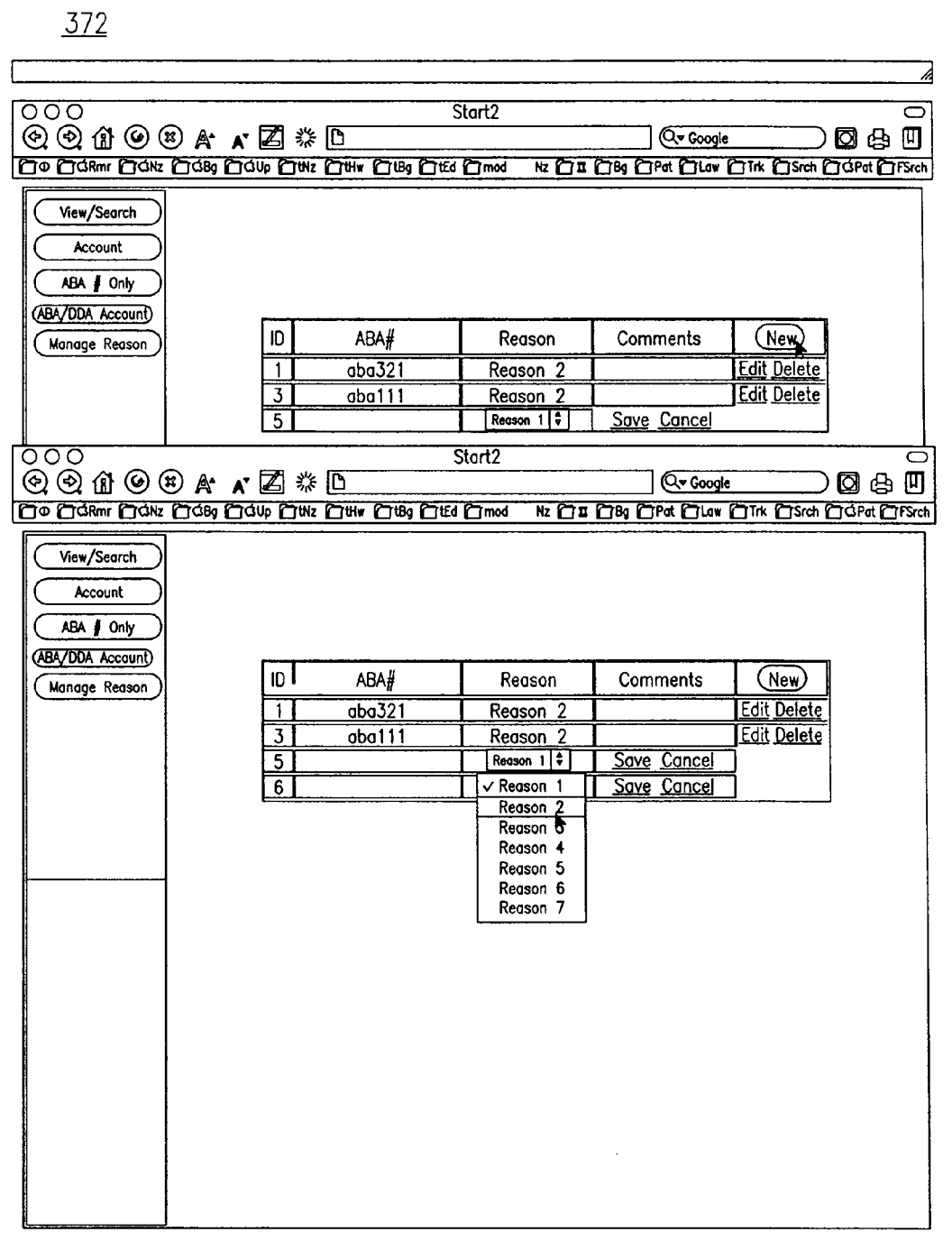
Figure 3B4:
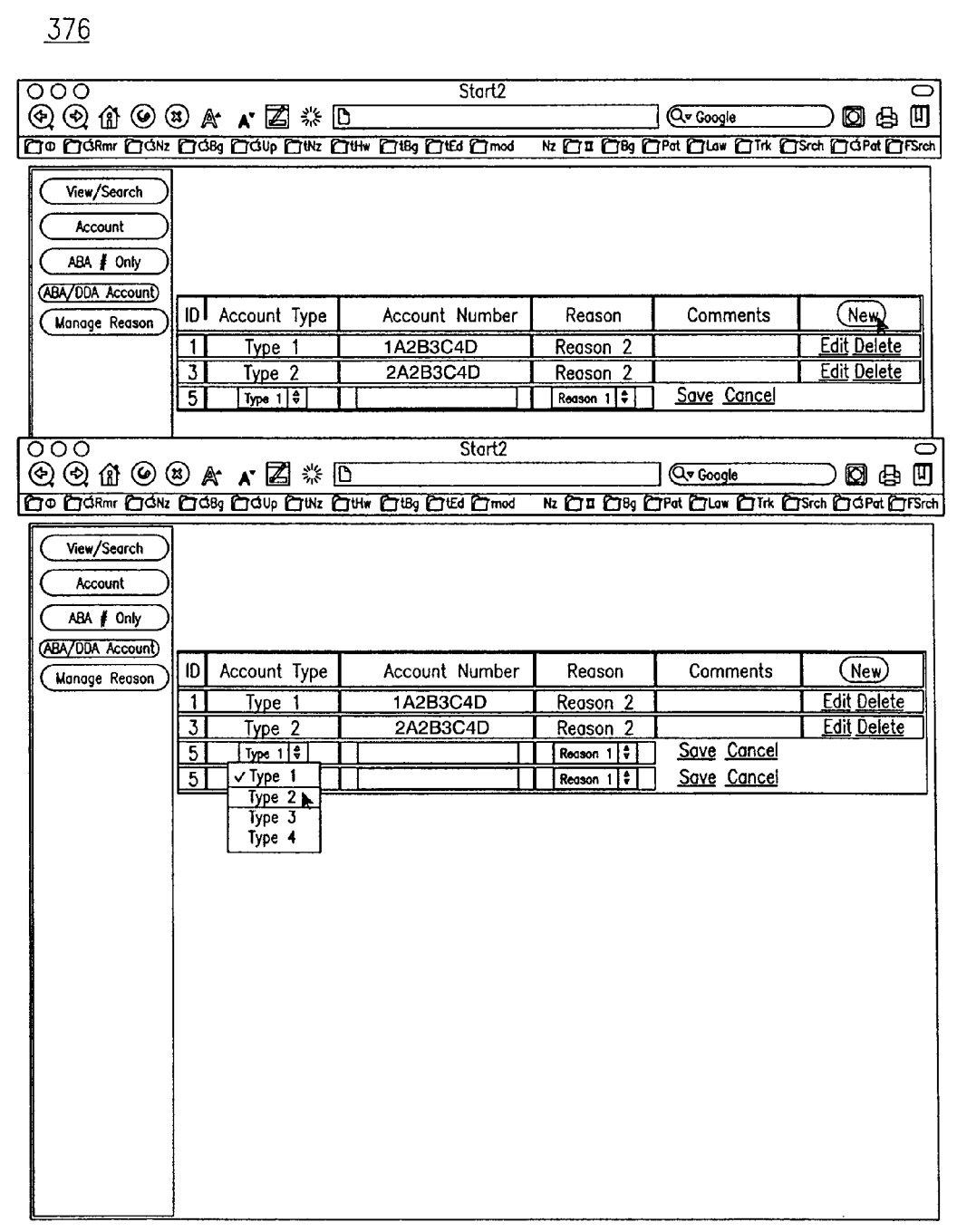

In one embodiment, the DPManager provides a user interface allowing appropriate users (e.g., Central Site or OGC personnel) to review, change, inactivate, add and/or delete entries in the OGC Stop File. In one implementation, the stop file interface may be provided via a browser and/or web based application. FIG. 3B provides example screenshots of a stop file interface for a particular implementation of an embodiment of the DPManager. By utilizing the view/search interface 370, a user can review entries in the stop file by account number, account and check type, ABA number, a combination of ABA number and DDA number, and/or the like. The user may review the results, which may include the entry field, entry field type, the reason for the stop, comments, and/or date entered.

In some embodiments, a user may add new entries to and/or edit entries in the stop file by specifying an entry field, including account number 376, account and check type, ABA number 372, a combination of ABA number and DDA number 378, and/or the like, and entering the appropriate data in the provided field. For example, if the user specifies ABA number in the entry field 372, the user must enter a valid ABA number in the provided ABA number field. In another example, if the user specifies account number in the entry field 376, the user must enter the appropriate account number as specified, and in some embodiments, also enter or select a check type. Similarly, if the user specifies a combination of ABA number and DDA number 378, the appropriate data must be entered.

Figure 8E:
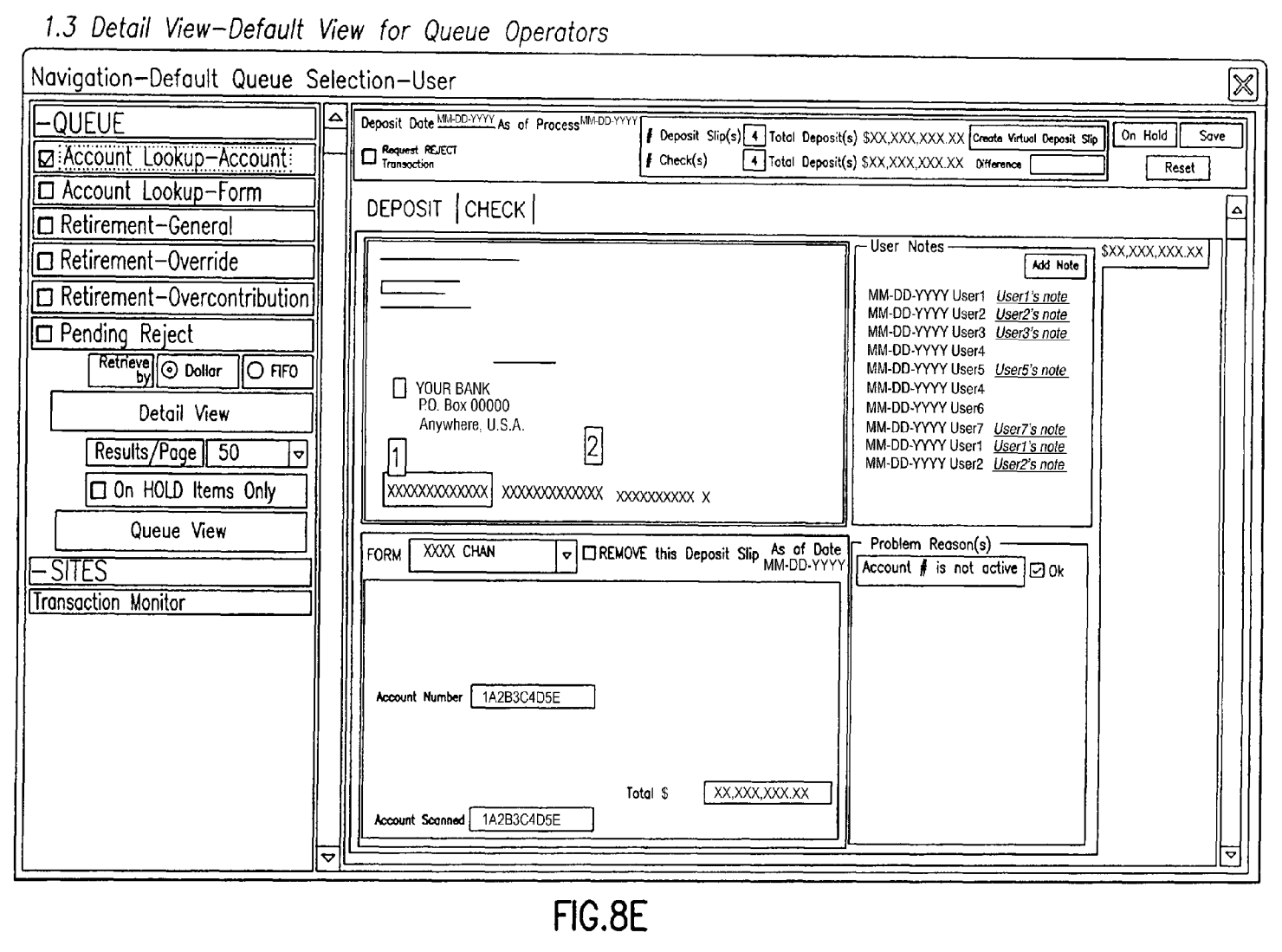
Figure 8F:
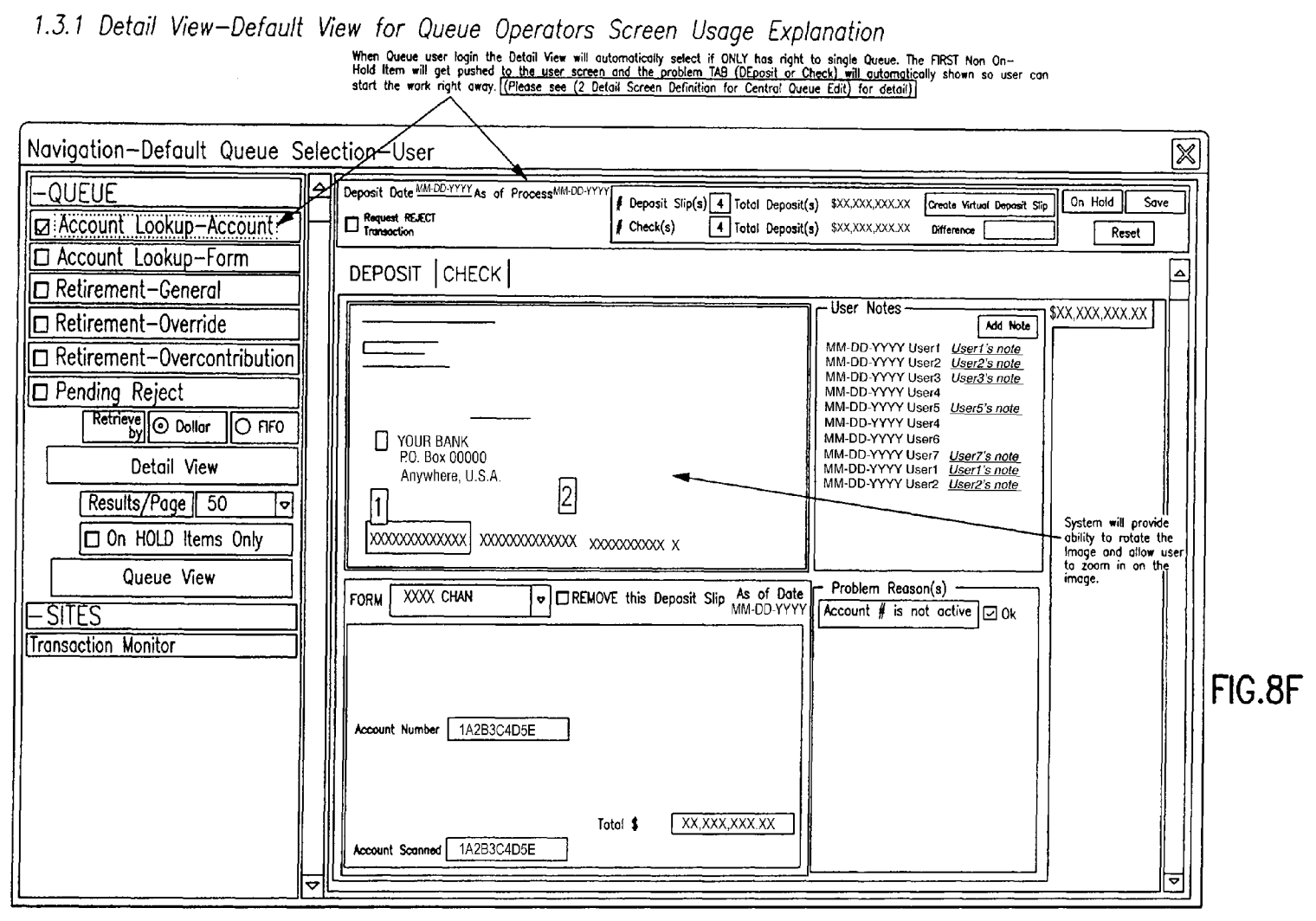
Figure 8K:
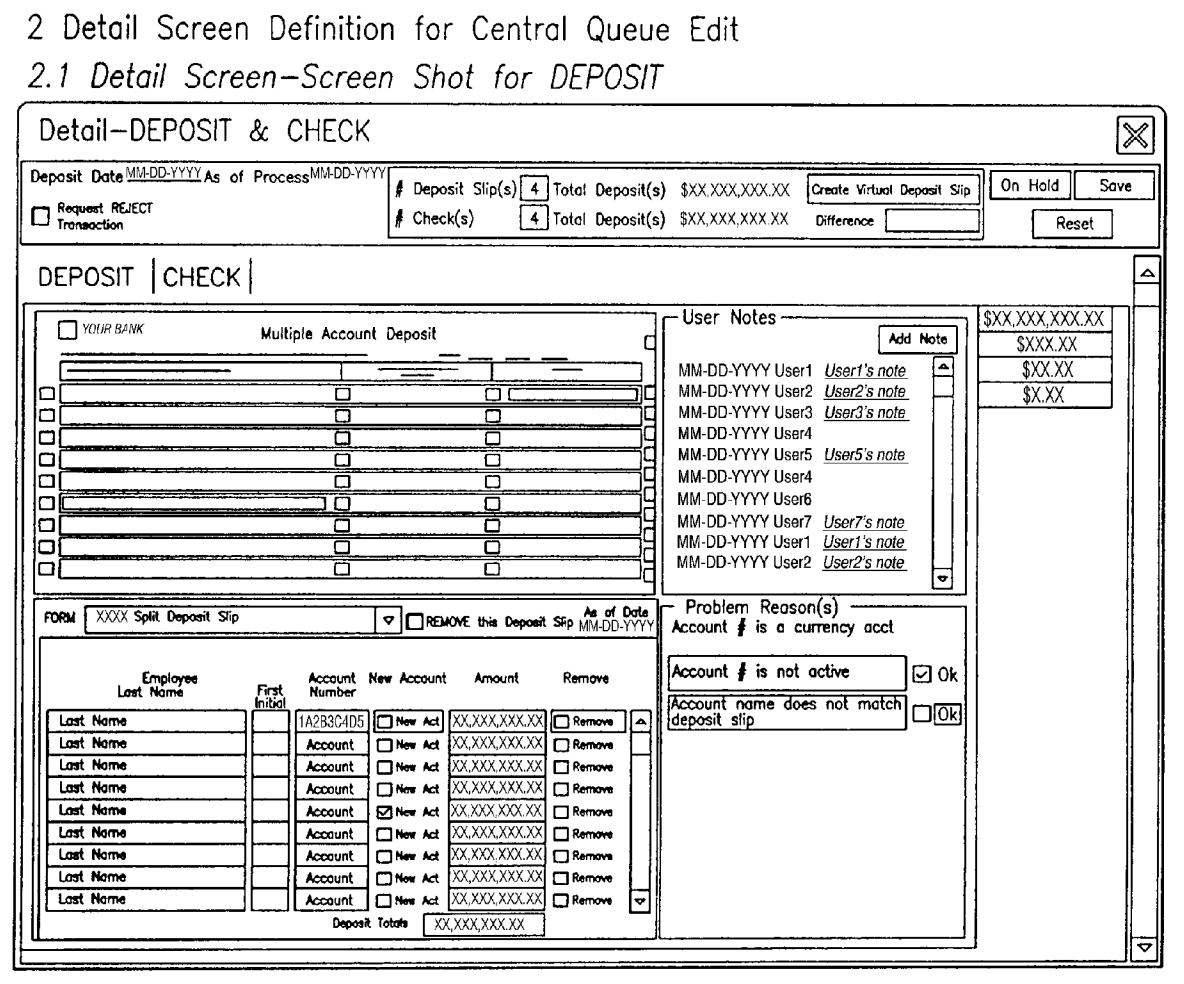
Figure 8L:
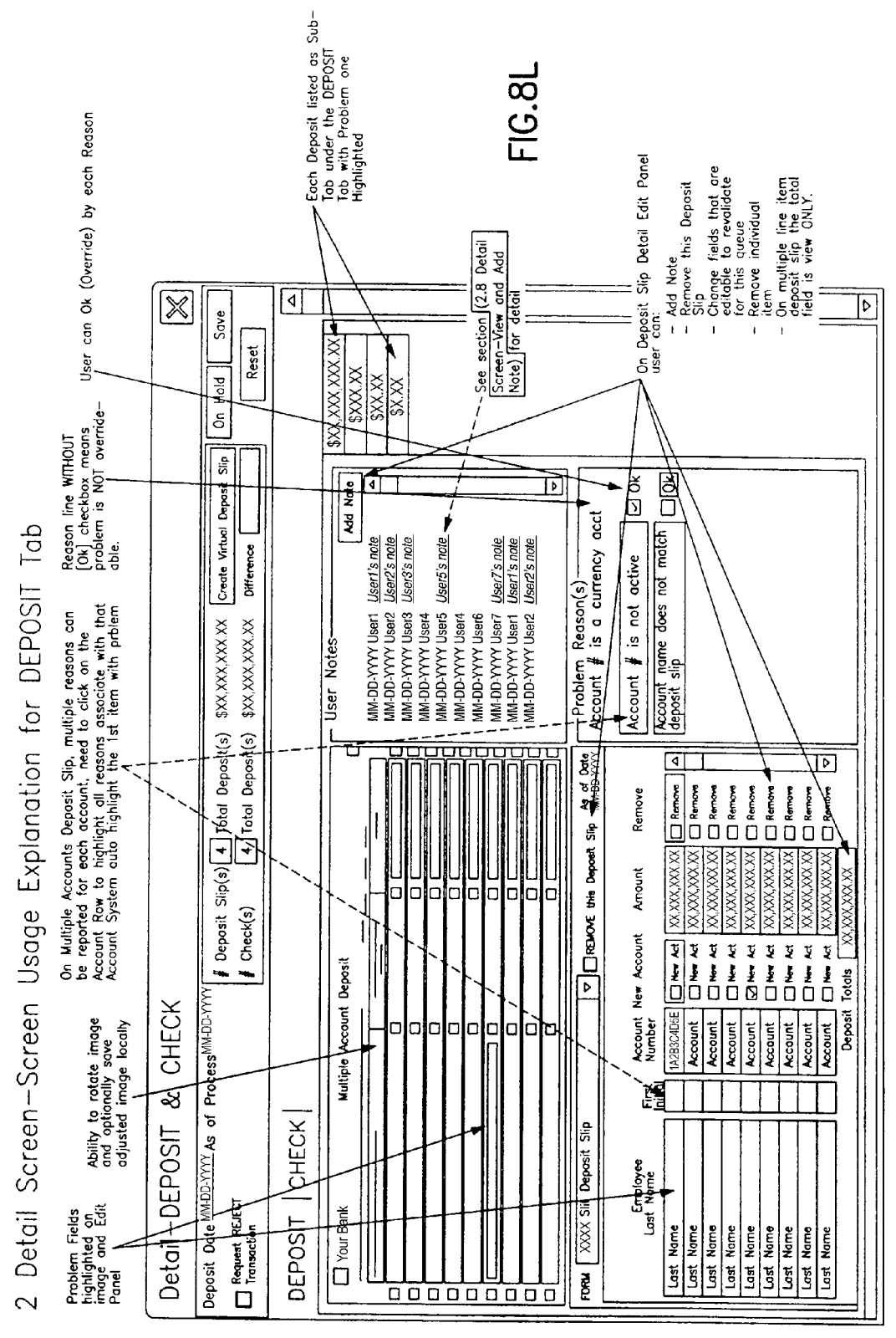
Figure 8R:
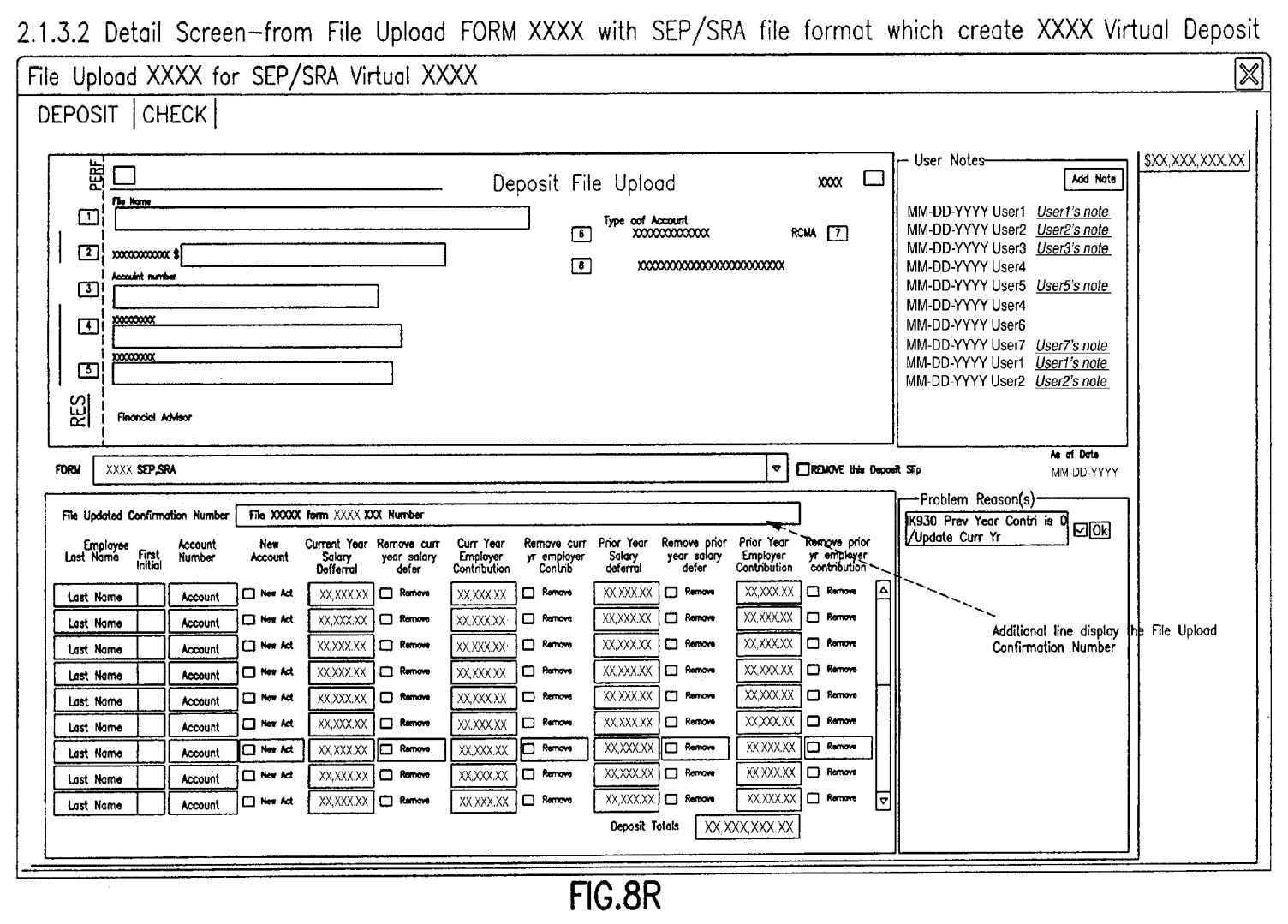
Figure 8S:
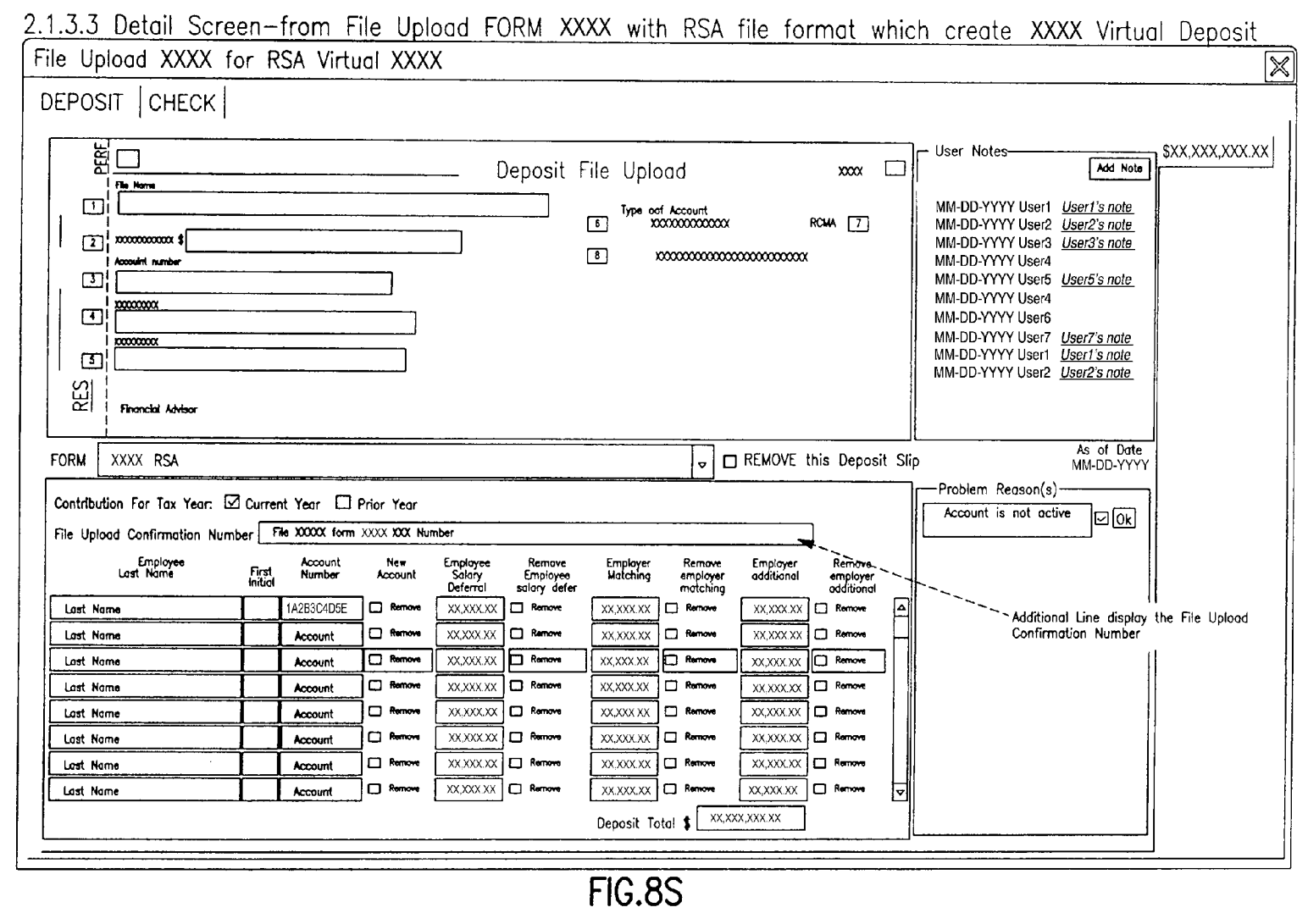
Figure 8U:
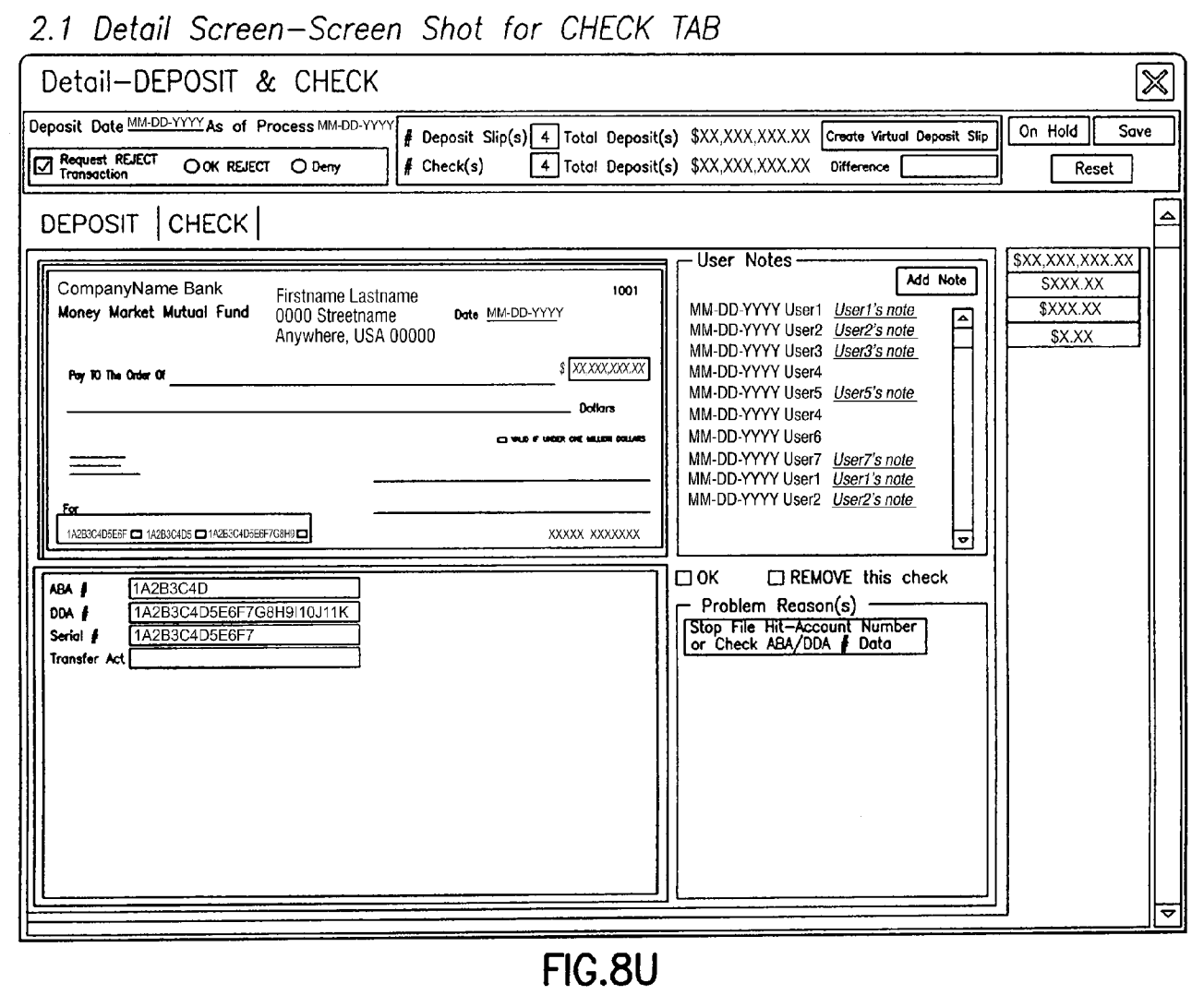
Figure 8V:
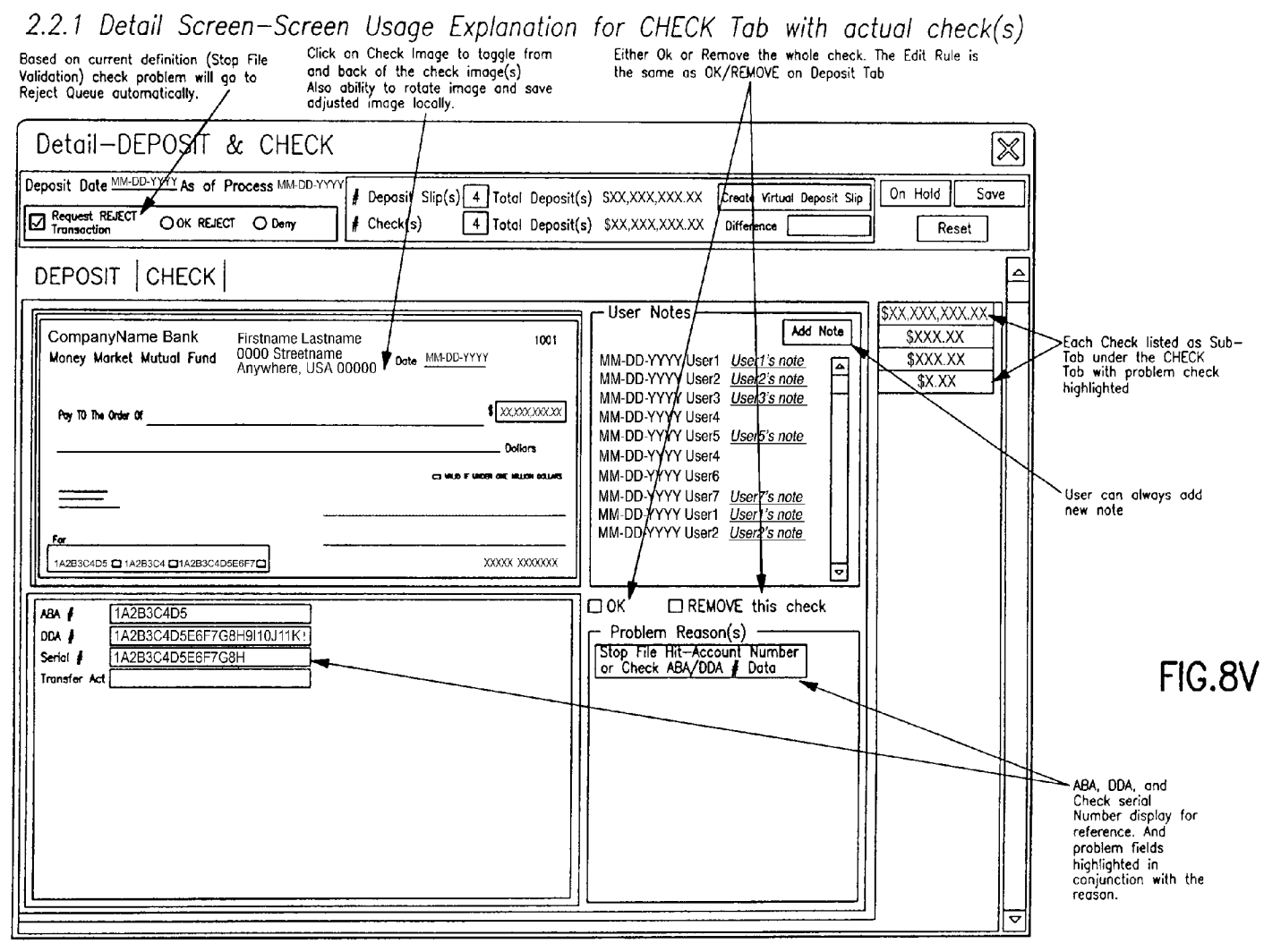

FIGS. 8A through 8HH illustrate numerous aspects and user interface interactions of the DQ Edit component of the DPManager. One novel aspect of the DPManager that extends to the DQ Edit component is the ability to view, employ, edit and correct data in both an image of a deposit form and an associated/accompanying screen edit panel for the image of that deposit form; Appendix 1 shows numerous non-limiting example sample image deposit forms and associated screen edit panels. Use of such associated image deposit forms and associated screen edit panels may be seen throughout FIGS. 8E, 8F, 8K-8T, 8CC, 8DD and 8FF-8HH. Also, the DPManager, similarly, provides a facility to view, employ, edit and correct data in both an image of a check and associated/accompanying screen edit panel for the image of that check as may be seen in FIGS. 8U-8W and 8BB.

In some embodiments, the DPManager may prompt the user to enter certain data (such as account number, ABA number, and/or DDA number) twice to avoid entry errors and the associated complications. The user may also enter a reason code specifying the reason for the new stop file entry and comments (e.g., via freeform text) that are associated with the new stop file entry, and save the new stop file. In one embodiment, the user may edit the reason code and/or reason description 374. In some embodiments, the reason code and/or comments are displayed on the stop file repair queue 360 if a hit is made on the stop file.

Delay Matrix

While most deposits may sweep into an interest bearing account, money market fund, and/or the like 346 the next business day, a delay may be assigned to the deposit 342 for withdrawal purposes. In one embodiment, deposit delays may be assigned on an individual check basis, even on bulk transactions. The results of a match on the PPS System, as well as number of other factors, may be reflected in the DPManager determined delay 342.

In one embodiment, the DPManager processes inputs such as check level, client level, account level and/or check payor level and uses these inputs in calculating the output, i.e., the number of days of delay before a deposit becomes available. Table 4 lists input parameters and descriptions for an embodiment of the DPManager.

TABLE 4

Input Parameters for Determining Delay

| Input Parameter | Description |
| --- | --- |
| Client Segment | Segment Type of Account |
| LOS | Length of Stay of Account in days/Or Length of Stay of the client if LOS for Account is <1 year |
| Check Type | Type of check (e.g., Cashier's, Government) |
| PPS Score | PPS Score or Status provided by ML front-end |
| Deposit Profile Score | Provides a score between 0-999. |
| Is-MICR | Denotes if magnetic ink is present or not |
| Routing Number | Denotes if routing number is on exclusion list |
| Baseline Availability | Baseline Availability (based on Clearing Method & Check Posting Time). |

For a particular deposit or check, the DPManager processes the associated inputs and computes an output for the total number of days before the deposit or check amount becomes available. Default delay values may be assigned in case input parameters are missing (i.e., a default delay value will always be output even if all inputs are missing). In one embodiment, the computed delay is a value between zero and a specified maximum delay period (i.e., the de facto minimum delay cannot be less than zero and the maximum delay may be less than the sum of maximum individually assigned delays). In an alternative embodiment, the delay is negative, which acts as a flag to expedite processing ahead of other transactions. Such a setting may be of value for highly trusted, valued clients, with a need to expedite a transaction. In a further embodiment, the DPManager may allow the appropriate users to configure/modify the maximum delay value via a user interface.

Figure 4B:
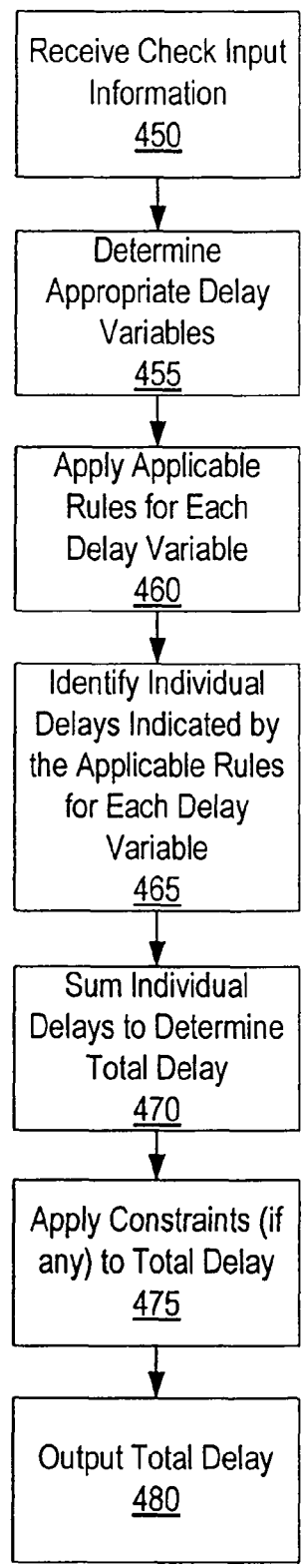

In some embodiments, the DPManager uses a delay matrix in calculating the appropriate delay. FIG. 4A shows an example delay matrix and FIG. 4B shows an example flow diagram for an embodiment of the DPManager. The delay matrix includes a factor or variable category 400, a rule category 410, and a delay category. Variables in the delay matrix may include check type 401, base line availability 402, segment 403, length of stay (LOS) of the client 404, PPS System matching results 405 and/or other relevant variables.

As shown in FIG. 4A, each variable 401-405 has a rule or rules associated with it 411-415, and each of the rules 411-415 has a respective set of delays 421-425. For example, the check type variable 401 has a rule 411 indicating that if the check is a cashiers check, travelers check, government or official check, the associated delay 421 is negative four days. The rule 411 also indicates that if the check is image readable, the check type variable delay 421 is zero days, while if the check has to be cleared by paper, the check type variable delay 421 is one day. In some implementations, a negative delay, such as the check type delay 421 for cashiers checks, travelers checks, government or official checks, does not delay the check, and may also mitigate additional delays indicated by the rules of other variables. In one embodiment, rule evaluation may be achieved by providing codes to certain states and performing a logical checks to determine a state; for example, different check types may be discerned from MIRC lines and IRDs may have associated metadata, e.g., if a MIRC indicates it is a cashier's check, it could be given a code of "cashier" and when evaluating the rule, the DPManager delay evaluation would read in such metadata to perform the fule analysis 410 and select the appropriate delay 420 based on any such type metadata.

Figure 5:
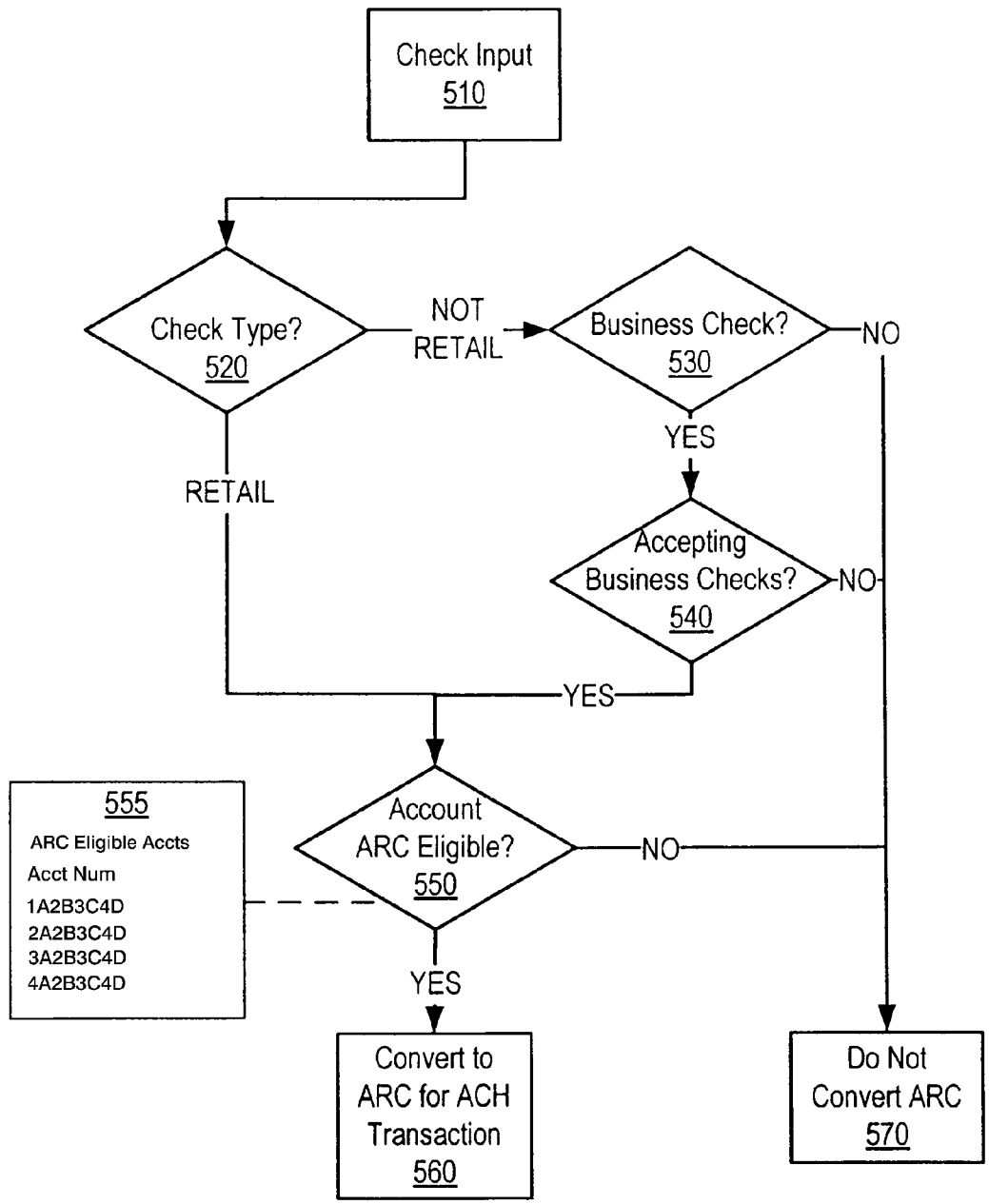
FIG. 5 illustrates the logic flow for one aspect of the decisioning engine in an embodiment of the DPManager.

The baseline availability variable 402 may have a rule 412 that determines the baseline availability delay 422 based on the time of day and/or optimal clearing method for the check (see the discussion of FIG. 5 for additional detail). In a further embodiment, the rule 412 may also utilize the routing number in determining the base line availability delay 422 (i.e., a longer delay if the routing number is on an exclusion list or the like).

In one embodiment, the segment variable 403 may have a rule 413 that provides a negative segment delay 423 to certain preferred segments (e.g., super affluent (SUP), near affluent (NSP), or highly affluent (HIA) client segments) while assigning zero segment delay 423 to other segments. The length of stay (LOS) of the client 404 may also be considered in calculating the delay. For example, in the embodiment shown in FIG. 4A, the LOS rule 414 states that if the LOS is less than three months, a LOS delay 424 of two days is indicated, while if the LOS is greater than three months but less than one year, a LOS delay 424 of one day is indicated. Additionally, if the LOS is greater than one year, the LOS rule 414 may indicate there should be no LOS delay 424.

The Primary Payments Systems (PPS) matching results variable 405 has a rule 415 that if a PPS score is one of a number of particular values, a PPS score delay 425 of four days is indicated. The rule 415 also indicates a one day PPS score delay 425 for a PPS score of 096, and no PPS score delay 425 for all other PPS scores. In one embodiment, the PPS score may be the risk value determined by the PPS element 334 of the risk/fraud evaluation 330, as described previously in FIG. 3A.

As shown in flow diagram of FIG. 4B check input information is received 450 and the appropriate delay variables 401-405 are determined 455. The applicable rules 411-415 for each of the identified delay variables 401-405 are applied 460 and the individual delays 421-425 for each delay variable are identified 465 and summed 470. If there are constraints, the constraints are applied 475, and the total delay is output 480. In one embodiment, the rules may be stored in a lookup table, such that each component value being evaluated may act as a search parameter to identify the appropriate rule in the lookup file, and that rule may be utilized in calculating the appropriate delay. In another embodiment, such a lookup file may be implemented as a database table. In the example shown in the FIG. 4A, the constraints 431 limit the minimum total delay to zero or greater and limit the maximum total delay to four days. In one embodiment, while multi-check deposits may be reflected on a system as a single transaction indicating the number of checks, the delay may be determined on a check-by-check basis. Other variables, such as deposit profile score, amount (e.g., relative to account size), MICR check and/or the like, as well as other rules and/or delays, could optionally be included and particular variables, rules and/or delays in FIG. 4A could be excluded or modified.

Figure 4C1:
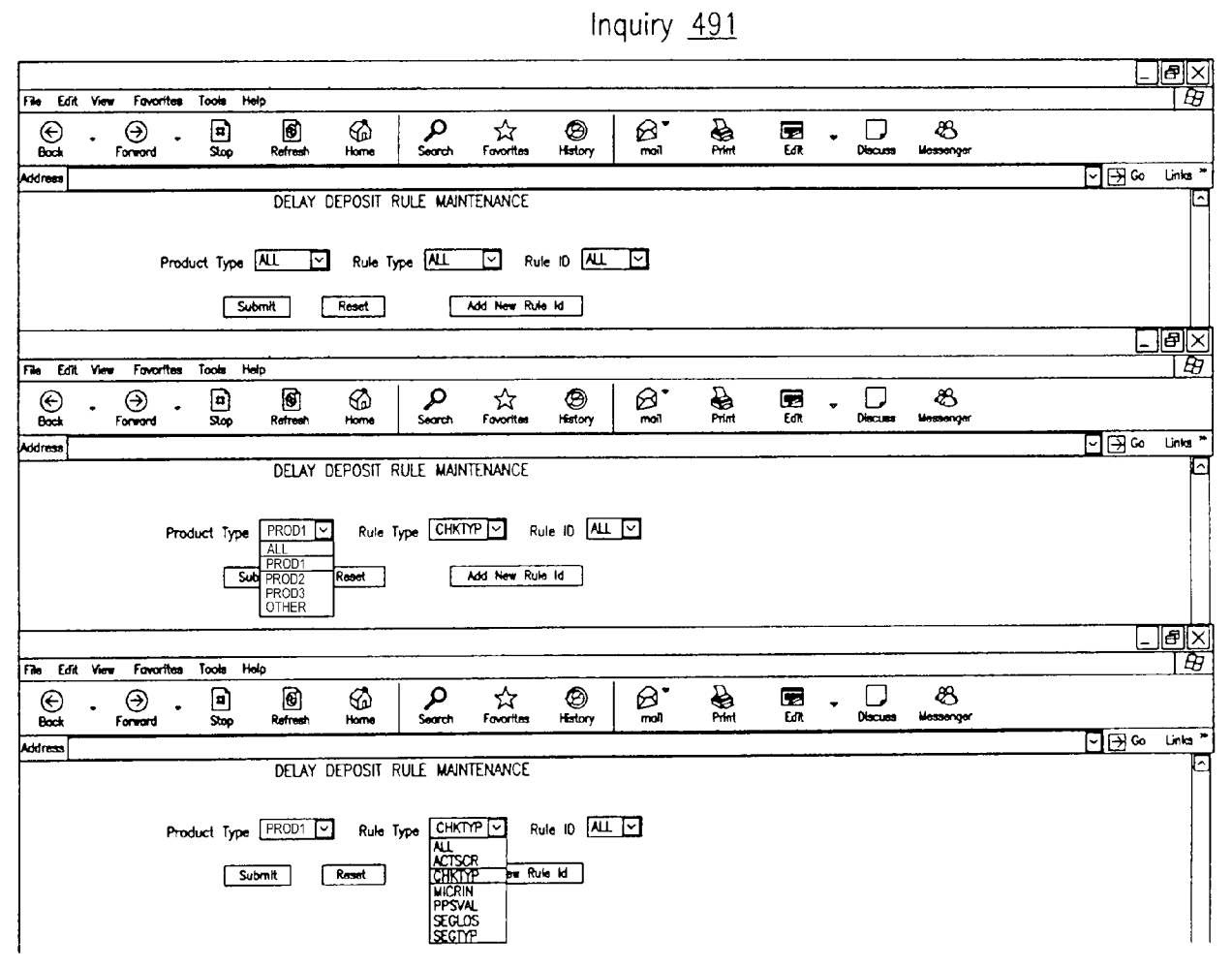
Figure 4C2:
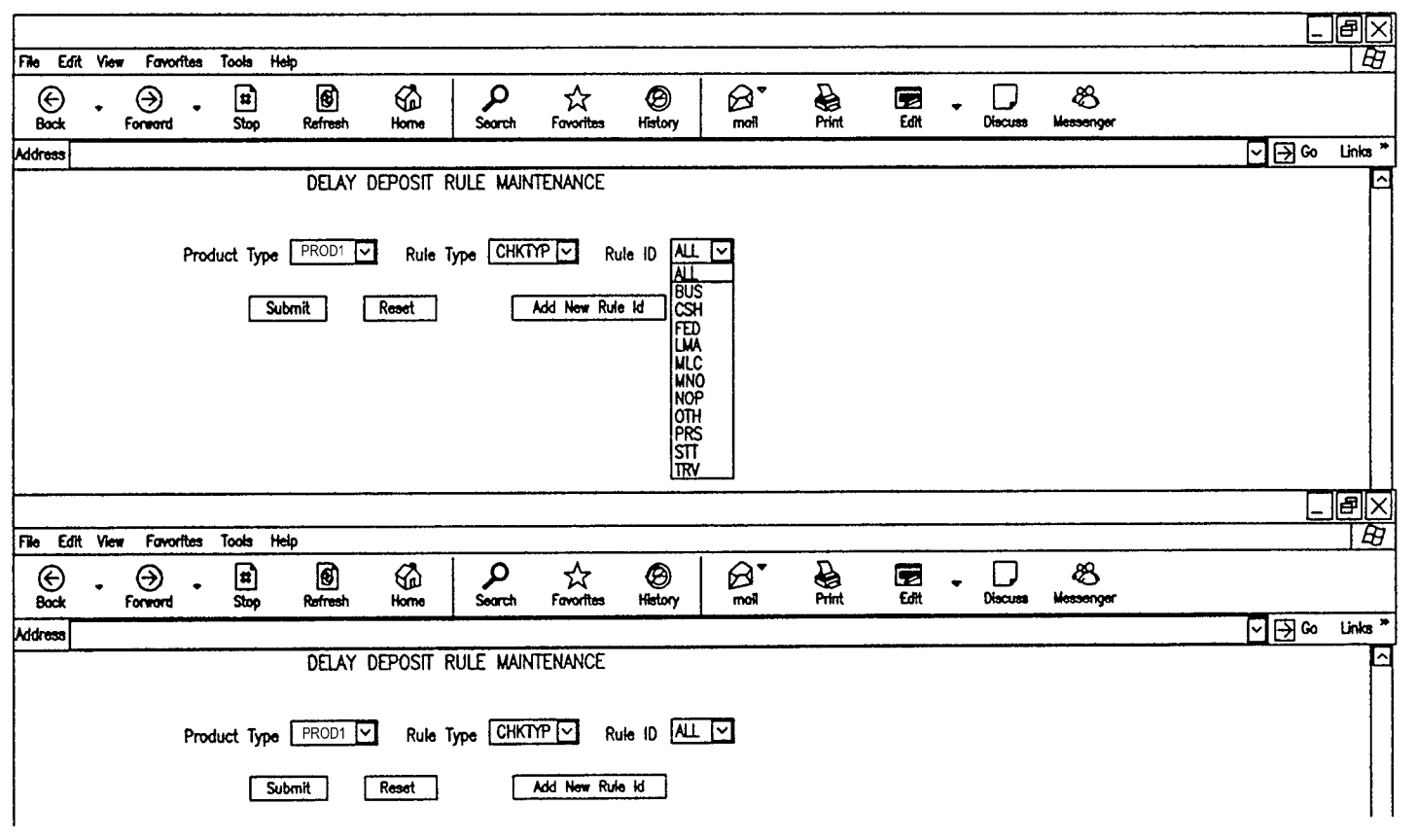

Some embodiments of the DPManager may provide a delay rule maintenance interface allowing specified users (e.g., system administrators) to review, create, and/or change delay rule configurations. In one implementation, the interface may be provided via a web based application. FIGS. 4C-4D provide example screenshots of delay rule maintenance interfaces for one embodiment of the DPManager. The implementation shown in FIG. 4C includes a inquiry interface 491 that allows a user to browse and/or search delay rules based on a specific product type, rule type (e.g., different rule variables like account profile, check type, MICR indicator, PPS score, length of stay, client segment, etc.), and/or rule ID, where the rule ID is a unique identifier assigned to the rule when the rule is created. As shown in the figure, a user may dynamically change the scope of their search by adjusting the inquiry criteria. FIG. 4C also illustrates the delete rule interface 492 for an embodiment of the DPManager. The user checks the box corresponding delay rule to be deleted presses the submit button, removing the specified delay rule. In some embodiments, the interface allows multiple rules to be selected for deletion at the same time.

FIG. 4D illustrates one embodiment of a DPManager rule update interface 493 that allows a user to edit or update each rule in. The user accesses the update functionality by clicking on the edit link corresponding to the specific rule, making the desired changes, and pressing the submit button. Some embodiments of the DPManager also provide an insert rule interface 494, allowing a user to create new rules by pressing the add new rule button, entering the appropriate data in the provided fields, and selecting the insert button. Other controls, functions, tools and/or buttons could optionally be included and various elements in FIGS. 4C-4D could be excluded. The interface elements shown are merely exemplary and other suitable interface elements could alternatively be employed.

Check Clearing

Depending on the implementation, a number of deposit clearing options and/or clearing entities may be available to the DPManager. The DPManager determines the optimum clearing option, clearing entity and/or time. For example, one option may be to transmit checks to one or more banks for clearing, in some cases via direct exchange. Another option may be to submit check images to the Federal Reserve Bank. Alternatively, additional options may exist to direct clearing of selected checks away from the Federal Reserve Bank to various clearing associations (e.g., SVPCo and Endpointe Exchange) providing additional fee savings with the same or better availability benefit. The benefit provided by the check clearing aspect of the DPManager may be particularly useful for entities, such as banks, which receive large deposit and/or morning deposits where minimizing fees and having same day availability may be especially advantageous.

Decisioning Engine

Some embodiments of the DPManager may include a decisioning engine for determining the optimum clearing option, clearing entity and/or time for clearing a deposit or check, and/or assigning the check to the appropriate internal ledger for clearing/posting purposes. In one implementation, the decision engine evaluates each received check using a set of prioritized rules and available clearing options in order determine and assign the appropriate clearing method for each individual check. For example, a rules interface similar to FIGS. 4C-4D may be used to add decisioning rules (e.g., account with more than $10 million may receive ARC conversions). Additionally, some embodiments of the DPManager may provide a user interface with update capability that allows an authorized user or users to add, delete, and modify clearing options and/or rules.

In one embodiment, the decisioning engine may determine if a check is eligible for ARC conversion. FIG. 5 provides a logic flow diagram illustrating the ARC conversion eligibility aspect of the decisioning engine in an embodiment of the DPManager. The decisioning engine determines if a check is eligible for ARC conversion and processing via an ACH transaction. In one embodiment, the decisioning engine receives check input 510 for a particular check and establishes the check type 520. In some instances, the DPManager enforces regulations and the rules of the National Automated Clearing House Association (NACHA), converting only retail checks that are eligible for ARC conversion. As such, the decisioning engine may be configured to be responsive to changes in rules and regulations. For example, if the check is not a retail check, the decisioning engine may determine if the check is a business check 530. If the check is not a business check, the check is not converted to ARC 570. If the check is a business check, the decisioning engine determines if business checks are currently being accepted 540 (e.g., NACHA allows ACH for business accounts).

If business checks are not being accepted, the check is not converted to an ARC 570. However, if the check is a business check and business checks are being accepted 540 or if the check is a retail check, the decisioning engine then determines if the particular account is ARC eligible 550. In one embodiment, the decisioning engine may determine ARC eligibility by comparing the account number to a database or table of ARC eligible accounts 555. In some embodiments, all qualifying deposits to a client's account(s) may be converted to ARCs if the client elects to do so. In order to comply with particular rules and regulations regarding ACH, certain embodiments of the DPManager allow a business client to certify that their clients have been properly notified and allowed to opt out of conversion. If the account is not ARC eligible, the check is not converted to an ARC 570. If the account is ARC eligible, the check is converted to an ARC for processing via ACH transaction 560.

As discussed above, the DPManager may use the decisioning engine to determine the best clearing entity for a check, optimizing fee savings and availability benefits. In some embodiments, the decisioning engine may utilize databases or tables containing availability and fee information to determine the optimum clearing entity. The databases or tables may be regularly maintained by an authorized user (administrator) and/or maintained and updated automatically. For example, the databases or tables may be updated as more clearing options and/or banks become available.

FIG. 6A provides example data tables, including a fee and cutoff schedule 600 and ABA number/clearing entity (ABA/CE) matrix 610, used by the decisioning engine for selecting clearing entities (CEs) in an embodiment of the DPManager.

The fee and cutoff schedule 600 lists the clearing entities 601 and their respective cutoff times 602 and fees 603 (if applicable). The schedule also lists the next day cutoff times 604 and fees 605 for each of the listed clearing entities 601. The ABA/CE matrix 610 lists clearing entities 611, ABA numbers 612 and the relationship between the two, i.e., whether a clearing entity can provide both same day clearing and next day clearing, next day clearing only, or will not provide clearing for a particular ABA number.

Figure 6B:
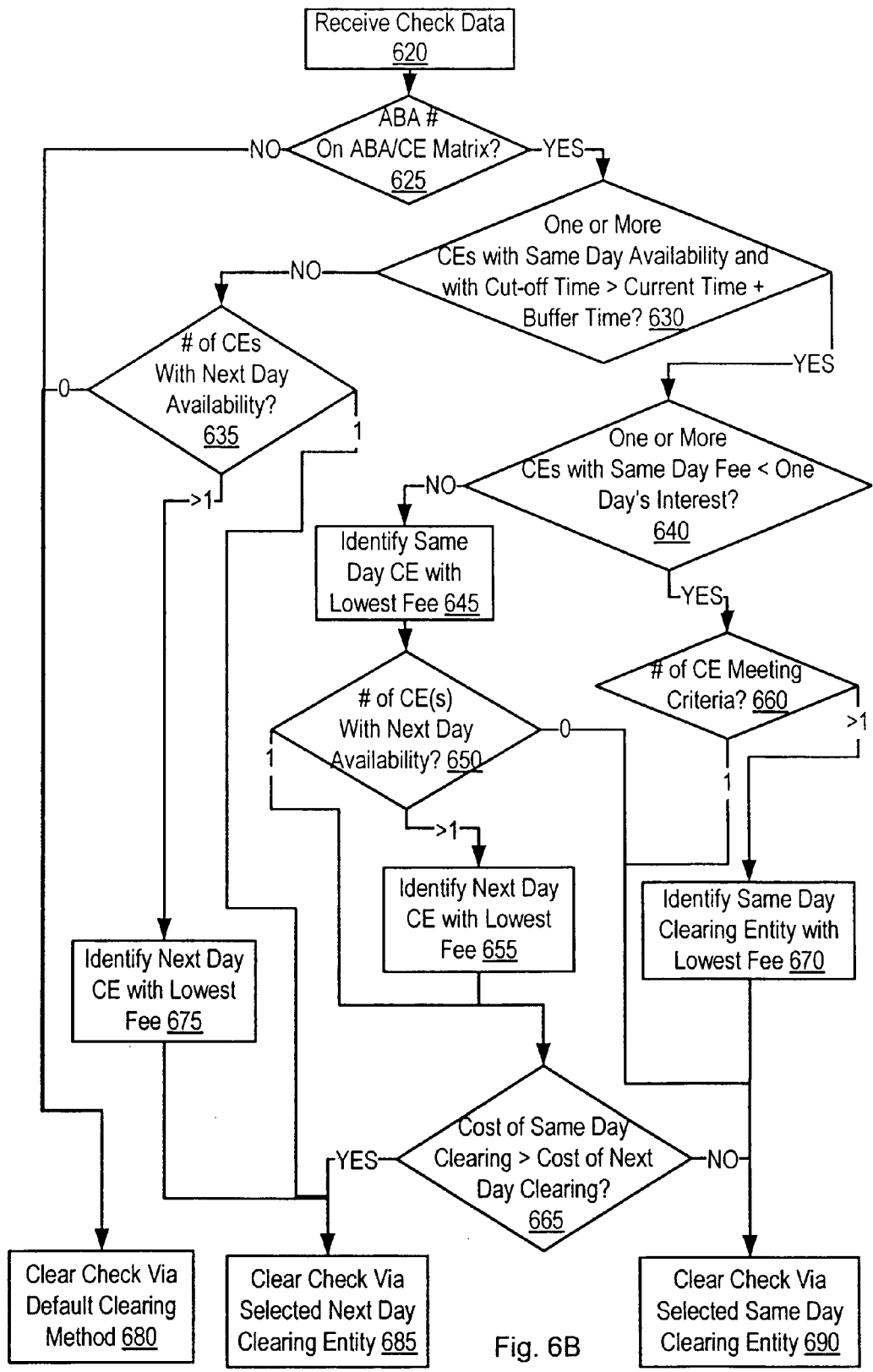

FIG. 6B shows a logic flow diagram for the clearing entity assignment aspect of the decisioning engine in an embodiment of the DPManager. The decisioning engine receives check data 620 for a particular check to be cleared, and compares the ABA number from the check data with the ABA numbers 612 on the ABA/CE matrix 610 to determine if the check's ABA number is listed 625. If the check's ABA number is not on the ABA/CE matrix 610, the check may be assigned to be cleared via a default clearing method 680. If the check's ABA number is listed on the ABA/CE matrix 610, the decisioning engine determines if there are one or more clearing entities with both same day clearing availability (from the ABA/CE matrix 610) and a cut-off time 602 less than the current time plus a specified buffer time 630. In general, the buffer time is the estimated time to complete all necessary tasks, including file generation and transmission, required for submission to the clearing entity.

If there are no clearing entities that meet both the same day clearing availability and the cut-off time criteria 625, the decisioning engine may reference the ABA/CE matrix 610 to determine the number of qualifying clearing entities with next day availability 635. If none are identified 635, the check may be assigned to be cleared via a default clearing method 680. If only one next day clearing entity is identified 635, the check may be assigned to be cleared via that clearing entity 685. If multiple clearing entities are identified 635, the next day clearing entity with the lowest fee is identified 675 and the check assigned to be cleared via the selected clearing entity 685.

If there are one or more clearing entities that meet both the same day clearing availability and the cut-off time criteria 630, the qualifying clearing entities and respective same day clearing fees 603 are evaluated to determine if one or more of them have a same day clearing fee less than one day's interest 640 (e.g., one day's interest is the check amount multiplied by the daily interest rate). If one or more clearing entities meet this rule 640, the number of qualifying clearing entities is determined 660. If only one same day clearing entity is identified 660, the check is assigned to be cleared via that clearing entity 690. If there are multiple qualifying same day clearing entities 660, the clearing entity with the lowest fee is identified 670 and the check is assigned to be cleared via the selected same day clearing entity 690.

If there are one or more same day clearing entities that meet the same day clearing availability and cut-off time criteria 630, but none of which meet the fee criteria 640, the same day clearing entity with the lowest fee is identified 645. The decisioning engine then checks the ABA/CE matrix 610 to identify clearing entities with next day availability 635. If there are no clearing entities with next day availability 650, the check may be assigned to be cleared via the same day clearing entity with the lowest fee 690. If there are multiple clearing entities with next day clearing ability 650, the next day clearing entity with the lowest fee is identified 655. The cost of next day clearing (i.e., the next day clearing fee plus one day of interest on the check amount) is compared to the cost of the same day clearing 665. If the cost of same day clearing is greater than the cost of next day clearing 665, the check may be assigned to be cleared via the selected next day clearing entity 685. If the cost of same day clearing is not greater than the cost of next day clearing 665, the check may be assigned to be cleared via the selected same day clearing entity 690.

In one embodiment, as the clearing method and entity are assigned, a database may be populated with the code relating to the clearing method and associated with the transaction record of each individual check. The code may then be used to assign the appropriate ledger for posting purposes.

Figure 6C:
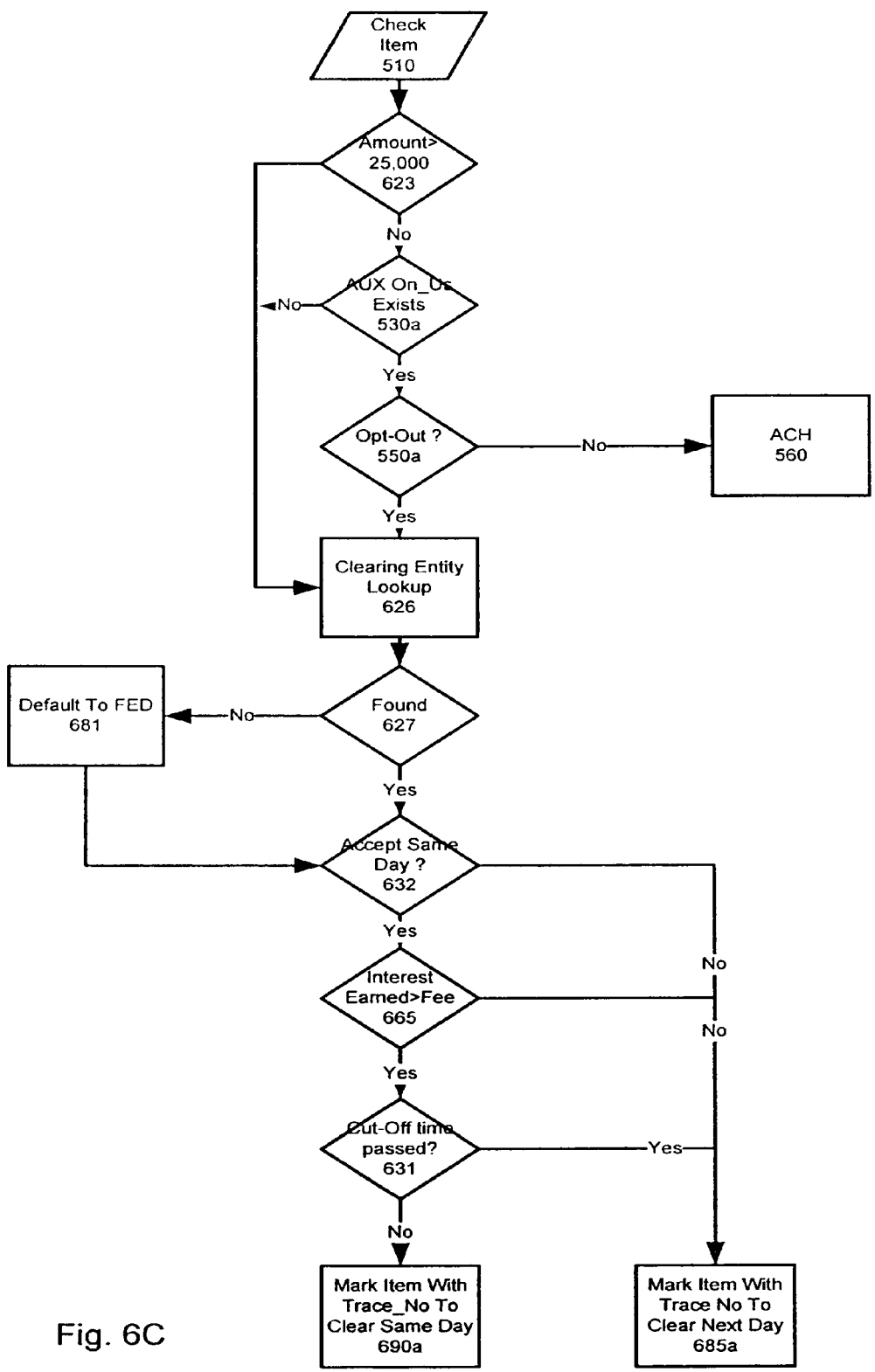

FIG. 6C provides a process flow diagram illustrating ARC conversion eligibility and clearing entity assignment aspects of the decisioning engine for an alternative embodiment of DPManager. The decisioning engine receives a check item 510 and/or associated information and determines if the check amount is greater than a specified threshold 623 (e.g., $25,000). If the check amount is below the threshold 623, the decisioning engine determines if an AUX on_us number exists 530*a* (e.g., an AUX on_us field is indicative of a business check), and if so, determines whether the account is classified as opting out 550*a*. If the account is not classified as opting out 550*a*, then the check is cleared via ACH 560. If the account is classified as opting out 550*a*, if the AUX on_us number does not exist 530*a*, or if the check amount is above the threshold 623, the decisioning engine may perform a clearing entity lookup 626.

If one or more clearing entities is found 627, the availability of same day clearance is determined 632, and if there is same day availability, the decisioning engine determines whether the interest earned is greater than the fee 665. If the interest earned is greater than the fee 665, the decisioning engine determines if the cut-off time has passed 631, and if not, marks the check item with a trace number indicating same day clearance 690*a*. If same day clearing is not available (631, 632) or not desirable (665), the check item is marked with a trace number indicating next day clearance 685*a*.

Figure 6D:
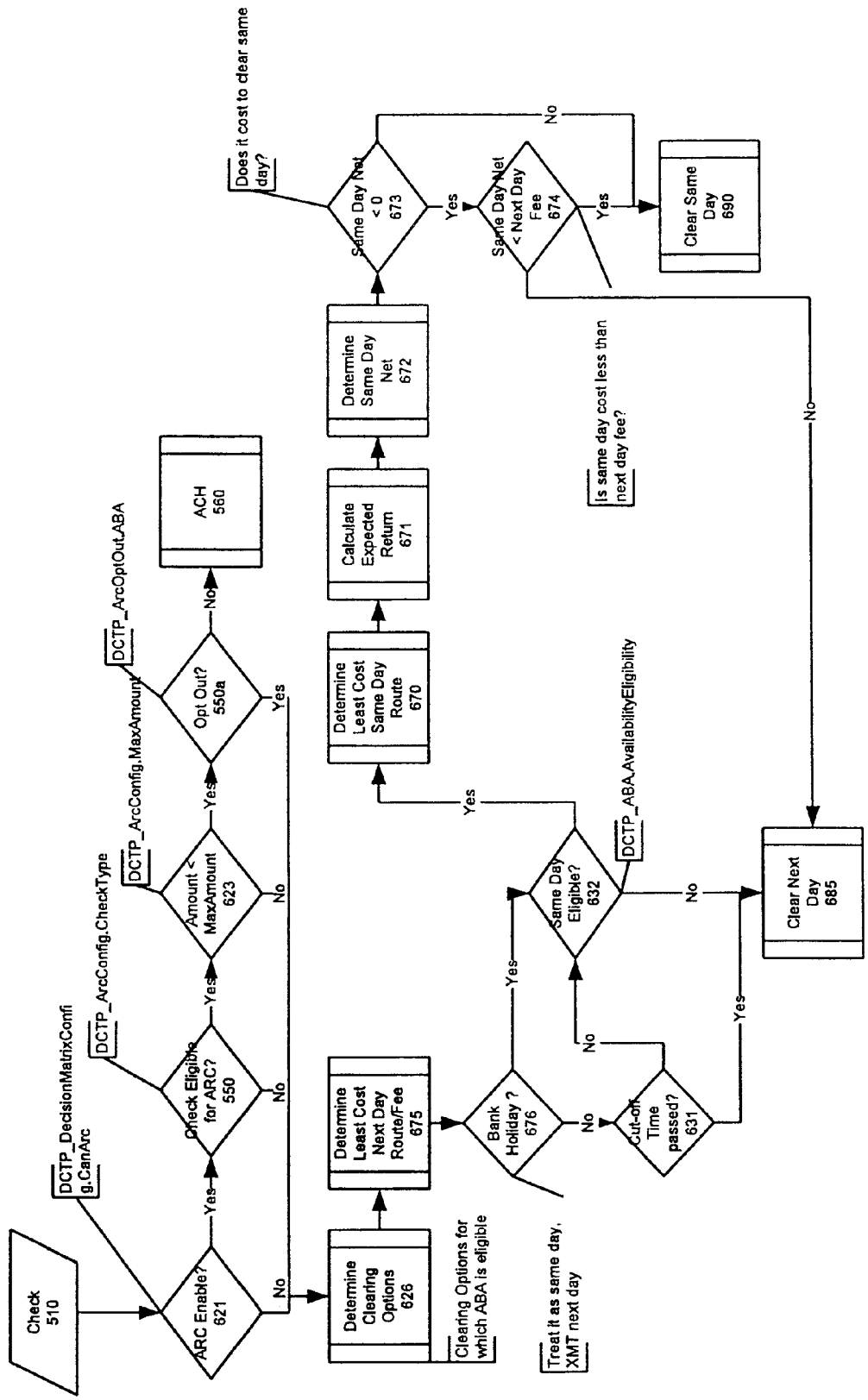

FIG. 6D provides a process flow illustrating additional details for a further embodiment of the DPManager. The decisioning engine receives a check 510 and/or associated information and determines if ARC is enabled 621, and if so, if the check is eligible for ARC conversion 550. If the check is eligible 550, the decisioning engine determines if the check amount is below the maximum allowed amount 623 and, if so, whether the account is opting out 550*a*. If the account is not opting out 550*a*, then the check is cleared via ACH 560. If the account is opting out 550*a* or is otherwise ineligible (621, 550, 623), the decisioning engine will determine clearing options 626 for which the check is eligible (e.g., via the ABA number associated with the check).

The decisioning engine determines the next day clearing route with the least cost 675, and whether the day is a bank holiday 676. If the day is not a bank holiday 676, the decisioning engine determines if the same day clearing route cut-off time has passed, and if so, the check is cleared the next day 685. If the cut off time has not passed 631 or if the next day is a bank holiday 676, the decisioning engine determines if the check is eligible for same day clearing 632. If the check is eligible 632, the decisioning engine determines the same day route with the least cost 670, calculates the expected return 671, and determines the same day net 672. If the same day net is less than zero 673, or if the net is greater than zero but less than the next day fee 674, the check is cleared the same day 690. Otherwise, the check is cleared the next day 685.

Clearing File Generation

In one embodiment, the DPManager may generate clearing files (e.g., image cash letter files) for all completed and accepted checks for each clearing entity, which may be sent in accordance with the deposit deadlines for the respective clearing entities. The output of the decisioning engine may also indicate the appropriate file format for each clearing file (e.g., ANSI X9.37 for external clearing banks, Federal Reserve, SVPCo and each bank at SVPCO, and XML for Endpoint Exchange). For each file, a deposit notification may be prepared reflecting the associated amount of each file. The files may then be sent to the various identified clearing entities. In some embodiments, the DPManager may include an automated job scheduler that transmits the image files to the various clearing entities (e.g., via FTP). The DPManager may also provide controls to ensure that files transmit completely and successfully (e.g., a hash provided prior to sending, and an acknowledgement returned to the sender upon verification of the received file with the hash). A credit is provided to the specific DDA relating to the corresponding clearing entity and the appropriate ledgers are updated. For example, if the deposit is posted to an external bank, a deposit notification is prepared and the external bank provides a credit to the specific DDA relating to the selected clearing entity.

In one embodiment, the DPManager may determine the availability for each of the clearing files based on on-line access to systems for the clearing entities. Entries may be made by the DPManager to reduce the uncollected funds and to credit an entity's Fed account. In one embodiment, at the end of the day, all collected funds may be wired to a concentration account, and the balance in the DDA adjusted accordingly.

Returns and Adjustments

In some embodiments, returned checks received physically (IRD) may be scanned and necessary repairs made to the scanned data as required. Returned checks may also be received electronically. The DPManager automatically reassociates the return to the original deposit (e.g., by identifying the corresponding account number). The appropriate debit to the client account and credit to ledger account will be made (e.g., one entry per clearing entity) and in one embodiment, the DPManager may generate a letter to the client. The debit to the DDA may be based on the return information provided by on-line systems of the clearing entity. Based on the return reason code, the deposit may be held for one day to allow funds to be available and represented automatically with other deposits for that day.

Image Access

In some embodiments, images of deposit slips and checks received for deposit may be made available for viewing, for example, using a broker desktop and/or client website interface. The DPManager may also provide a search function supporting a variety of search criteria. In one embodiment, offices may only be able to see images for their clients and clients may only be able to see their deposits. Accordingly, retirement plan participants (not including IRAs) may not be able to view the deposit images since the deposit slips and check are for multiple participants.

DQ Edit Workflow

Figure 7A:
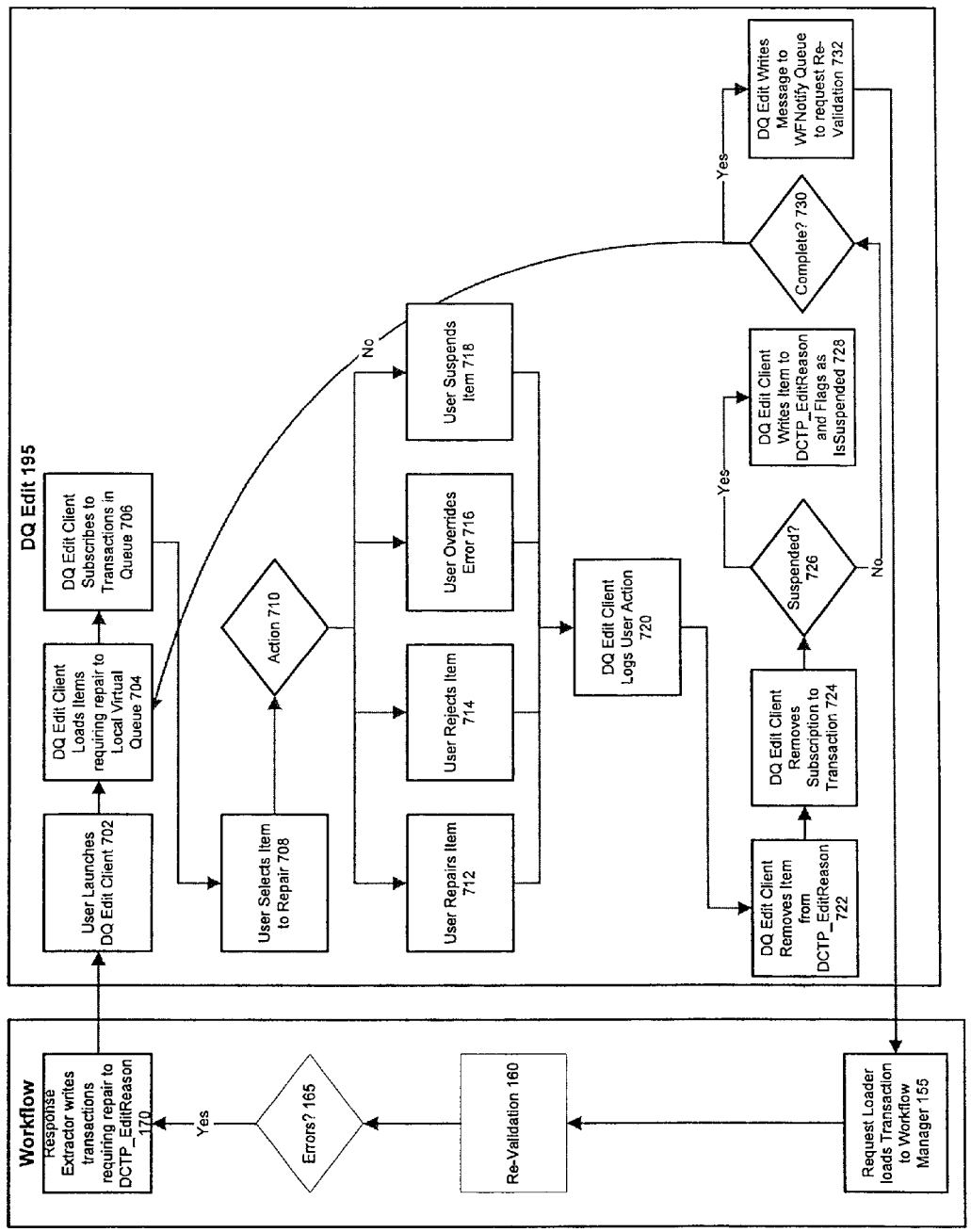
FIGS. 7A-D illustrate aspects of DQ Edits for an embodiment of the DPManager.

FIG. 7A describes an alternative embodiment of DQ Edits expanding upon discussions from FIGS. 1B and 324 of FIG. 3A et al. As has already been discussed, the DPManager response extractor may write the transactions requiring repair to a data capture database table (e.g., EditReason table) 170. In one embodiment, The Response Extractor writes items to the EditReason table, which satisfies the following criteria:

1) The Transaction.WFState is set to WF (Workflow Finished),

2) The Transaction.Status is set to 1 (indicating failure of an item in the transaction against a validation process).

Upon writing to the Edit_Reason table 170, the DPManager may instantiate a client editor 702. Upon instantiation of the DQ Edit Client 702, the user's queue rights are discovered. In one embodiment, a user's profile specifies their access privileges, and queues are assigned to groups with various access control levels that prevent unauthorized users and/or groups from accessing queue contents. Based upon the user's queue rights, the client's work queue is populated with items from the EditReason table 704. Items placed into an individuals queue may satisfy the following criteria:

1) The user has rights to the queue that has the highest priority of all queues associated with the item's reason codes. For example, a deposit slip might contain two errors. These errors are associated with two different queues. One queue (Q1) has priority 1 and the other (Q2) has priority 2. If the operator has rights to Q1, the item will be added to their work queue. Conversely, if the operator has rights to Q2, the item will not be added to their work queue.

2) The item is not currently subscribed to by another user (e.g., indicated by a record for the item in the Subscription table).

3) The item's reason codes associated with the queue to which the user has rights are not currently flagged as suspended by another user (e.g., indicated by a Y in the EditReason table's IsSuspended field for the record).

Upon identifying items according to the aforementioned criteria, the DQ Edit Client subscribes to the item by adding a record to the Subscription table 706. At that point, an operator may select an item to repair from the work queue 708. The operator may address the error condition in one of the following manners:

1) Repair: The user addresses the error by fixing the offending aspect of the item 712. For example, if the account number was flagged as invalid, then the user rectifies the problem by providing the proper account number.

2) Reject: The user addresses the error by rejecting the item, and/or transaction 714. For example, if a check in the transaction exists on the stop file, then the user rectifies the problem by rejecting the offending check. It should be noted that the reject may be associated with other actions such as rebalancing the transaction, or creating a virtual deposit slip.

3) Override: If the user addresses the error by overriding the error 716. For example, if a deposit slip is flagged because the name provided on the slip does not match the name associated with the account, then upon review the user accepts the provided name and overrides the error.

4) Suspend: If the user is unable to immediately address the error, or complete repair of the error by end of day 718, then the user suspends the item so they may return to the item later. For example, if the user is unable to resolve and problem because the branch is unable to contact the client, then the user suspends the item to repair later.

In one embodiment, based upon the actions taken by the user, the DQ Edit Client may log operations in a series of audit related tables 720. Example DPManager database tables may include:

1) Repair Audit table: the Repair Audit table records each item touched during the process of repairing errors.

2) Reject Log table: the reject log table contains a record for each item rejected from the transaction. The user has the ability to provide a subject (e.g., predefined) to explain the reject and a note to further elaborate on the reject.

3) Reason Log table: the Reason Log table contains a record for each error associated with the repaired item. If the user elected to override a particular reason, the override is indicated in this table with the, e.g., IsOverriden, flag.

4) Virtual Deposit Slip: the Virtual Deposit Slip table contains a record for each virtual deposit slip created as a result of modifying an item. In one embodiment, a virtual deposit slip is a combination of a reject and a virtual deposit slip.

5) Columnar changes table: columnar changes to a particular record are stored in audit tables reflecting the structure of the core data-capture database tables. Records in these tables are generated systematically using triggers.

After the user's actions are logged 720, the DQ Edit Client releases the subscription on the item (i.e., it removes the item from the EditReason table 722 and removes the subscription to the transaction table 724) and takes one of the following two actions based upon the manner in which the user addressed the error:

1) If the user suspended the item the DQ Edit Client 726, then the DQ Edit client a. removes the subscription to the item, b. adds the reason codes associated with the item back to the EditReason table and flags as IsSuspended 728.

2) If the user does not suspend the item the DQ Edit Client 726, then the DQ Edit client a. removes the subscription to the item, and b. determines if all items from the transaction containing errors have been addressed 730.

After the user saves an item, the DQ Edit Client determines if errors still exist in the EditReason table within the transaction to which the user was subscribed 730. If no errors exist 730, the DQ Edit Client adds a message to the WFNotify queue 732 to request reprocessing of the transaction through DPManager Workflow and the workflow iterates 155. Otherwise 730, the DQ Edit Client may continue to iterate 704. In one embodiment, the WFNotify message format is in XML as follows:

```
<RequestNotify>
    <IDType></IDType>
    <ID></ID>
    <Name></Name>
    <ForceFlag></ForceFlag>
</RequestNotify>
```

Figure 7B:
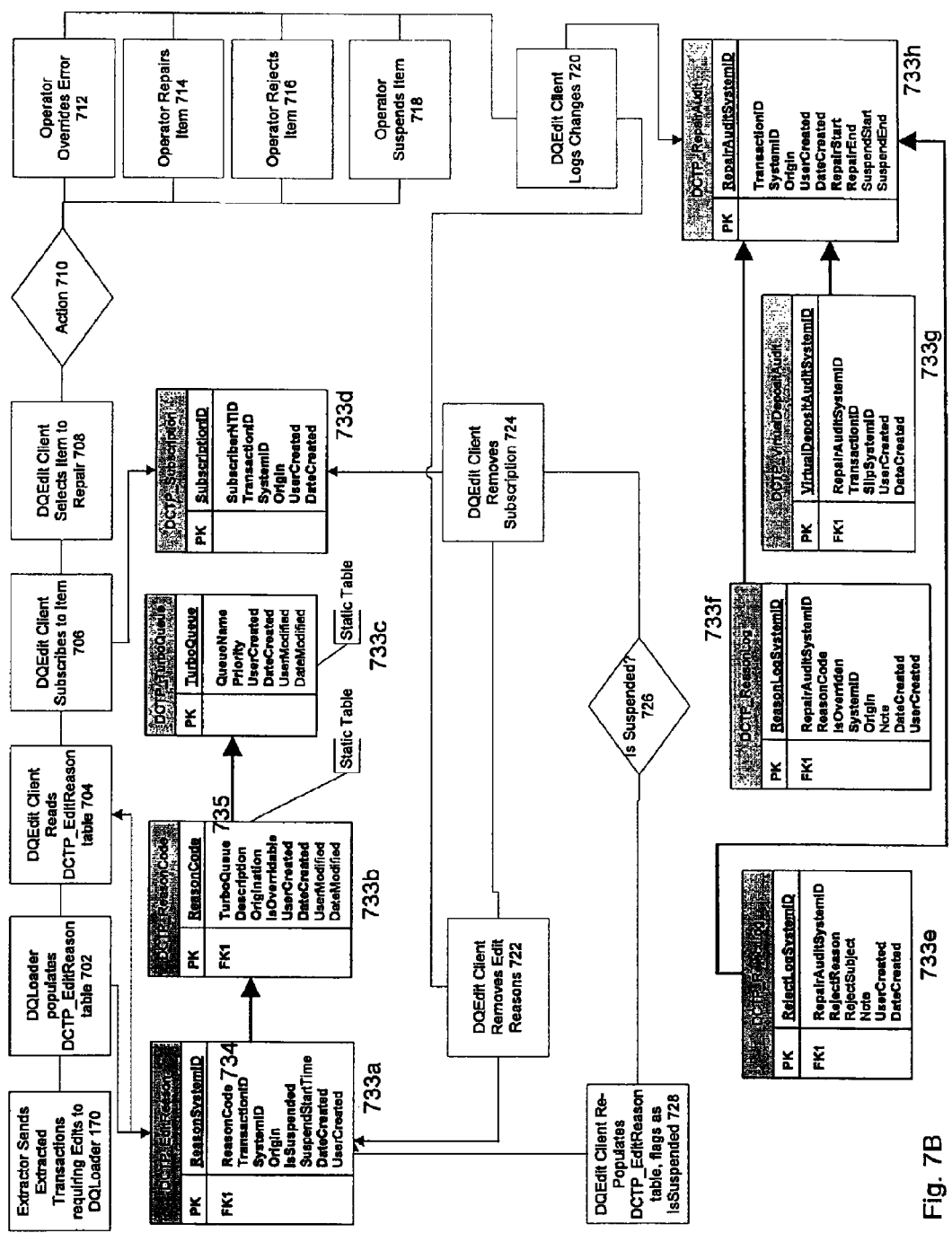

In one embodiment, the request may contain the following values:
1) IDType: TRANSACTION
2) ID: TransactionID
3) Name: null
4) ForceFlag: null
DQ Edits Tables FIG. 7B illustrates the DQ Edit component's interaction with various DPManager database table. As discussed throughout 170, 702-728 of FIG. 7A, the DQ Edit component modifies various DPManager database tables in the course of the DPManager workflow. As can be seen, numerous database tables 733a-h employ various numerous primary key fields and data fields. For example, the DQ Editor may write to 702 the EditReason table 733a, which may in turn be used by the client 704. Similarly, when subscribing to a transaction item 706 or removing a client subscription 724, the DQ Edit Client may access the Subscription table 733d. Similarly, when making logs 720, the DQ Editor may access a Repair-Audit table 733h. These tables themselves may be interrelated as shown in the diagram. For example, the EditReason table may relate to the ReasonCode table by way of its ReasonCode field key 734; and the ReasonCode table 733b may relate to the TurboQueue table 733c by way of the TurboQueue field key 735. Similarly, the RejectLog 733e, ReasonLog 733f and VirtualDepositAudit 733g tables may be related to the RepairAudit table 733h by way of field keys.

In one embodiment, for each ReasonCode within a transaction, the Response Extractor 170 may add a record to the EditReason table as a way to manage such queue edits. The following example scenario may help to illustrate how this is valuable. We start with the following tables having states as follows:

| Transaction Table | | |
|---|---|---|
| TransactionID | WFState | Status |
| 1000 | WF | 1 |
| 1001 | WF | 1 |

| DepositItem Table | | | | |
|---|---|---|---|---|
| TransactionID | ItemSystemID | Status | AccountLookupStatus | AccountLookupReason |
| 1000 | 1001 | 1 | 1 | 1003, 1005 |
| 1001 | 1002 | 1 | 1 | 1005 |

| EditReason Table 733a | | | | |
|---|---|---|---|---|
| ReasonSystemID | ReasonCode | TransactionID | SystemID | Origin |
| 1000 | 1003 | 1000 | 1001 | I |
| 1001 | 1005 | 1000 | 1001 | I |
| 1002 | 1005 | 1001 | 1002 | I |

With DQ Edit Client Instantiation 702, the DQ Edit Client determines which items are appropriate to the user, and the tables may have the following resulting states:

| EditReason Table 733a | | | | |
|---|---|---|---|---|
| ReasonSystemID | ReasonCode | TransactionID | SystemID | Origin |
| 1000 | 1003 | 1000 | 1001 | I |
| 1001 | 1005 | 1000 | 1001 | I |
| 1002 | 1005 | 1001 | 1002 | I |

| ReasonCode Table 733b | | | |
|---|---|---|---|
| ReasonCode | TurboQueue | IsOverridable | Description |
| 1003 | Q10 | Y | Invalid Account Number |
| 1005 | Q11 | N | Account blocked |

| TurboQueue Table 733c | |
| --- | --- |
| TurboQueue | Priority |
| Q10 | 1 |
| Q11 | 2 |

| Subscription Table 733d | | | | |
| --- | --- | --- | --- | --- |
| SubscriptionID | SubscriberNTID | TransactionID | SystemID | Origin |
| 1000 | SACARUSO | 1001 | 1002 | I |

| UserRights Table | |
| --- | --- |
| SubscriberNTID | TurboQueue |
| YYU | Q10 |
| SACARUSO | Q11 |

Based upon the above information, the DQ Edit Client would select 708 the item corresponding to ReasonSystemID 1000. This decision was based upon the following:
 1) The user has rights to Q10.
 2) ReasonCode 1003 belongs to Q10.
 3) Q10 has the highest priority of queues associated with the item.
 4) No other user has subscribed to the transaction to which the item belongs.

With DQ Edit Client Subscription, the DQ Edit Client subscribes 706 to the item by generating the following record in the Subscription table:

| Subscription Table 733d | | | | |
| --- | --- | --- | --- | --- |
| SubscriptionID | SubscriberNTID | TransactionID | SystemID | Origin |
| 1001 | YYU | 1000 | 1000 | I |

With the DQ Edit Client User Action 710, the user selects the item from the work queue and acts on the error. In this case, the user recognizes the account number is incorrect and modifies the account number appropriately. The user then saves their actions.

With the DQ Edit Client Audit Log, the DQ Edit Client creates the following entries to reflect the user's actions:

| RepairAudit Table 733h | | | |
| --- | --- | --- | --- |
| TransactionID | SystemID | Origin | UserCreated |
| 1000 | 1000 | I | YYU |

The DepositItem_Audit table contains a record reflecting the state of the record prior to the user's modification of the account number.

With the DQ Edit Client Unsubscribe, the DQ Edit Client unsubscribes from the item by deleting the following records from the Edit Reason and Subscription tables:

| EditReason Table 733a | | | | |
| --- | --- | --- | --- | --- |
| ReasonSystemID | ReasonCode | TransactionID | SystemID | Origin |
| 1000 | 1003 | 1000 | 1001 | I |

| Subscription Table 733d | | | | |
| --- | --- | --- | --- | --- |
| SubscriptionID | SubscriberNTID | TransactionID | SystemID | Origin |
| 1001 | YYU | 1000 | 1000 | I |

With the, DQ Edit Client Revalidate 160, in the above scenario the transaction would not be sent for revalidation if the following record exists in the Edit Reason table. If the following record were removed resultant from another user's actions, the transaction would be sent for revalidation:

| EditReason Table 733a | | | | |
| --- | --- | --- | --- | --- |
| ReasonSystemID | ReasonCode | TransactionID | SystemID | Origin |
| 1001 | 1005 | 1000 | 1001 | I |

In one embodiment, the Revalidation Request String format is in XML as follows:

```
<RequestNotify>
    <IDType>TRANSACTION</IDType>
    <ID>1000</ID>
    <Name></Name>
    <ForceFlag></ForceFlag>
</RequestNotify>
```

Figure 7C:
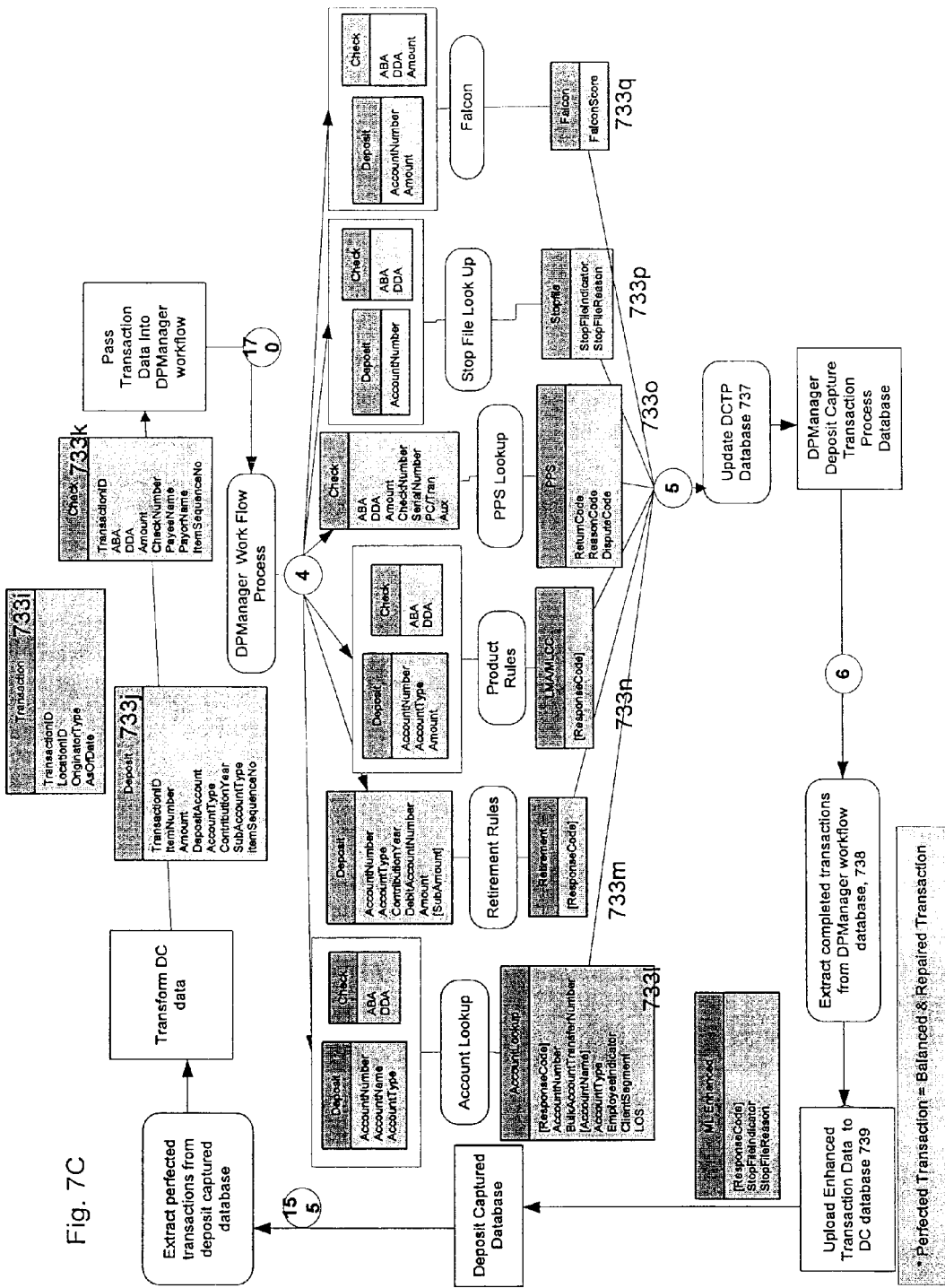

FIG. 7C shows an alternative embodiment of the DPManager workflow and DP Edit client and affected tables as discussed in earlier FIGS. 7A-B. This figure starts with extraction and transformation of data 155 affecting DPManager tables (e.g, transaction 733*i*, deposit 733*j* and check 733*k* tables). This data passes into the workflow 170 and may further affect account 733*l*, retirement 733*m*, product rules 733*n*, PPS 733*o*, stop file 733*p* and falcon 733*q* database tables. All these tables are updated in the DPManager database 737. Once saved, this information may be extracted and used throughout the DPManager workflow 738, thereby providing enhanced transaction data to the DPmanager data capture database 739.

Figure 7D:
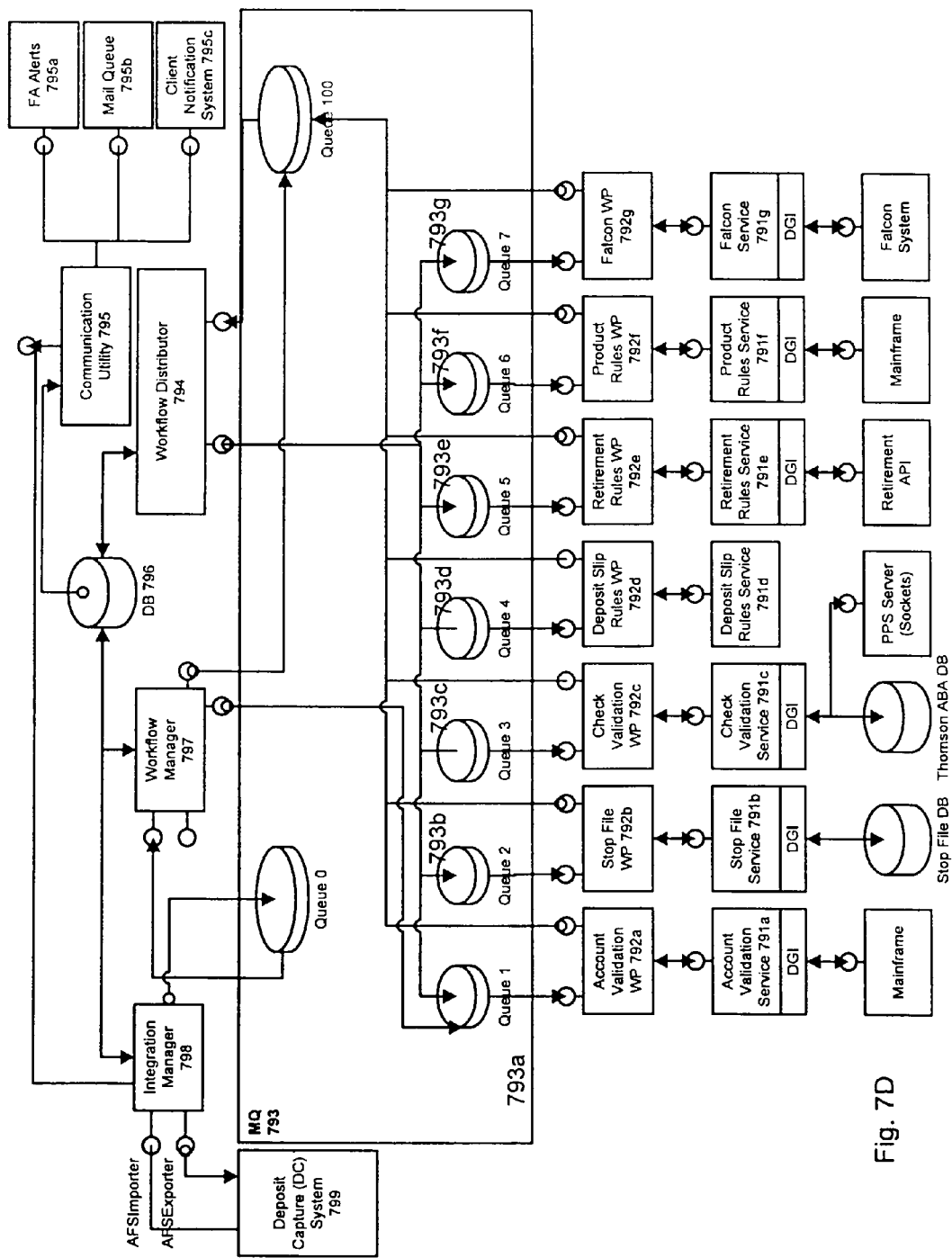
Figure 8A:
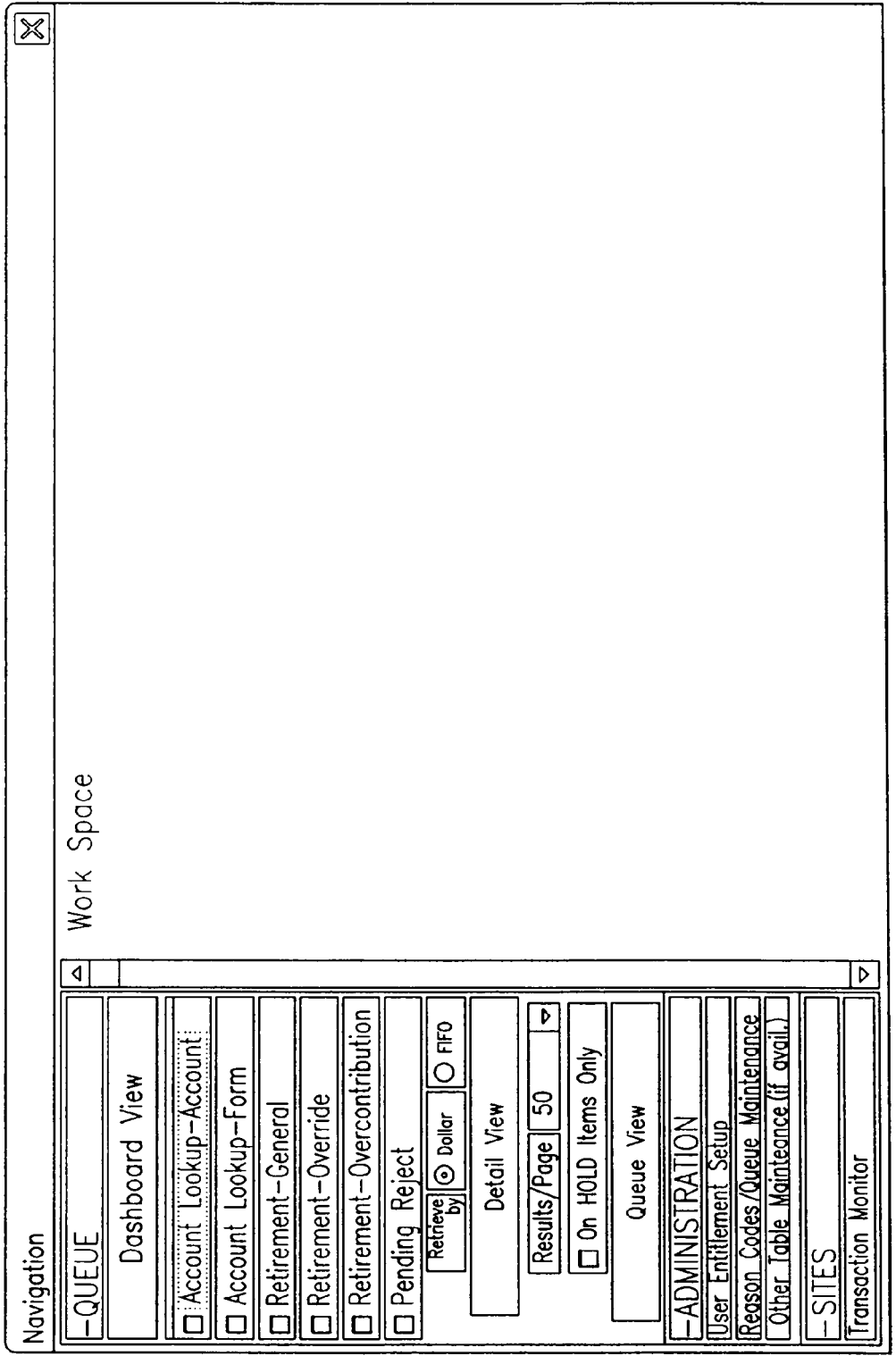
FIGS. 8A-8HH illustrate aspects of a user interface for an embodiment of the DPManagaer.
Figure 8I:
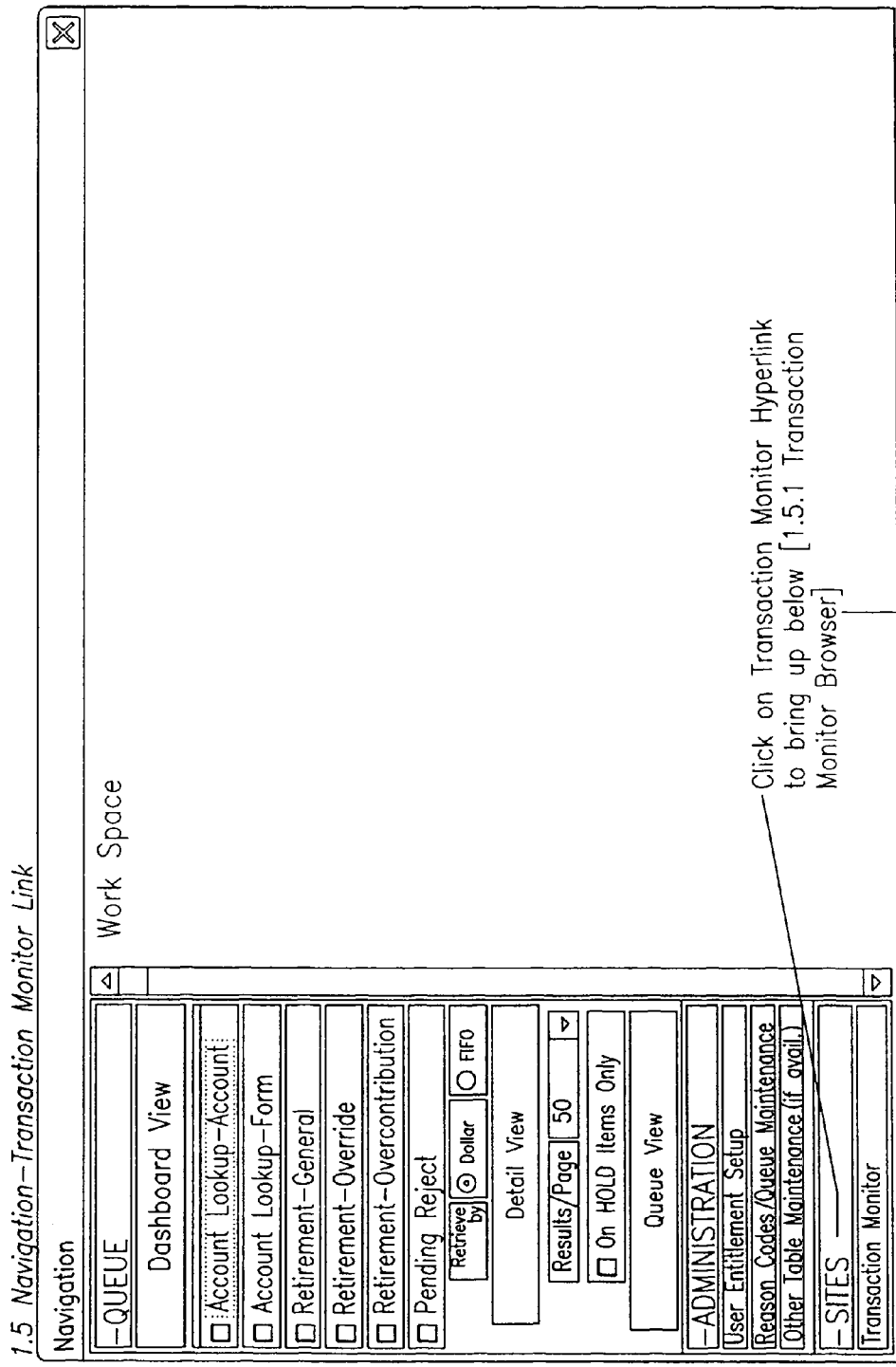
Figure 8J:
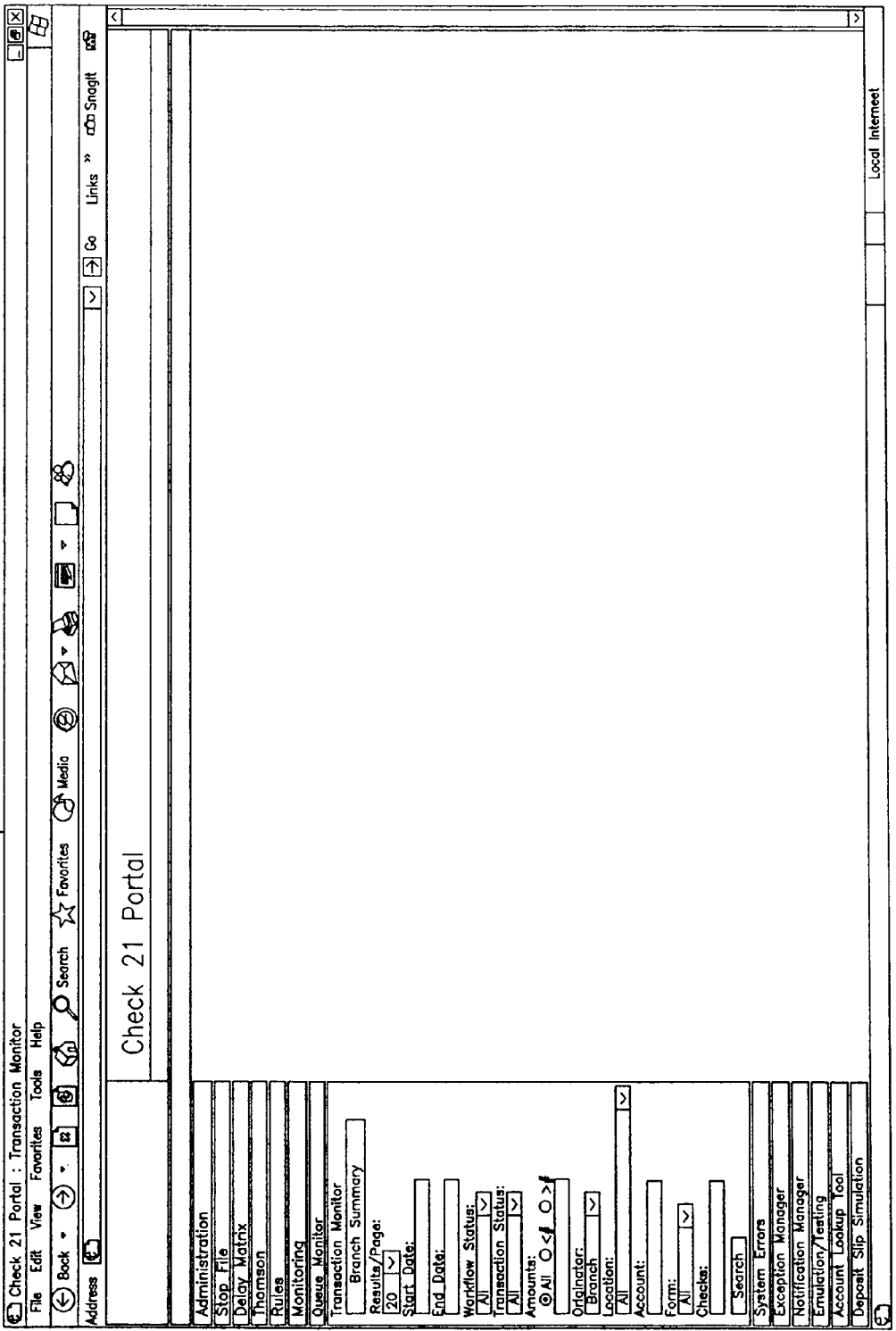
Figure 8T:
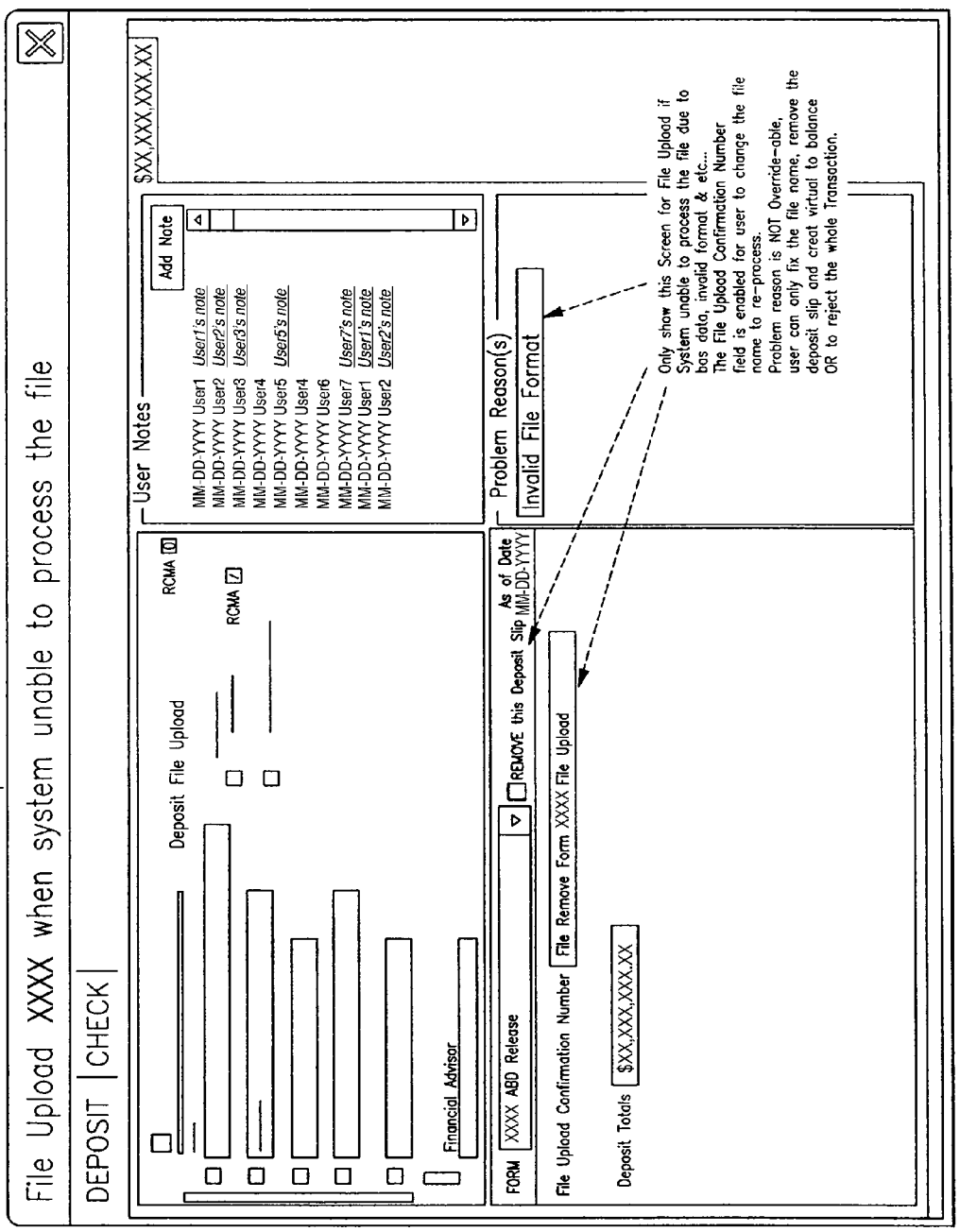
Figure 8B:
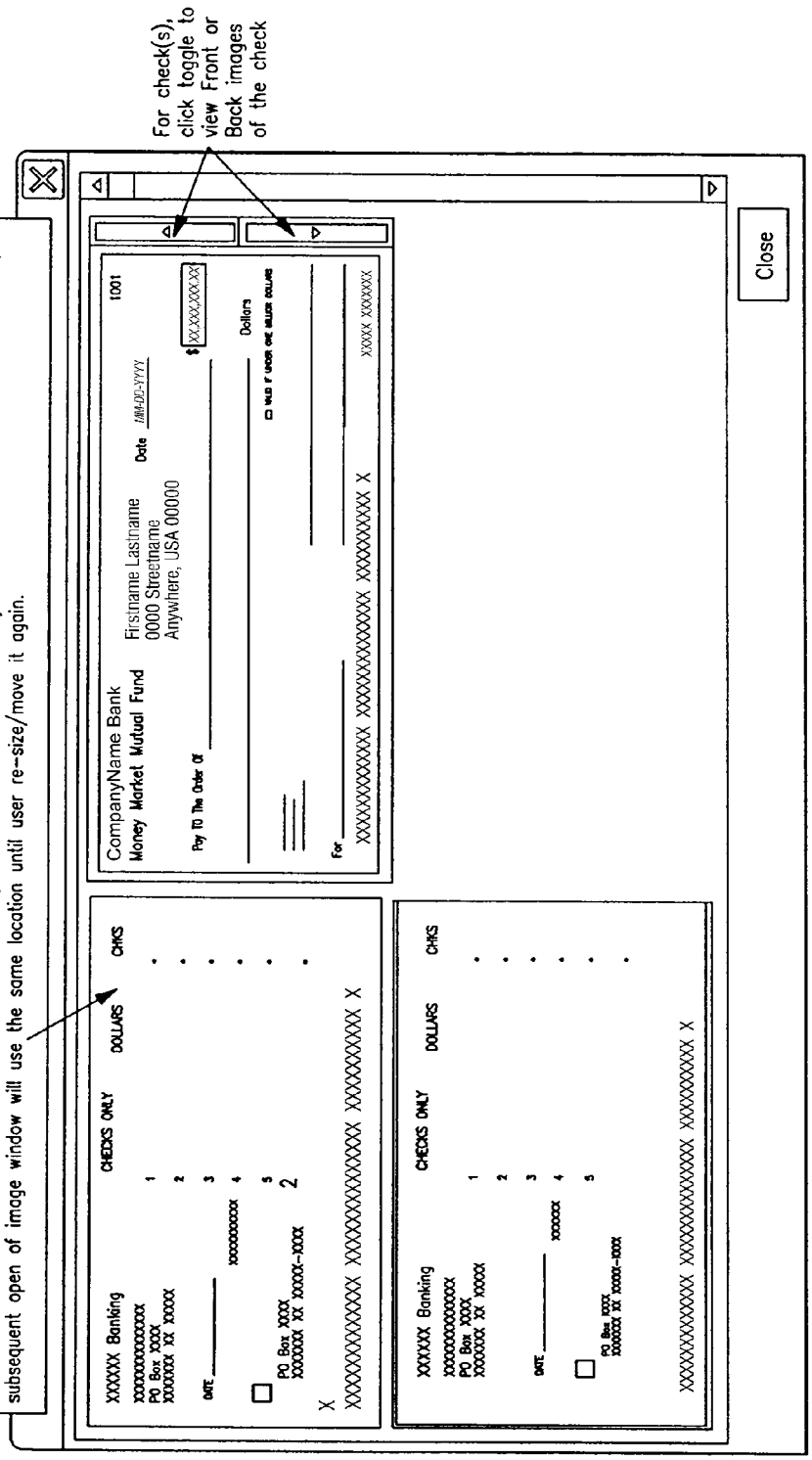
Figure 8G:
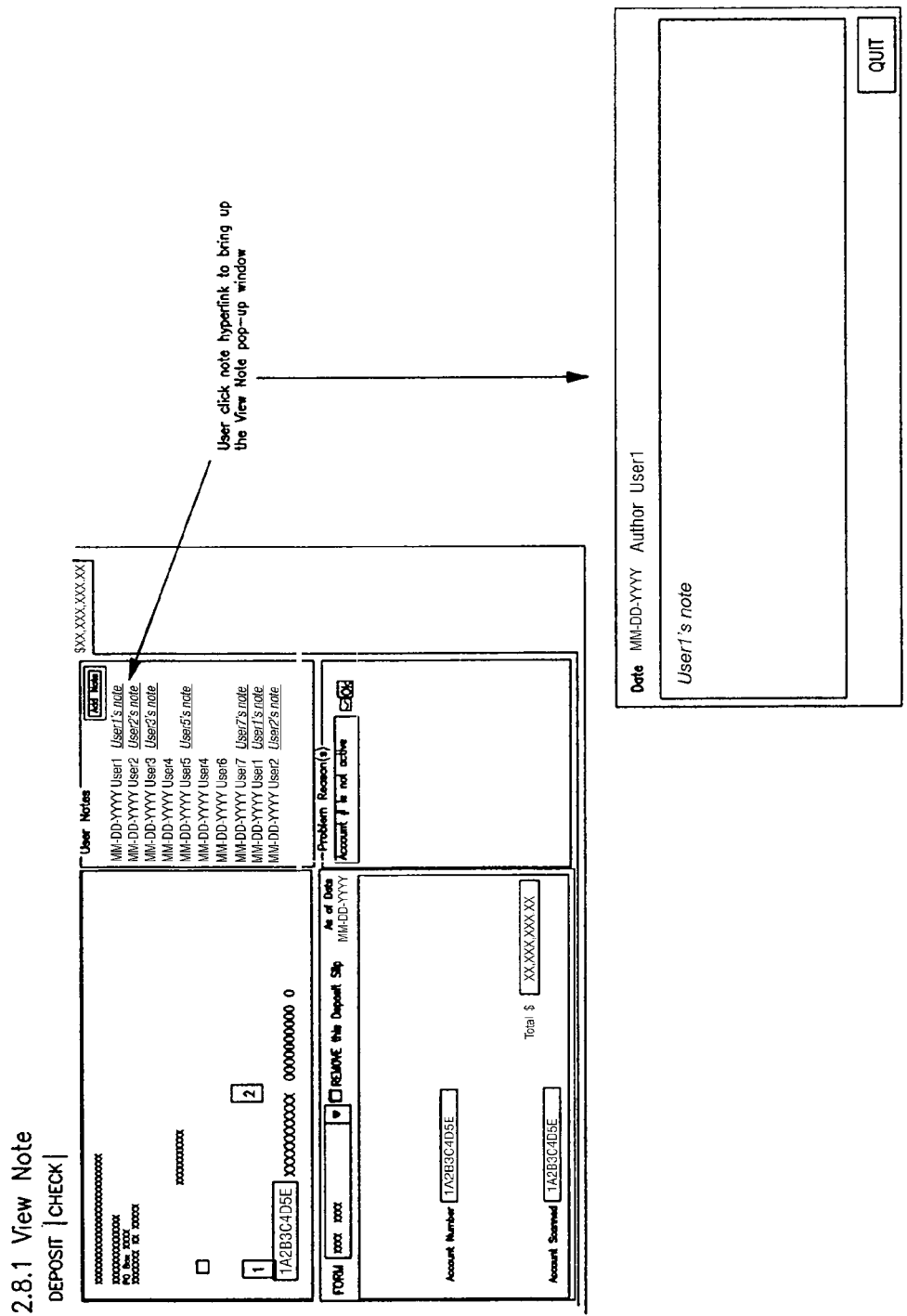
Figure 8H:
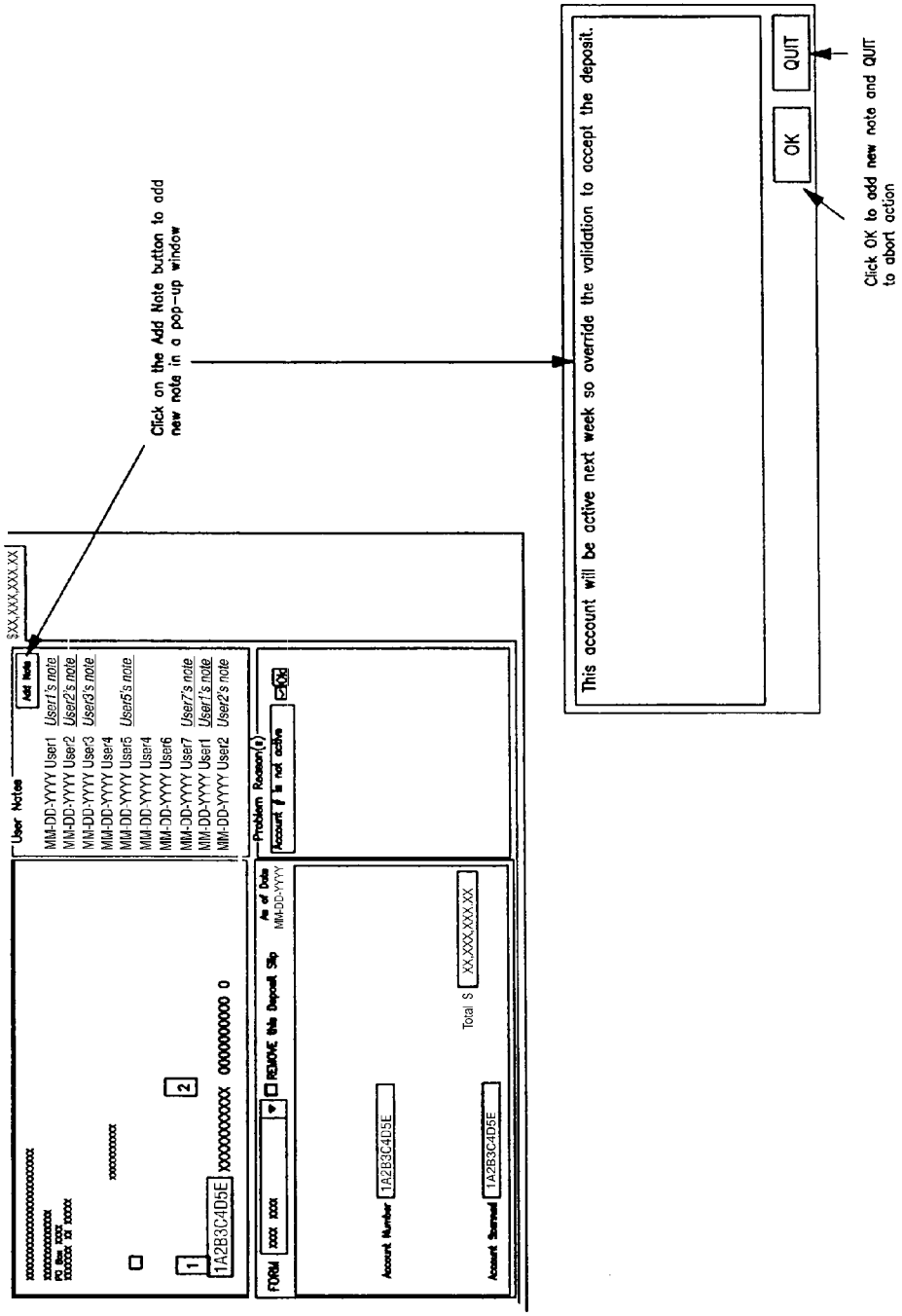

FIG. 7D provides an overview logic layout diagram illustrating various components interactions/connections for an embodiment of the DPManager. A deposit capture system 799 (e.g., see FIG. 2A) may interact with an integration manager 798, which may interact with a workflow manager 797 (e.g., a network interface connecting to the workflow manager), a number of databases 796 (e.g., as described in FIGS. 7A-C) and/or communication utility 795. In some embodiments, the communication utility 795 may include and/or utilize financial advisor (FA) alert messages 795*a*, mail queues 795*b*, and/or client notification systems 795*c*, and may interact with one or more databases 796.

The workflow manager 797 and/or workflow distributor may direct, manage and/or otherwise interact with a number of queues 793*a-g*. This Figure illustrates that numerous types of queues may be established by the DPManager to facilitated the numerous services that may interact with the system. Each queue may have a workflow process (WP) which corresponds to the indicated queue, for example, an account validation WP 792*a* may be utilized in account validation, and associated with account validation service 791*a*. Similarly, stop file WP 792*b*, check validation WP 792*c*, deposit slip rules WP 792*d*, retirement rules WP 792*e*, product rules WP 792*f*, and/or Falcon WP 792*g* associated with a corresponding service (791*b*-791*g*), may also be utilized (as described in detail above). Such various services 791*a-g* may further interact with various Mainframe, PPS, API (e.g., retirement), databases (e.g., Stop file and Thomson ABA, etc.) and or the like systems (e.g. Falcon) via database adapter interfaces.

DPManager Controller

Figure 9:
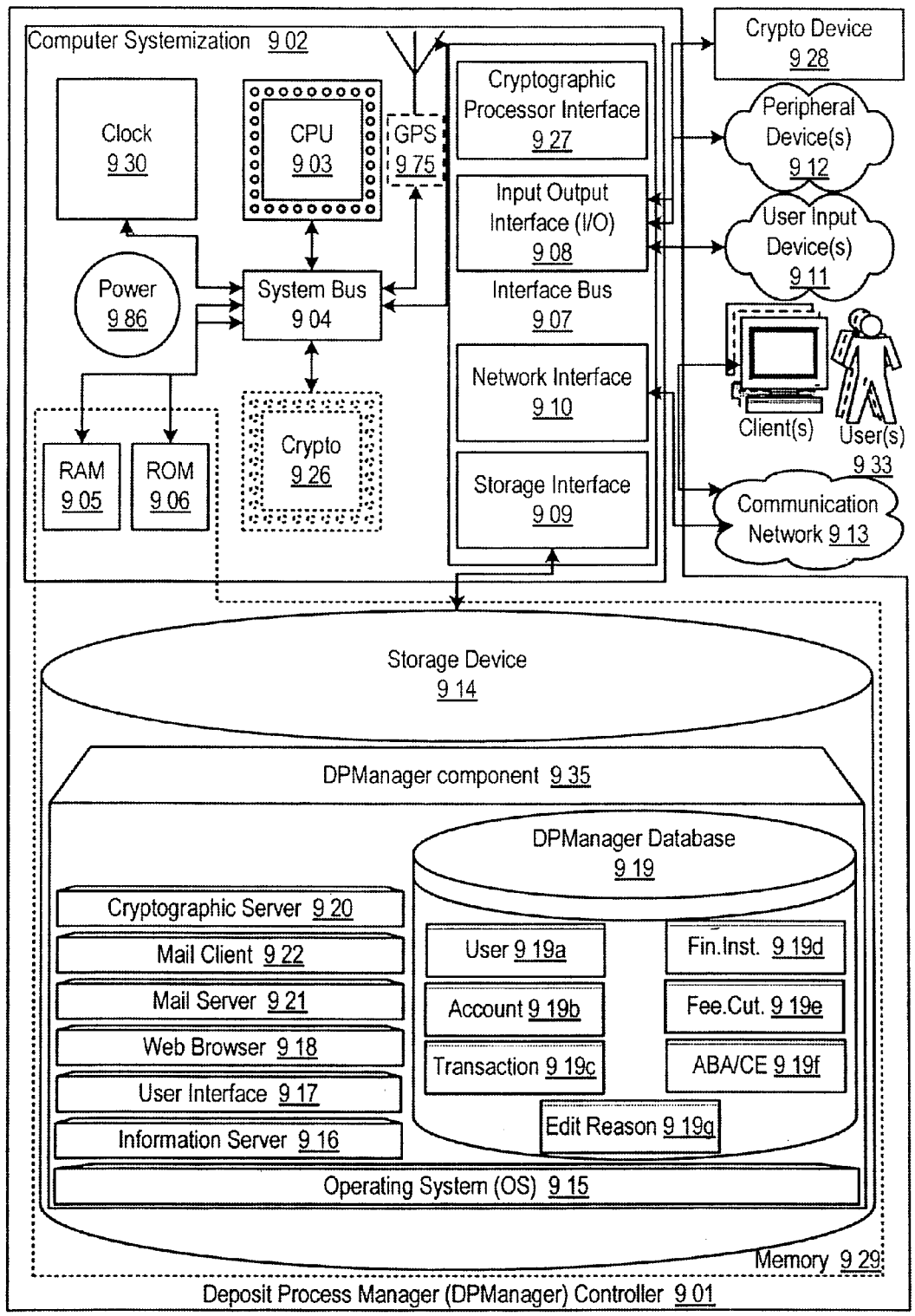
FIG. 9 is of a block diagram illustrating a DPManager controller.

FIG. 9 of the present disclosure illustrates inventive aspects of a DPManager controller 901 in a block diagram. In this embodiment, the DPManager controller 901 may serve to access, calculate, engage, exchange, generate, identify, instruct, match, process, search, serve, store, and/or facilitate transactions to promote the management of deposits.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components that facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the DPManager controller 901 may be connected to and/or communicate with entities such as, but not limited to: one or more users from user input devices 911; peripheral devices 912; a cryptographic processor device 928; and/or a communications network 913.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DPManager controller 901 may be based on common computer systems that may comprise, but are not limited to, components such as: a computer systemization 902 connected to memory 929.

Computer Systemization

A computer systemization 902 may comprise a clock 930, central processing unit (CPU) 903, a read only memory (ROM) 906, a random access memory (RAM) 905, and/or an interface bus 907, and most frequently, although not necessarily, are all interconnected and/or communicating through a system bus 904. Optionally, the computer systemization may be connected to an internal power source 986. Optionally, a cryptographic processor 926 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the DPManager controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the DPManager thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 113, the DPManager controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 911 may be card readers, dongles, finger print readers, gloves, graphics tablets, joysticks, keyboards, mouse (mice), remote controls, retina readers, trackballs, trackpads, and/or the like.

Peripheral devices 912 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the DPManager controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the DPManager controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the DPManager controller and/or a computer systemization may employ various forms of memory 929. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the DPManager component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the DPManager controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Microsoft Windows 2000/2003/3.1/95/98/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DPManager controller to communicate with other entities through a communications network 913. Various communication protocols may be used by the DPManager controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the. The information server may allow for the execution of program components through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DPManager controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DPManager structure 919, operating systems, other program components, user interfaces, Web browsers, and/or the like.

Access to the DPManager structure may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DPManager. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DPManager as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status.

Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 917 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the DPManager enabled nodes. The combined application may be nugatory on systems employing standard Web browsers.

Mail Server

A mail server component 921 is a stored program component that is executed by a CPU. The mail server may be a conventional Internet mail server such as, but not limited to sendmail, Microsoft Exchange, and/or the. The mail server may allow for the execution of program components through facilities such as ASP, ActiveX, (ANSI) (Objective-) C (++), CGI scripts, Java, JavaScript, PERL, pipes, Python, WebObjects, and/or the like. The mail server may support communications protocols such as, but not limited to: Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DPManager.

Access to the DPManager mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DPManager may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DPManager component to engage in secure transactions if so desired. The cryptographic component facilitates the secure accessing of resources on the DPManager and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DPManager Database

The DPManager database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DPManager database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the DPManager database is implemented as a data-structure, the use of the DPManager database 919 may be integrated into another component such as the DPManager component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database module 919 includes several tables 919*a-g*. A users table 919*a* includes fields such as, but not limited to: a user name, email address, address, profile, accounts_id, user_id, and/or the like. The user table may support and/or track multiple entity accounts on a DPManager. A account table 919*b* includes fields such as, but not limited to: user_id, account_id, assets, transactions, and/or the like. A transaction table 919*c* includes fields such as, but not limited to: transaction ID, check_number, depos-it_slip_number, account_id, user_id, check_id, routing_no, account_no, payee, date, image_replacement_document, and/or the like. A financial institution table 919*d* includes fields such as, but not limited to: institution_id, routing_no, name, address and/or the like. A fee and cutoff table 919*e* includes fields such as, but not limited to: clearing_entity, cutoff_times, fees and/or the like. An ABA/CE table 919*f* includes fields such as, but not limited to: clearing_entity, ABA_numbers, clearing_provided and/or the like. A data-capture edit reason table 919*g* includes fields such as, but not limited to: transaction_id, work-flow_state, status, and/or the like. A subscription table 919*g* includes fields such as, but not limited to: transaction_id, user_id, subscription_id, and/or the like. The database module may also include other database tables mentioned in earlier figures of the present disclosure, and/or the like.

In one embodiment, user programs may contain various user interface primitives, which may serve to update the DPManager. Also, various accounts may require custom database tables depending upon the environments and the types of clients the DPManager may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-f*. The DPManager may be configured to keep track of various settings, inputs, and parameters via database controllers.

The DPManager database may communicate to and/or with other components in a component collection, including itself, and/or facilities of the like. Most frequently, the DPManager database communicates with the DPManager component, other program components, and/or the like. The database may contain, retain, and provide information regarding other nodes and data.

The DPManager

The DPManager component 935 is a stored program component that is executed by a CPU. In one embodiment, the DPManager component incorporates all or any combination of the aspects of the DPManager that were discussed in the previous figures.

In one embodiment, the DPManager affects accessing, obtaining and the provision of information, services, transactions, and/or the like across various communication channels. As such, the Deposit Management System enables one to access, calculate, engage, exchange, generate, identify, instruct, match, process, search, serve, store, and/or facilitate transactions to promote the management of deposits.

The DPManager component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the DPManager server employs a cryptographic server to encrypt and decrypt communications. The DPManager component may communicate to and/or with other components in a component collection, including itself, and/or facilities of the like. Most frequently, the DPManager component communicates with the DPManager structure, operating systems, other program components, and/or the like. The DPManager may contain, communicate, generate, obtain, and/or provide program component, system, user, and/or data communications, requests, and/or responses.

Distributed DPManager

The structure and/or operation of any of the DPManager node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DPManager controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged recognize the tokens of an HTTP post command, e.g.:

w3c-post http:// . . . . Value1 where Value1 is discerned as being a parameter because "http://" is part of the grammar syntax, and what follows is considered part of the post value. Similarly, with such a grammar, a variable "Value1" may be inserted into an "http://" post command and then sent. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. Further, section headings within the disclosure, including claim labels and sub-part labels, should not be construed as being limiting in arrangement, composition, function, logic, organization, sequence, structure, topology, and/or the like. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and arrangement, composition, functional, logical, organizational, sequential, structural, topological, and/or the like modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, arrangements, compositions, embodiments, examples, functional, features, logical, organizational, sequential, structural, topological, and/or other aspects of the disclosure are not to be considered limitations on the disclosure as defined by the claims or limitations on equivalents to the claims.

What is claimed is:

1. A processor-implemented method for deposit process management, comprising:

obtaining, by a processor, a preliminary image of an original deposit, wherein the original deposit includes a financial instrument and a deposit slip, wherein the financial instrument is a check;

determining, by the processor, a quality of the preliminary deposit image;

accepting, by the processor, the preliminary deposit image as a deposit replacement image if the determined quality of the preliminary deposit image meets a specified quality threshold, wherein the specified quality threshold is obtained from a quality rules database;

sending, by the processor, the preliminary deposit image for re-evaluation if the determined quality of the preliminary deposit image does not meet the specified quality threshold;

providing, by the processor, the deposit replacement image for assessment, wherein the deposit replacement image is provided to and saved in a first database;

discerning, by the processor, deposit component information from the deposit replacement image;

determining, by the processor, an optimum clearing solution for the deposit, wherein a decisioning engine makes the determination, wherein determining the optimum clearing solution comprises:

comparing discerned deposit component information to a second database to determine a first number of clearing entities that can provide same day clearing for the deposit and which have a cut-off time after a current time plus a buffer time;

determining a lowest same day cost clearing entity with a lowest same day clearing cost if there is at least one clearing entity that can provide same day clearing for the deposit and which has the cut-off time after the current time plus the buffer time;

comparing discerned deposit component information to the second database to determine a second number of clearing entities that can provide next day clearing for the deposit;

determining a lowest next day cost clearing entity with a lowest next day clearing cost if there is at least one clearing entity that can provide next day clearing for the deposit;

determining a one day interest cost associated with the deposit;

comparing the one day interest cost to a same day clearing cost of the lowest same day cost clearing entity if there is at least one clearing entity that can provide same day clearing for the deposit and has the cut-off time after the current time plus the buffer time;

selecting same day clearing via the lowest same day cost clearing entity if the one day interest cost is greater than the same day clearing cost of the lowest same day cost clearing entity;

selecting next day clearing via the lowest next day cost clearing entity with the lowest next day clearing cost if there is no clearing entity that can provide same day clearing for the deposit and which has the cut-off time after the current time plus the buffer time;

comparing the one day interest cost plus a next day clearing cost of the lowest next day cost clearing entity to the same day clearing cost of the lowest same day cost clearing entity if there is at least one clearing entity that can provide same day clearing for the deposit and has the cut-off time after the current time plus the buffer time and if the one day interest cost is less than the same day clearing cost of the lowest same day cost clearing entity;

selecting next day clearing via the lowest next day cost clearing entity with the lowest next day clearing cost if the one day interest cost plus the next day clearing cost of the lowest next day cost clearing entity is less than the same day clearing cost of the lowest same day cost clearing entity; and selecting same day clearing via the lowest same day cost clearing entity with the lowest same day clearing cost if the one day interest cost plus the next day clearing cost of the lowest next day cost clearing entity is not less than the same day clearing cost of the lowest same day cost clearing entity; and clearing, by the processor, the deposit via the optimum clearing solution.

2. The method of claim 1, wherein the re-evaluation is manual.

3. The method of claim 1, wherein the re-evaluation is automatic.

4. The method of claim 1, further comprising removing the original deposit from circulation.

5. The method of claim 4, wherein the original deposit is destroyed.

6. The method of claim 1, wherein discerned deposit component information includes a signature.

7. The method of claim 1, wherein discerned deposit component information includes payee information.

8. The method of claim 1, wherein discerned deposit component information includes a deposit amount.

9. The method of claim 1, wherein discerned deposit component information includes payor information.

10. The method of claim 1, wherein discerned deposit component information includes a routing number.

11. The method of claim 1, wherein discerned deposit component information includes an account number.

12. The method of claim 1, wherein discerned deposit component information includes depositor information.

13. The method of claim 1, wherein discerned deposit component information includes Magnetic Ink Character Recognition (MICR) information.

14. The method of claim 1, wherein discerned deposit component information includes an American Bankers Association (ABA) number.

15. The method of claim 1, wherein discerned deposit component information includes a Demand Deposit Account (DDA) number.

* * * * *